United States Patent
Cruce et al.

(10) Patent No.: US 10,907,018 B2
(45) Date of Patent: Feb. 2, 2021

(54) ADHESION PROMOTER COMPOSITIONS FOR CYCLIC OLEFIN RESIN COMPOSITIONS

(71) Applicant: MATERIA, INC., Pasadena, CA (US)

(72) Inventors: Christopher J. Cruce, Poway, CA (US); Brian Edgecombe, Anaheim, CA (US); Paul W. Boothe, Brooklyn, NY (US); Michael A. Giardello, Pasadena, CA (US)

(73) Assignee: MATERIA, INC., Pasadena, CA (US)

( * ) Notice: Subject to any disclaimer, the term of this patent is extended or adjusted under 35 U.S.C. 154(b) by 151 days.

(21) Appl. No.: 15/120,554

(22) PCT Filed: Feb. 25, 2015

(86) PCT No.: PCT/US2015/017548
§ 371 (c)(1),
(2) Date: Aug. 22, 2016

(87) PCT Pub. No.: WO2015/130802
PCT Pub. Date: Sep. 3, 2015

(65) Prior Publication Data
US 2017/0166714 A1 Jun. 15, 2017

Related U.S. Application Data

(60) Provisional application No. 61/945,473, filed on Feb. 27, 2014.

(51) Int. Cl.
| | |
|---|---|
| *C08J 5/10* | (2006.01) |
| *C08L 65/00* | (2006.01) |
| *C08G 18/67* | (2006.01) |
| *C08J 5/24* | (2006.01) |
| *C08G 61/08* | (2006.01) |
| *C08K 5/101* | (2006.01) |
| *C08K 5/29* | (2006.01) |

(52) U.S. Cl.
CPC .............. *C08J 5/10* (2013.01); *C08G 18/672* (2013.01); *C08G 18/6715* (2013.01); *C08G 61/08* (2013.01); *C08J 5/24* (2013.01); *C08K 5/101* (2013.01); *C08K 5/29* (2013.01); *C08L 65/00* (2013.01); *C08G 2261/3324* (2013.01); *C08G 2261/3325* (2013.01); *C08G 2261/418* (2013.01); *C08J 2345/00* (2013.01)

(58) Field of Classification Search
CPC ........... C08J 5/10; C08J 5/24; C08G 18/6715; C08G 18/672; C08G 61/08; C08K 5/101; C08K 5/29; C08L 65/00
See application file for complete search history.

(56) References Cited

U.S. PATENT DOCUMENTS

| | | |
|---|---|---|
| 4,708,969 A | 11/1987 | Leach |
| 4,899,005 A | 2/1990 | Lane et al. |
| 4,902,560 A | 2/1990 | Silver |
| 4,943,621 A | 7/1990 | Janda et al. |
| 5,312,940 A | 5/1994 | Grubbs et al. |
| 5,342,909 A | 8/1994 | Grubbs et al. |
| 5,728,785 A | 3/1998 | Grubbs et al. |
| 5,840,238 A | 11/1998 | Setiabudi et al. |
| 5,939,504 A | 8/1999 | Woodson, Jr. et al. |
| 5,977,393 A | 11/1999 | Grubbs et al. |
| 6,001,909 A | 12/1999 | Setiabudi |
| 6,284,852 B1 | 9/2001 | Lynn et al. |
| 6,310,121 B1 | 10/2001 | Woodson, Jr. et al. |
| 6,486,279 B2 | 11/2002 | Lynn et al. |
| 6,525,125 B1 | 2/2003 | Giardello et al. |
| 6,552,139 B1 | 4/2003 | Herrmann et al. |

(Continued)

FOREIGN PATENT DOCUMENTS

| | | |
|---|---|---|
| EP | 1757613 B1 | 1/2011 |
| EP | 1577282 B1 | 6/2011 |

(Continued)

OTHER PUBLICATIONS

International Search Report and Written Opinion in corresponding International Application No. PCT/US2015/017548, dated May 20, 2015.

(Continued)

*Primary Examiner* — John E Uselding
(74) *Attorney, Agent, or Firm* — J.A. Lindeman & Co. PLLC

(57) ABSTRACT

This invention relates to compositions and methods for improving the adhesion of resin compositions to substrate materials. More particularly, the invention relates to compositions and methods for improving the adhesion of ROMP compositions to substrate materials using an adhesion promoter composition, where the adhesion promoter composition comprises a pre-reacted mixture comprising at least one compound containing at least two isocyanate groups and at least one compound comprising a heteroatom-containing functional group and a metathesis active olefin, where the adhesion promoter composition is storage stable and/or possesses in-resin storage stability when added to a resin composition, particularly a cyclic olefin resin composition, such as a ROMP composition. The polymer products produced via ROMP reactions of the invention may be utilized for a wide range of materials and composite applications. The invention has utility in the fields of polymer and materials chemistry and manufacture.

16 Claims, 2 Drawing Sheets

(56) References Cited

U.S. PATENT DOCUMENTS

| | | |
|---|---|---|
| 6,613,910 B2 | 9/2003 | Grubbs et al. |
| 6,620,955 B1 | 9/2003 | Pederson et al. |
| 6,635,768 B1 | 10/2003 | Herrmann et al. |
| 6,787,620 B2 | 9/2004 | Herrmann et al. |
| 6,838,489 B2 | 1/2005 | Bell et al. |
| 6,921,735 B2 | 7/2005 | Hoveyda et al. |
| 7,026,495 B1 | 4/2006 | Pederson et al. |
| 7,294,717 B2 | 11/2007 | Herrmann et al. |
| 7,339,006 B2 | 3/2008 | Giardello et al. |
| 7,378,528 B2 | 5/2008 | Herrmann et al. |
| 7,569,625 B2 | 8/2009 | Keller et al. |
| 7,652,145 B2 | 1/2010 | Herrmann et al. |
| 7,671,224 B2 | 3/2010 | Winde et al. |
| 7,687,635 B2 | 3/2010 | Verpoort et al. |
| 8,318,965 B2 | 11/2012 | Grela et al. |
| 2003/0055262 A1 | 3/2003 | Grubbs et al. |
| 2007/0043188 A1 | 2/2007 | Schaubroeck et al. |
| 2007/0185343 A1 | 8/2007 | Verpoort et al. |
| 2008/0293905 A9 | 11/2008 | Schaubroeck et al. |
| 2012/0088879 A1* | 4/2012 | Yoshiwara ............ C08F 232/08 524/554 |

FOREIGN PATENT DOCUMENTS

| | | |
|---|---|---|
| WO | 02/14376 A2 | 2/2002 |
| WO | 02/079208 A2 | 10/2002 |
| WO | 03/011455 A1 | 2/2003 |
| WO | 2010037550 A1 | 4/2010 |
| WO | 2012174502 A2 | 12/2012 |

OTHER PUBLICATIONS

International Preliminary Report on Patentability in corresponding International Application No. PCT/US2015/017548, dated Sep. 9, 2016.

Chatterjee et al., "A General Model for Selectivity in Olefin Cross Metathesis," J. Am. Chem. Soc., 2003, 125, pp. 11360-11370.

Greene et al., "Protective Groups in Organic Synthesis," Third Edition, 1999 John Wiley & Sons, Inc.

Sanford et al., "New Insights into the Mechanism of Ruthenium-Catalyzed Olefin Metathesis Reactions," J. Am. Chem. Soc., 2001, 123, pp. 749-750.

Scholl et al., "Synthesis and Activity of a New Generation of Ruthenium-Based Olefin Metathesis Catalysts Coordinated with 1,3-Dimesityl-4,5-dihydroimidazol-2-ylidene Ligands," Org. Lett. 1999, vol. 1, No. 6, pp. 953-956.

Schwab et al., "Synthesis and Applications of RuCl2(=CHR')(PR3)2: The Influence of the Alkylidene Moiety on Metathesis Activity," J. Am. Chem. Soc., 1996, 118, pp. 100-110.

* cited by examiner

FIG. 1 $^{13}$C NMR (CDCl$_3$, 100 MHz) spectrum of the ethylene bridge region of HENB from an HENB and liquid MDI (Mondur® MLQ) pre-reacted mixture at time zero, immediately after mixing.
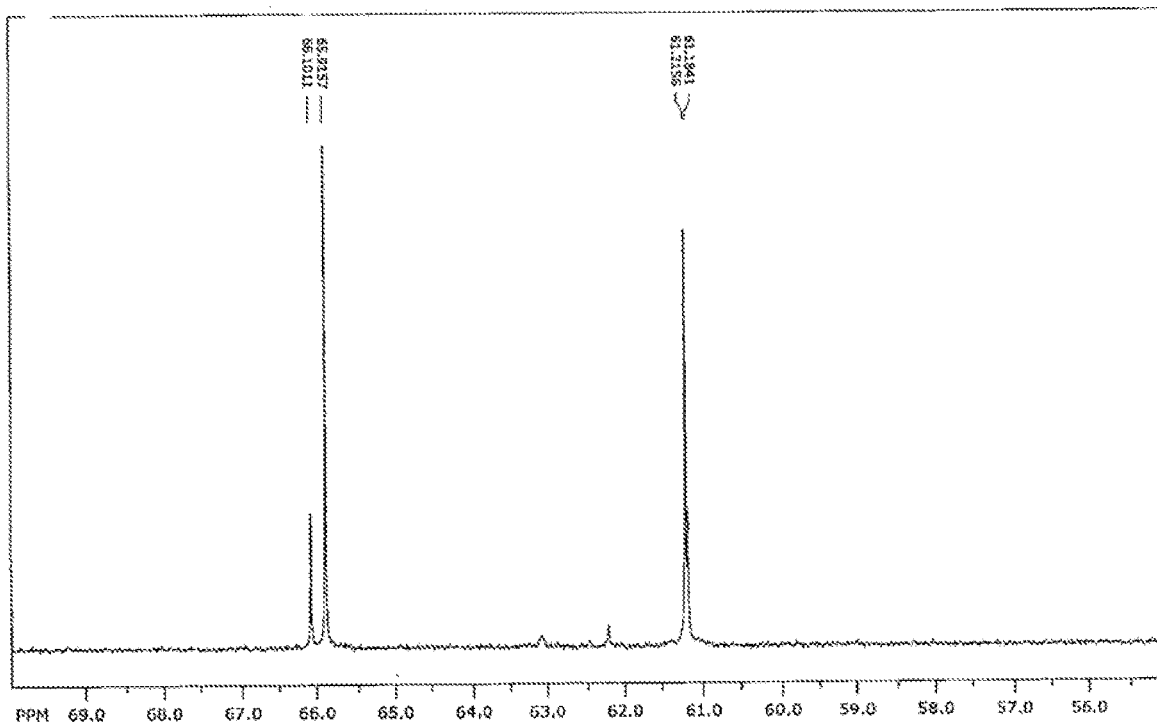

FIG. 2 $^{13}$C NMR (CDCl$_3$, 100 MHz) spectrum of the ethylene bridge region of HENB from an HENB and liquid MDI (Mondur® MLQ) pre-reacted mixture five days after mixing.
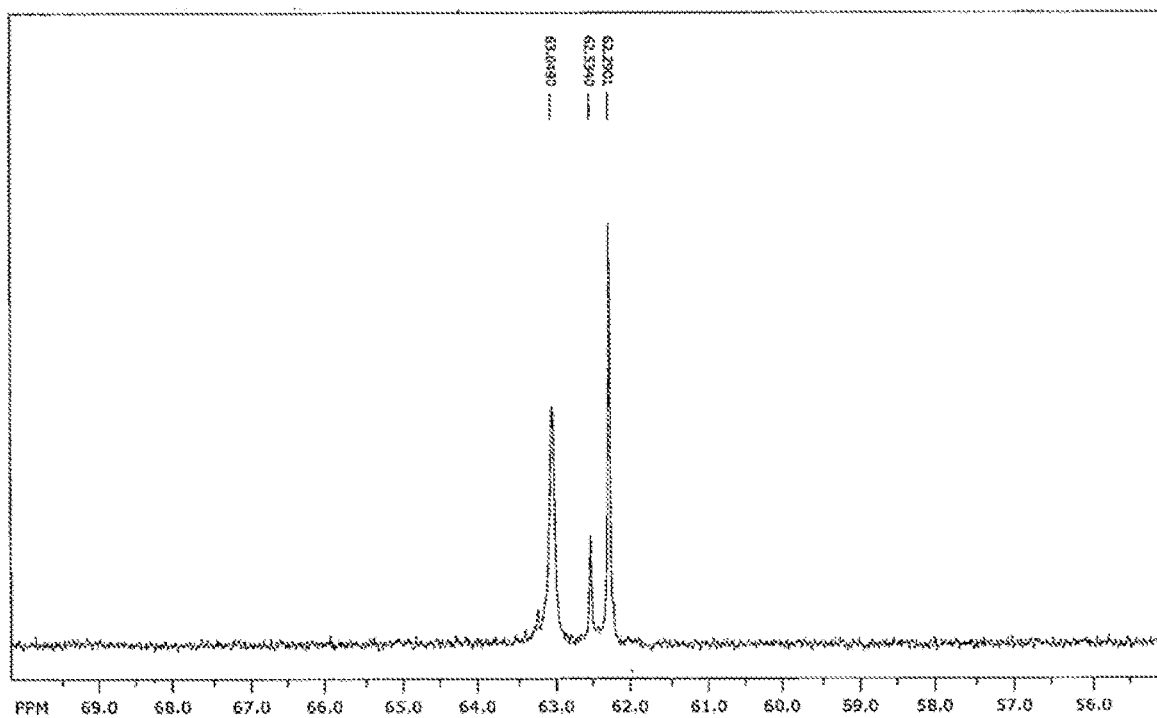

ADHESION PROMOTER COMPOSITIONS FOR CYCLIC OLEFIN RESIN COMPOSITIONS

RELATED APPLICATIONS

This application claims the benefit of U.S. Provisional Patent Application No. 61/945,473, filed Feb. 27, 2014, the contents of which is incorporated herein by reference.

TECHNICAL FIELD

The present invention relates to methods and compositions for improving the adhesion of olefin metathesis compositions to substrate materials. More particularly, the invention relates to methods and compositions for improving the adhesion of ring opening metathesis polymerization (ROMP) compositions to substrate materials and the manufacture of polymer articles (e.g., polymer composite articles) via ROMP. Polymer products produced via the metathesis reactions of the invention may be utilized for a wide range of materials and composite applications. The invention has utility in the fields of polymer and materials chemistry and manufacture.

BACKGROUND

Polymer-matrix composites offer unique combinations of properties and are useful in a wide range of applications. Such composites may be fabricated utilizing either thermosetting or thermoplastic polymer matrix materials with a variety of particulate or fibrous fillers or reinforcements. It is generally advantageous to have strong adhesion between the polymer matrix material and the surfaces of the various particulate or fibrous substrates and there is considerable art related to substrate finishes and other treatments to optimize adhesion to polymer matrices. For example, in the production of long-fiber reinforced composites, improved adhesion between the polymer matrix and the fiber reinforcement leads to increased material performance. Good adhesion is particularly important where failures are likely to occur by delamination or by other adhesive failure modes.

As described in, for example, U.S. Pat. Nos. 5,840,238, 6,310,121, and 6,525,125, the disclosures of each of which are incorporated herein by reference, polymers generated by olefin metathesis processes are attractive as composite matrix materials. Of particularly beneficial use are the polymers generated by the ROMP of cyclic olefins. The low viscosity of cyclic olefin resin formulations and the ability to control ROMP kinetics (e.g., U.S. Pat. Nos. 4,708,969 and 5,939,504, the disclosures of both of which are incorporated herein by reference) facilitate composite processing and manufacture, and the corrosion resistance and high toughness of ROMP polymers leads to good composite durability. Additionally, certain properties of ROMP polymers, e.g., mechanical strength and stiffness, heat distortion temperature and solvent resistance, can be further enhanced by crosslinking induced via thermal treatment (e.g., U.S. Pat. No. 4,902,560, the disclosure of which is incorporated herein by reference) or chemically by addition of peroxides (e.g., U.S. Pat. No. 5,728,785, the disclosure of which is incorporated herein by reference).

Commercially important ROMP resin formulations are generally based on readily available and inexpensive cyclic olefins such as dicyclopentadiene (DCPD), norbornenes, cyclooctadiene (COD), and various cycloalkenes. However, in contrast to traditional resin systems (e.g., epoxy, acrylate, urethane, and polyester resins) based on polar functional group chemistries, these nonpolar ROMP resins have poor intrinsic adhesion to the relatively polar surfaces of common carbon, glass, or mineral fillers and reinforcements. The addition of various silanes to such resin formulations for improvement of electrical and mechanical properties of ROMP polymers is described in U.S. Pat. Nos. 5,840,238, 6,001,909, and 7,339,006, the disclosures of each of which are incorporated herein by reference. Many widely used commercial silanes do not give optimal properties with ROMP polymers, however, and the greatest enhancements are only obtained when the silanes comprise groups with high metathesis activity (the relative reactivity of various metathesis active groups is described in J. Am. Chem. Soc., 2003, 125, 11360-11370).

As described in International Patent Application Number PCT/US2012/042850, the disclosure of which is incorporated herein by reference, it was discovered that the addition of an adhesion promoter comprising a compound containing at least two isocyanate groups to a cyclic olefin resin formulation (e.g., ROMP resin formulation) provides beneficial improvements in the adhesion of a cyclic olefin resin formulation to substrate materials, such as, for example carbon and glass reinforcement materials.

According to International Patent Application Number PCT/US2012/042850, addition of an adhesion promoter comprising a compound containing at least two isocyanate groups to a cyclic olefin resin formulation, where the resin formulation comprising the adhesion promoter was contacted with an olefin metathesis catalyst and used to manufacture ROMP polymer-matrix composites, provided improved adhesion of ROMP polymer matrices to composite substrate materials compared to ROMP polymer matrices without such adhesion promoters. Adhesion of the ROMP polymer-matrices to substrate materials was measured by the short beam shear method according to ASTM D2344. Interlaminar shear strength (ILSS) is a measure of the adhesion and/or compatibility between the polymer matrix and the substrate material in a composite.

In addition, International Patent Application Number PCT/US2012/042850 also demonstrated that the addition of at least one compound comprising a heteroatom-containing functional group and a metathesis active olefin (e.g., 2-hydroxyethyl bicyclo[2.2.1]hept-2-ene-5-carboxylate (HENB)) to a cyclic olefin resin formulation (e.g., ROMP resin formulation) comprising at least one cyclic olefin and an adhesion promoter comprising at least one compound containing at least two isocyanate groups, where the resin formulation comprising the adhesion promoter was contacted with an olefin metathesis catalyst and used to manufacture ROMP polymer-matrix composites, further improved the efficacy of the adhesion promoter to effectuate adhesion between the ROMP polymer-matrix and the composite substrate material.

While International Patent Application Number PCT/US2012/042850 demonstrated that compounds containing at least two isocyanate groups are effective to improve the adhesion of cyclic olefin resin formulations to substrate materials (e.g., carbon and/or glass substrate materials), the in-resin storage stability of adhesion promoters comprising at least one compound containing at least two isocyanate groups was not addressed. Furthermore, the in-resin storage stability of adhesion promoters comprising at least one compound containing at least two isocyanate groups, where the cyclic olefin resin formulation (e.g., ROMP resin formulation) further comprises at least one compound comprising a heteroatom-containing functional group and a metathesis active olefin was also not addressed.

The importance of using additives in resin formulations, particularly cyclic olefin resin formulations, where the additives are storage stable and/or possess in-resin storage stability is known in the art. For example, U.S. Pat. No. 4,943,621 discloses the importance of using storage stable additives possessing in-resin storage stability, particularly storage stable co-catalysts, as components in cyclic olefin resin formulations. Moreover, preparing cyclic olefin resin formulations which comprise additives having in-resin storage stability is of particular importance in the commercial manufacturing of polymer articles and/or polymer-matrix composites manufactured from such cyclic olefin resin formulations. For example, for a manufacturer of cyclic olefin resin formulations to successfully commercialize such resin formulations it is often necessary to be able transport and store the resin formulations prior to use, which further necessitates the need for the use of in-resin storage stable additives and components. Furthermore, it is often preferable, particularly from a commercial perspective, that the cyclic olefin resin formulations be provided to customers, molders, and other end-users with all of the necessary additives and components contained in the cyclic olefin resin formulation so that these individuals can avoid additional processing and therefore use the resin formulations as received to manufacture articles comprising ROMP polymers and/or ROMP polymer-matrix composites.

After further investigation into the in-resin storage stability of adhesion promoters comprising compounds containing at least two isocyanate groups, the inventors have discovered that such adhesion promoters do possess in-resin storage stability, particularly where the resin is a cyclic olefin resin. This in-resin storage stability is observed by little or no decrease in the ILSS over time of polymer-matrix composites prepared using resin compositions comprising at least one adhesion promoter, where the at least one adhesion promoter comprises at least one compound containing at least two isocyanate groups. The in-resin storage stability of adhesion promoters comprising compounds containing at least two isocyanate groups, particularly where the resin is a cyclic olefin resin is demonstrated and discussed infra.

Surprisingly, however, the inventors have discovered that when a compound comprising a heteroatom-containing functional group and a metathesis active olefin (e.g., 2-hydroxyethyl bicyclo[2.2.1]hept-2-ene-5-carboxylate (HENB)) is independently or separately added to the cyclic olefin resin formulation containing an adhesion promoter comprising a compound containing at least two isocyanate groups, the in-resin storage stability of the adhesion promoter is adversely affected as observed by a decrease in the ILSS over time of polymer-matrix composites prepared using such resin formulations, the results of which are demonstrated and discussed infra.

Despite the advances achieved in the art, particularly in the properties of olefin metathesis polymers (e.g., ROMP polymers and ROMP polymer-matrix composites) and their associated applications, a continuing need therefore exists for further improvement in a number of areas, including the manufacture of cyclic olefin resin formulations, in particular ROMP resin formulations, for use in the manufacture of ROMP polymer-matrix composites, where such composites possess strong adhesion between the polymer matrix and substrate material (e.g., carbon and/or glass reinforcement materials) Furthermore, there also exists a need for further improvement in the manufacture of cyclic olefin resin formulations, in particular ROMP resin formulations, where the formulation additives and components, particularly adhesion promoters, are storage stable and/or possess in-resin storage stability.

SUMMARY OF INVENTION

The present invention is directed to addressing one or more of the aforementioned concerns and relates to the use of an adhesion promoter composition in a resin composition, such as a ROMP composition, or as a substrate material pre-treatment to provide useful improvements in the adhesion of a metathesis catalyzed composition to the substrate material.

More particularly, the inventors have discovered that addition of an adhesion promoter composition according to the invention to a resin composition, particularly a ROMP composition, allows for improvements in the adhesion of the polymerized (resin) composition to the substrate material, without adversely affecting the mechanical properties of the polymerized resin and/or polymer-matrix composite. Alternatively, a substrate material may be pre-treated with an adhesion promoter composition according to the invention in order to improve the adhesion of the polymerized (resin) composition to the substrate material, without adversely affecting the mechanical properties of the polymerized resin and/or polymer-matrix composite. In addition, the inventors have discovered that adhesion promoter compositions according to the invention possess in-resin storage stability when added to a resin composition, particularly a cyclic olefin resin composition, such as a ROMP composition.

Adhesion promoter compositions according to the present invention, discussed infra, are generally comprised of a pre-reacted mixture comprising at least one compound containing at least two isocyanate groups and at least one compound comprising a heteroatom-containing functional group and a metathesis active olefin. Adhesion promoter compositions of the invention possess in-resin storage stability when combined with, contacted with, or added to a cyclic olefin resin composition (e.g., ROMP resin composition). Furthermore, adhesion promoter compositions of the invention may also be storage stable.

In one embodiment, the invention provides a composition for improving the adhesion of a resin composition, for example a ROMP composition, to a substrate material (e.g., carbon and/or glass reinforcement material), in which an adhesion promoter composition of the invention is combined with at least one cyclic olefin, and at least one olefin metathesis catalyst (e.g., a cyclic olefin metathesis catalyst), thereby forming a composition with improved mechanical properties.

In another embodiment, the invention provides a composition for improving the adhesion of a resin composition, for example a ROMP composition, to a substrate material (e.g., carbon and/or glass reinforcement material), in which an adhesion promoter composition of the invention is combined with at least one cyclic olefin, at least one olefin metathesis catalyst (e.g., a cyclic olefin metathesis catalyst), and a substrate material, thereby forming a composition with improved mechanical properties.

In another embodiment, the invention provides an adhesion promoter composition comprising a pre-reacted mixture of at least one compound containing at least two isocyanate groups, and at least one compound comprising a heteroatom-containing functional group and a metathesis active olefin.

In another embodiment, the invention provides a storage stable adhesion promoter composition comprising a prereacted mixture of at least one compound containing at least two isocyanate groups, and at least one compound comprising a heteroatom-containing functional group and a metathesis active olefin.

In another embodiment, the invention provides an adhesion promoter composition comprising a pre-reacted mixture of at least one compound containing at least two isocyanate groups, and at least one compound comprising a heteroatom-containing functional group and a metathesis active olefin, wherein the adhesion promoter composition possesses in-resin storage stability when added to a resin composition, wherein the resin composition comprises at least one cyclic olefin.

In another embodiment, the invention provides a storage stable adhesion promoter composition comprising a pre-reacted mixture of at least one compound containing at least two isocyanate groups, and at least one compound comprising a heteroatom-containing functional group and a metathesis active olefin, wherein the storage stable adhesion promoter composition possesses in-resin storage stability when added to a resin composition, wherein the resin composition comprises at least one cyclic olefin.

In another embodiment, the invention provides an adhesion promoter composition comprising a pre-reacted mixture of at least one compound comprising at least two isocyanate groups, and at least one compound comprising a heteroatom-containing functional group and a metathesis active olefin.

In another embodiment, the invention provides a storage stable adhesion promoter composition comprising a pre-reacted mixture of at least one compound comprising at least two isocyanate groups, and at least one compound comprising a heteroatom-containing functional group and a metathesis active olefin.

In another embodiment, the invention provides an adhesion promoter composition comprising a pre-reacted mixture of at least one compound comprising at least two isocyanate groups, and at least one compound comprising a heteroatom-containing functional group and a metathesis active olefin, wherein the adhesion promoter composition possesses in-resin storage stability when added to a resin composition, wherein the resin composition comprises at least one cyclic olefin.

In another embodiment, the invention provides a storage stable adhesion promoter composition comprising a pre-reacted mixture of at least one compound comprising at least two isocyanate groups, and at least one compound comprising a heteroatom-containing functional group and a metathesis active olefin, wherein the storage stable adhesion promoter composition possesses in-resin storage stability when added to a resin composition, wherein the resin composition comprises at least one cyclic olefin.

In another embodiment, the invention provides a method for preparing an adhesion promoter composition, comprising combining at least one compound containing at least two isocyanate groups with at least one compound comprising a heteroatom-containing functional group and a metathesis active olefin to form a mixture, and subjecting the mixture to conditions effective such that a pre-reaction there between takes place.

In another embodiment, the invention provides a method for preparing a storage stable adhesion promoter composition, comprising combining at least one compound containing at least two isocyanate groups with at least one compound comprising a heteroatom-containing functional group and a metathesis active olefin to form a mixture, and subjecting the mixture to conditions effective such that a pre-reaction there between takes place.

In another embodiment, the invention provides a method for preparing an adhesion promoter composition comprising combining at least one compound containing at least two isocyanate groups with at least one compound comprising a heteroatom-containing functional group and a metathesis active olefin to form a mixture, and subjecting the mixture to conditions effective that a pre-reaction there between takes place, wherein the adhesion promoter composition possesses in-resin storage stability when added to a resin composition, wherein the resin composition comprises at least one cyclic olefin.

In another embodiment, the invention provides a method for preparing a storage stable adhesion promoter composition comprising combining at least one compound containing at least two isocyanate groups with at least one compound comprising a heteroatom-containing functional group and a metathesis active olefin to form a mixture, and subjecting the mixture to conditions effective that a pre-reaction there between takes place, wherein the storage stable adhesion promoter composition possesses in-resin storage stability when added to a resin composition, wherein the resin composition comprises at least one cyclic olefin.

In another embodiment, the invention provides a method for preparing an adhesion promoter composition, comprising combining at least one compound containing at least two isocyanate groups with at least one compound comprising a heteroatom-containing functional group and a metathesis active olefin to form a mixture, and subjecting the mixture to conditions effective such that a reaction there between takes place.

In another embodiment, the invention provides a method for preparing a storage stable adhesion promoter composition, comprising combining at least one compound containing at least two isocyanate groups with at least one compound comprising a heteroatom-containing functional group and a metathesis active olefin to form a mixture, and subjecting the mixture to conditions effective such that a reaction there between takes place.

In another embodiment, the invention provides a method for preparing an adhesion promoter composition comprising combining at least one compound containing at least two isocyanate groups with at least one compound comprising a heteroatom-containing functional group and a metathesis active olefin to form a mixture, and subjecting the mixture to conditions effective that a reaction there between takes place, wherein the adhesion promoter composition possesses in-resin storage stability when added to a resin composition, wherein the resin composition comprises at least one cyclic olefin.

In another embodiment, the invention provides a method for preparing a storage stable adhesion promoter composition comprising combining at least one compound containing at least two isocyanate groups with at least one compound comprising a heteroatom-containing functional group and a metathesis active olefin to form a mixture, and subjecting the mixture to conditions effective that a reaction there between takes place, wherein the storage stable adhesion promoter composition possesses in-resin storage stability when added to a resin composition, wherein the resin composition comprises at least one cyclic olefin.

In another embodiment, the invention provides an adhesion promoter composition comprising a pre-reacted mixture of at least one compound containing at least two isocyanate groups, and at least one compound comprising a heteroatom-containing functional group and a metathesis active olefin, where the adhesion promoter composition is suitable for use in a cyclic olefin resin composition, and where the adhesion promoter composition possesses in-resin storage stability when added to the cyclic olefin resin composition.

In another embodiment, the invention provides a storage stable adhesion promoter composition comprising a pre-reacted mixture of at least one compound containing at least two isocyanate groups, and at least one compound comprising a heteroatom-containing functional group and a metathesis active olefin, where the storage stable adhesion promoter composition is suitable for use in a cyclic olefin resin composition, and where the storage stable adhesion promoter composition possesses in-resin storage stability when added to the cyclic olefin resin composition.

In another embodiment, the invention provides an adhesion promoter composition comprising a pre-reacted mixture of at least one compound containing at least two isocyanate groups, and at least one compound comprising a heteroatom-containing functional group and a metathesis active olefin, where the adhesion promoter composition is suitable for use in a cyclic olefin resin composition.

In another embodiment, the invention provides a storage stable adhesion promoter composition comprising a pre-reacted mixture of at least one compound containing at least two isocyanate groups, and at least one compound comprising a heteroatom-containing functional group and a metathesis active olefin, where the adhesion promoter composition is suitable for use in a cyclic olefin resin composition.

In another embodiment, the invention provides a method for improving the adhesion of a resin composition to a substrate material comprising combining at least one cyclic olefin, at least one olefin metathesis catalyst, and at least one adhesion promoter composition to form the resin composition, contacting the resin composition with the substrate material, and subjecting the resin composition to conditions effective to promote an olefin metathesis reaction of the cyclic olefin, wherein the at least one adhesion promoter composition comprises a pre-reacted mixture of at least one compound containing at least two isocyanate groups and at least one compound comprising a heteroatom-containing functional group and a metathesis active olefin.

In another embodiment, the invention provides a method for improving the adhesion of a resin composition to a substrate material comprising combining at least one cyclic olefin, at least one olefin metathesis catalyst, and at least one storage stable adhesion promoter composition to form the resin composition, contacting the resin composition with the substrate material, and subjecting the resin composition to conditions effective to promote an olefin metathesis reaction of the cyclic olefin, wherein the at least one storage stable adhesion promoter composition comprises a pre-reacted mixture of at least one compound containing at least two isocyanate groups and at least one compound comprising a heteroatom-containing functional group and a metathesis active olefin.

In another embodiment, the invention provides a method for improving the adhesion of a resin composition to a substrate material comprising combining at least one cyclic olefin, at least one olefin metathesis catalyst, and at least one adhesion promoter composition to form the resin composition, contacting the resin composition with the substrate material, and subjecting the resin composition to conditions effective to promote an olefin metathesis reaction of the cyclic olefin, wherein the at least one adhesion promoter composition comprises a pre-reacted mixture of at least one compound containing at least two isocyanate groups and at least one compound comprising a heteroatom-containing functional group and a metathesis active olefin, and where the adhesion promoter composition possesses in-resin storage stability when added to the resin composition.

In another embodiment, the invention provides a method for improving the adhesion of a resin composition to a substrate material comprising combining at least one cyclic olefin, at least one olefin metathesis catalyst, and at least one storage stable adhesion promoter composition to form the resin composition, contacting the resin composition with the substrate material, and subjecting the resin composition to conditions effective to promote an olefin metathesis reaction of the cyclic olefin, wherein the at least one storage stable adhesion promoter composition comprises a pre-reacted mixture of at least one compound containing at least two isocyanate groups and at least one compound comprising a heteroatom-containing functional group and a metathesis active olefin, and where the storage stable adhesion promoter composition possesses in-resin storage stability when added to the resin composition.

In another embodiment, the invention provides a method for improving the adhesion of a resin composition to a substrate material comprising combining at least one cyclic olefin, at least one olefin metathesis catalyst, and at least one substrate material, and at least one adhesion promoter composition to form the resin composition, and subjecting the resin composition to conditions effective to promote an olefin metathesis reaction of the cyclic olefin, wherein the at least one adhesion promoter composition comprises a pre-reacted mixture of at least one compound containing at least two isocyanate groups and at least one compound comprising a heteroatom-containing functional group and a metathesis active olefin.

In another embodiment, the invention provides a method for improving the adhesion of a resin composition to a substrate material comprising combining at least one cyclic olefin, at least one olefin metathesis catalyst, and at least one substrate material, and at least one storage stable adhesion promoter composition to form the resin composition, and subjecting the resin composition to conditions effective to promote an olefin metathesis reaction of the cyclic olefin, wherein the at least one storage stable adhesion promoter composition comprises a pre-reacted mixture of at least one compound containing at least two isocyanate groups and at least one compound comprising a heteroatom-containing functional group and a metathesis active olefin.

In another embodiment, the invention provides a method for improving the adhesion of a resin composition to a substrate material comprising combining at least one cyclic olefin, at least one olefin metathesis catalyst, and at least one substrate material, and at least one adhesion promoter composition to form the resin composition, and subjecting the resin composition to conditions effective to promote an olefin metathesis reaction of the cyclic olefin, wherein the at least one adhesion promoter composition comprises a pre-reacted mixture of at least one compound containing at least two isocyanate groups and at least one compound comprising a heteroatom-containing functional group and a metathesis active olefin, and where the adhesion promoter composition possesses in-resin storage stability when added to the resin composition.

In another embodiment, the invention provides a method for improving the adhesion of a resin composition to a substrate material comprising combining at least one cyclic olefin, at least one olefin metathesis catalyst, and at least one substrate material, and at least one storage stable adhesion promoter composition to form the resin composition, and subjecting the resin composition to conditions effective to promote an olefin metathesis reaction of the cyclic olefin, wherein the at least one storage stable adhesion promoter composition comprises a pre-reacted mixture of at least one compound containing at least two isocyanate groups and at least one compound comprising a heteroatom-containing functional group and a metathesis active olefin, and where the storage stable adhesion promoter composition possesses in-resin storage stability when added to the resin composition.

In another embodiment, the invention provides a resin composition comprising at least one cyclic olefin, at least one olefin metathesis catalyst, and at least one adhesion promoter composition, where the adhesion promoter composition comprises a pre-reacted mixture of at least one compound comprising at least two isocyanate groups and at least one compound comprising a heteroatom-containing functional group and a metathesis active olefin.

In another embodiment, the invention provides a resin composition comprising at least one cyclic olefin, at least one olefin metathesis catalyst, and at least one storage stable adhesion promoter composition, where the storage stable adhesion promoter composition comprises a pre-reacted mixture of at least one compound comprising at least two isocyanate groups and at least one compound comprising a heteroatom-containing functional group and a metathesis active olefin.

In another embodiment, the invention provides a resin composition comprising at least one cyclic olefin, at least one olefin metathesis catalyst, and at least one adhesion promoter composition, where the adhesion promoter composition comprises a pre-reacted mixture of at least one compound comprising at least two isocyanate groups and at least one compound comprising a heteroatom-containing functional group and a metathesis active olefin, wherein the adhesion promoter composition is in-resin storage stable.

In another embodiment, the invention provides a resin composition comprising at least one cyclic olefin, at least one olefin metathesis catalyst, and at least one storage stable adhesion promoter composition, where the storage stable adhesion promoter composition comprises a pre-reacted mixture of at least one compound comprising at least two isocyanate groups and at least one compound comprising a heteroatom-containing functional group and a metathesis active olefin, wherein the storage stable adhesion promoter composition is in-resin storage stable.

In another embodiment, the invention provides a resin composition comprising at least one cyclic olefin, at least one olefin metathesis catalyst, and at least one adhesion promoter composition, where the adhesion promoter composition comprises a pre-reacted mixture of at least one compound comprising at least two isocyanate groups and at least one compound comprising a heteroatom-containing functional group and a metathesis active olefin, and where the adhesion promoter composition possesses in-resin storage stability when added to the resin composition.

In another embodiment, the invention provides a resin composition comprising at least one cyclic olefin, at least one olefin metathesis catalyst, and at least one storage stable adhesion promoter composition, where the storage stable adhesion promoter composition comprises a pre-reacted mixture of at least one compound comprising at least two isocyanate groups and at least one compound comprising a heteroatom-containing functional group and a metathesis active olefin, and where the storage stable adhesion promoter composition possesses in-resin storage stability when added to the resin composition.

In another embodiment, the invention provides a resin composition comprising at least one cyclic olefin, and at least one adhesion promoter composition, where the adhesion promoter composition comprises a pre-reacted mixture of at least one compound comprising at least two isocyanate groups and at least one compound comprising a heteroatom-containing functional group and a metathesis active olefin.

In another embodiment, the invention provides a resin composition comprising at least one cyclic olefin, and at least one storage stable adhesion promoter composition, where the storage stable adhesion promoter composition comprises a pre-reacted mixture of at least one compound comprising at least two isocyanate groups and at least one compound comprising a heteroatom-containing functional group and a metathesis active olefin.

In another embodiment, the invention provides a resin composition comprising at least one cyclic olefin, and at least one adhesion promoter composition, where the adhesion promoter composition comprises a pre-reacted mixture of at least one compound comprising at least two isocyanate groups and at least one compound comprising a heteroatom-containing functional group and a metathesis active olefin, wherein the adhesion promoter composition is in-resin storage stable.

In another embodiment, the invention provides a resin composition comprising at least one cyclic olefin, and at least one storage stable adhesion promoter composition, where the storage stable adhesion promoter composition comprises a pre-reacted mixture of at least one compound comprising at least two isocyanate groups and at least one compound comprising a heteroatom-containing functional group and a metathesis active olefin, wherein the storage stable adhesion promoter composition is in-resin storage stable.

In another embodiment, the invention provides a resin composition comprising at least one cyclic olefin, and at least one adhesion promoter composition, where the adhesion promoter composition comprises a pre-reacted mixture of at least one compound comprising at least two isocyanate groups and at least one compound comprising a heteroatom-containing functional group and a metathesis active olefin, and where the adhesion promoter composition possesses in-resin storage stability when added to the resin composition.

In another embodiment, the invention provides a resin composition comprising at least one cyclic olefin, and at least one storage stable adhesion promoter composition, where the storage stable adhesion promoter composition comprises a pre-reacted mixture of at least one compound comprising at least two isocyanate groups and at least one compound comprising a heteroatom-containing functional group and a metathesis active olefin, and where the storage stable adhesion promoter composition possesses in-resin storage stability when added to the resin composition.

In another embodiment, the invention provides a resin composition comprising at least one cyclic olefin, at least one olefin metathesis catalyst, at least one substrate material, and at least one adhesion promoter composition, where the adhesion promoter composition comprises a pre-reacted mixture of at least one compound comprising at least two isocyanate groups and at least one compound comprising a heteroatom-containing functional group and a metathesis active olefin.

In another embodiment, the invention provides a resin composition comprising at least one cyclic olefin, at least one olefin metathesis catalyst, at least one substrate material, and at least one storage stable adhesion promoter composition, where the storage stable adhesion promoter composition comprises a pre-reacted mixture of at least one compound comprising at least two isocyanate groups and at least one compound comprising a heteroatom-containing functional group and a metathesis active olefin.

In another embodiment, the invention provides a resin composition comprising at least one cyclic olefin, at least one olefin metathesis catalyst, at least one substrate material, and at least one adhesion promoter composition, where the adhesion promoter composition comprises a pre-reacted mixture of at least one compound comprising at least two isocyanate groups and at least one compound comprising a heteroatom-containing functional group and a metathesis active olefin, wherein the adhesion promoter composition is in-resin storage stable.

In another embodiment, the invention provides a resin composition comprising at least one cyclic olefin, at least one olefin metathesis catalyst, at least one substrate material, and at least one storage stable adhesion promoter composition, where the storage stable adhesion promoter composition comprises a pre-reacted mixture of at least one compound comprising at least two isocyanate groups and at least one compound comprising a heteroatom-containing functional group and a metathesis active olefin, wherein the storage stable adhesion promoter composition is in-resin storage stable.

In another embodiment, the invention provides a resin composition comprising at least one cyclic olefin, at least one olefin metathesis catalyst, at least one substrate material, and at least one adhesion promoter composition, where the adhesion promoter composition comprises a pre-reacted mixture of at least one compound comprising at least two isocyanate groups and at least one compound comprising a heteroatom-containing functional group and a metathesis active olefin, and where the adhesion promoter composition possesses in-resin storage stability when added to the resin composition.

In another embodiment, the invention provides a resin composition comprising at least one cyclic olefin, at least one olefin metathesis catalyst, at least one substrate material, and at least one storage stable adhesion promoter composition, where the storage stable adhesion promoter composition comprises a pre-reacted mixture of at least one compound comprising at least two isocyanate groups and at least one compound comprising a heteroatom-containing functional group and a metathesis active olefin, and where the storage stable adhesion promoter composition possesses in-resin storage stability when added to the resin composition.

In another embodiment, the invention provides a resin composition comprising at least one cyclic olefin, at least one substrate material, and at least one adhesion promoter composition, where the adhesion promoter composition comprises a pre-reacted mixture of at least one compound comprising at least two isocyanate groups and at least one compound comprising a heteroatom-containing functional group and a metathesis active olefin.

In another embodiment, the invention provides a resin composition comprising at least one cyclic olefin, at least one substrate material, and at least one storage stable adhesion promoter composition, where the storage stable adhesion promoter composition comprises a pre-reacted mixture of at least one compound comprising at least two isocyanate groups and at least one compound comprising a heteroatom-containing functional group and a metathesis active olefin.

In another embodiment, the invention provides a resin composition comprising at least one cyclic olefin, at least one substrate material, and at least one adhesion promoter composition, where the adhesion promoter composition comprises a pre-reacted mixture of at least one compound comprising at least two isocyanate groups and at least one compound comprising a heteroatom-containing functional group and a metathesis active olefin, wherein the adhesion promoter is in-resin storage stable.

In another embodiment, the invention provides a resin composition comprising at least one cyclic olefin, at least one substrate material, and at least one storage stable adhesion promoter composition, where the storage stable adhesion promoter composition comprises a pre-reacted mixture of at least one compound comprising at least two isocyanate groups and at least one compound comprising a heteroatom-containing functional group and a metathesis active olefin, wherein the storage stable adhesion promoter is in-resin storage stable.

In another embodiment, the invention provides a resin composition comprising at least one cyclic olefin, at least one substrate material, and at least one adhesion promoter composition, where the adhesion promoter composition comprises a pre-reacted mixture of at least one compound comprising at least two isocyanate groups and at least one compound comprising a heteroatom-containing functional group and a metathesis active olefin, and where the adhesion promoter composition possesses in-resin storage stability when added to the resin composition.

In another embodiment, the invention provides a resin composition comprising at least one cyclic olefin, at least one substrate material, and at least one storage stable adhesion promoter composition, where the storage stable adhesion promoter composition comprises a pre-reacted mixture of at least one compound comprising at least two isocyanate groups and at least one compound comprising a heteroatom-containing functional group and a metathesis active olefin, and where the storage stable adhesion promoter composition possesses in-resin storage stability when added to the resin composition.

In another embodiment, the invention provides a cyclic olefin resin composition comprising at least one cyclic olefin, at least one olefin metathesis catalyst, and at least one adhesion promoter composition, where the cyclic olefin resin composition is contacted with at least one substrate material to provide useful improvements in the mechanical properties of a polymer-matrix composite and/or polymerized resin, where the adhesion promoter composition comprises a pre-reacted mixture of at least one-compound containing at least two isocyanate groups and at least one compound comprising a heteroatom-containing functional group and a metathesis active olefin, where the adhesion promoter composition possesses in-resin storage stability.

In another embodiment, the invention provides a cyclic olefin resin composition comprising at least one cyclic olefin, at least one olefin metathesis catalyst, and at least one adhesion promoter composition, where the cyclic olefin resin composition is contacted with at least one substrate material to provide useful improvements in the mechanical properties of a polymer-matrix composite and/or polymerized resin, where the adhesion promoter composition comprises a pre-reacted mixture of at least one-compound containing at least two isocyanate groups and at least one compound comprising a heteroatom-containing functional group and a metathesis active olefin.

In another embodiment, the invention provides a cyclic olefin resin composition comprising at least one cyclic olefin, at least one olefin metathesis catalyst, and at least one storage stable adhesion promoter composition, where the cyclic olefin resin composition is contacted with at least one substrate material to provide useful improvements in the mechanical properties of a polymer-matrix composite and/or polymerized resin, where the storage stable adhesion promoter composition comprises a pre-reacted mixture of at least one-compound containing at least two isocyanate groups and at least one compound comprising a heteroatom-containing functional group and a metathesis active olefin.

In another embodiment, the invention provides a cyclic olefin resin composition comprising at least one cyclic olefin, at least one olefin metathesis catalyst, and at least one storage stable adhesion promoter composition, where the cyclic olefin resin composition is contacted with at least one substrate material to provide useful improvements in the mechanical properties of a polymer-matrix composite and/or polymerized resin, where the storage stable adhesion promoter composition comprises a pre-reacted mixture of at least one-compound containing at least two isocyanate groups and at least one compound comprising a heteroatom-containing functional group and a metathesis active olefin, where the storage stable adhesion promoter composition possesses in-resin storage stability.

In another embodiment, the invention provides a cyclic olefin resin composition comprising at least one cyclic olefin and at least one adhesion promoter composition, where the cyclic olefin resin composition is combined with at least one olefin metathesis catalyst to form a catalyzed resin composition and the catalyzed resin composition is contacted with at least one substrate material to provide useful improvements in the mechanical properties of a polymer-composite and/or polymerized resin, where the adhesion promoter composition comprises a pre-reacted mixture of at least one compound containing at least two isocyanate groups and at least one compound comprising a heteroatom-containing functional group and a metathesis active olefin, where the adhesion promoter composition possesses in-resin storage stability.

In another embodiment, the invention provides a cyclic olefin resin composition comprising at least one cyclic olefin and at least one storage stable adhesion promoter composition, where the cyclic olefin resin composition is combined with at least one olefin metathesis catalyst to form a catalyzed resin composition and the catalyzed resin composition is contacted with at least one substrate material to provide useful improvements in the mechanical properties of a polymer-composite and/or polymerized resin, where the storage stable adhesion promoter composition comprises a pre-reacted mixture of at least one compound containing at least two isocyanate groups and at least one compound comprising a heteroatom-containing functional group and a metathesis active olefin, where the storage stable adhesion promoter composition possesses in-resin storage stability.

In another embodiment, the invention provides an article of manufacture comprising at least one resin composition comprising at least one cyclic olefin, at least one olefin metathesis catalyst, at least one substrate material, and at least one adhesion promoter composition, where the at least one adhesion promoter composition comprises a pre-reacted mixture of at least one compound containing at least two isocyanate groups and at least one compound comprising at least one heteroatom-containing functional group and at least one metathesis active olefin.

In another embodiment, the invention provides an article of manufacture comprising at least one resin composition comprising at least one cyclic olefin, at least one olefin metathesis catalyst, at least one substrate material, and at least one storage stable adhesion promoter composition, where the at least one storage stable adhesion promoter composition comprises a pre-reacted mixture of at least one compound containing at least two isocyanate groups and at least one compound comprising at least one heteroatom-containing functional group and at least one metathesis active olefin.

In another embodiment, the invention provides an article of manufacture comprising at least one resin composition comprising at least one cyclic olefin, at least one olefin metathesis catalyst, at least one substrate material, and at least one storage stable adhesion promoter composition, where the at least one storage stable adhesion promoter composition comprises a pre-reacted mixture of at least one compound containing at least two isocyanate groups and at least one compound comprising at least one heteroatom-containing functional group and at least one metathesis active olefin, and wherein the at least one storage stable adhesion promoter composition is in-resin storage stable.

In another embodiment, the invention provides an article of manufacture comprising at least one resin composition comprising at least one cyclic olefin, at least one olefin metathesis catalyst, at least one substrate material, and at least one storage stable adhesion promoter composition, where the at least one storage stable adhesion promoter composition comprises a pre-reacted mixture of at least one compound containing at least two isocyanate groups and at least one compound comprising at least one heteroatom-containing functional group and at least one metathesis active olefin, and wherein the at least one storage stable adhesion promoter composition possesses in-resin storage stability.

In another embodiment, the invention provides a method of making an article of manufacture comprising contacting at least one resin composition with at least one olefin metathesis catalyst to form a catalyzed resin composition, contacting the catalyzed resin composition with a substrate material, and subjecting the catalyzed resin composition to conditions effective to promote an olefin metathesis reaction of the catalyzed resin composition, where the at least one resin composition comprises at least one cyclic olefin and at least one adhesion promoter composition, where the at least one adhesion promoter composition comprises a pre-reacted mixture of at least one compound containing at least two isocyanate groups and at least one compound comprising at least one heteroatom-containing functional group and at least one metathesis active olefin. In another embodiment, the invention provides a method of making an article of manufacture comprising contacting at least one resin composition with at least one olefin metathesis catalyst to form a catalyzed resin composition, contacting the catalyzed resin composition with a substrate material, and subjecting the catalyzed resin composition to conditions effective to promote an olefin metathesis reaction of the catalyzed resin composition, where the at least one resin composition comprises at least one cyclic olefin and at least one storage stable adhesion promoter composition, where the at least one storage stable adhesion promoter composition comprises a pre-reacted mixture of at least one compound containing at least two isocyanate groups and at least one compound comprising at least one heteroatom-containing functional group and at least one metathesis active olefin.

In another embodiment, the invention provides a method of making an article of manufacture comprising contacting at least one resin composition with at least one olefin metathesis catalyst to form a catalyzed resin composition, contacting the catalyzed resin composition with a substrate material, and subjecting the catalyzed resin composition to conditions effective to promote an olefin metathesis reaction of the catalyzed resin composition, where the at least one resin composition comprises at least one cyclic olefin and at least one adhesion promoter composition, where the at least one adhesion promoter composition comprises a pre-reacted mixture of at least one compound containing at least two isocyanate groups and at least one compound comprising at least one heteroatom-containing functional group and at least one metathesis active olefin, and where the at least one adhesion promoter composition is in-resin storage stable.

In another embodiment, the invention provides a method of making an article of manufacture comprising contacting at least one resin composition with at least one olefin metathesis catalyst to form a catalyzed resin composition, contacting the catalyzed resin composition with a substrate material, and subjecting the catalyzed resin composition to conditions effective to promote an olefin metathesis reaction of the catalyzed resin composition, where the at least one resin composition comprises at least one cyclic olefin and at least one storage stable adhesion promoter composition, where the at least one storage stable adhesion promoter composition comprises a pre-reacted mixture of at least one compound containing at least two isocyanate groups and at least one compound comprising at least one heteroatom-containing functional group and at least one metathesis active olefin, and where the at least one storage stable adhesion promoter composition is in-resin storage stable.

In another embodiment, the invention provides a method of making an article of manufacture comprising contacting at least one resin composition with at least one olefin metathesis catalyst to form a catalyzed resin composition, contacting the catalyzed resin composition with a substrate material, and subjecting the catalyzed resin composition to conditions effective to promote an olefin metathesis reaction of the catalyzed resin composition, where the at least one resin composition comprises at least one cyclic olefin and at least one adhesion promoter composition, where the at least one adhesion promoter composition comprises a pre-reacted mixture of at least one compound containing at least two isocyanate groups and at least one compound comprising at least one heteroatom-containing functional group and at least one metathesis active olefin, and where the at least one adhesion promoter composition possesses in-resin storage stability.

In another embodiment, the invention provides a method of making an article of manufacture comprising contacting at least one resin composition with at least one olefin metathesis catalyst to form a catalyzed resin composition, contacting the catalyzed resin composition with a substrate material, and subjecting the catalyzed resin composition to conditions effective to promote an olefin metathesis reaction of the catalyzed resin composition, where the at least one resin composition comprises at least one cyclic olefin and at least one storage stable adhesion promoter composition, where the at least one storage stable adhesion promoter composition comprises a pre-reacted mixture of at least one compound containing at least two isocyanate groups and at least one compound comprising at least one heteroatom-containing functional group and at least one metathesis active olefin, and where the at least one storage stable adhesion promoter composition possesses in-resin storage stability.

In another embodiment, the invention provides an adhesion promoter composition comprising at least one compound containing at least two isocyanate groups, and at least one compound comprising at least one heteroatom-containing functional group and at least one metathesis active olefin.

In another embodiment, the invention provides a storage stable adhesion promoter composition comprising at least one compound containing at least two isocyanate groups, and at least one compound comprising at least one heteroatom-containing functional group and at least one metathesis active olefin.

In another embodiment, the invention provides an adhesion promoter composition comprising at least one compound containing at least two isocyanate groups, and at least one compound comprising at least one heteroatom-containing functional group and at least one metathesis active olefin, where the adhesion promoter composition possesses in-resin storage stability when added to a resin composition, where the resin composition comprises at least one cyclic olefin.

In another embodiment, the invention provides a storage stable adhesion promoter composition comprising at least one compound containing at least two isocyanate groups, and at least one compound comprising at least one heteroatom-containing functional group and at least one metathesis active olefin, where the storage stable adhesion promoter composition possesses in-resin storage stability when added to a resin composition, where the resin composition comprises at least one cyclic olefin.

The invention is further directed to a resin composition, for example a ROMP composition, of a cyclic olefin, which may be functionalized or unfunctionalized and may be substituted or unsubstituted, an olefin metathesis catalyst (e.g., a cyclic olefin metathesis catalyst), a substrate material, and an adhesion promoter composition of the invention. The inventive resin compositions are easy to handle and use, and when combined with a substrate material and cured, form resin substrate composite materials with improved properties. The resin compositions may also be contacted with a substrate material, rather than, or in addition to the substrate material added to the resin composition, and then subjected to conditions effective to promote an olefin metathesis reaction of the cyclic olefin in the presence of the olefin metathesis catalyst, the adhesion promoter composition according to the invention, and the optional added substrate material and/or in contact with the substrate material.

The invention is further directed to a resin composition, for example, a ROMP composition, of a cyclic olefin, which may be functionalized or unfunctionalized and may be substituted or unsubstituted, an olefin metathesis catalyst, an adhesion promoter composition of the invention, and a substrate material, such as, for example, a glass substrate material or a carbon substrate material. The adhesion promoter composition of the invention should be present in an amount effective to increase the adhesion of the resin composition to a substrate material when the resin composition is subjected to metathesis catalysis conditions in the presence of the substrate material.

The adhesion promoter composition may also comprise a pre-reacted mixture of more than one compound containing at least two isocyanate groups and more than one compound comprising a heteroatom-containing functional group and a metathesis active olefin. Furthermore, the compound comprising a heteroatom-containing functional group and a metathesis active olefin, may possess more than one heteroatom containing functional group and more than one metathesis active olefin.

The addition of the adhesion promoter composition according to the invention provides beneficial improvements in the adhesion of an olefin metathesis (e.g., ROMP) composition to the substrate material, such as, for example, a glass substrate material or a carbon substrate material, as compared to a resin composition that is the same with the exception that the adhesion promoter composition according to the invention is not included.

These and other aspects of the invention will be apparent to the skilled artisan in light of the following detailed description and examples.

BRIEF DESCRIPTION OF THE DRAWINGS

FIG. 1 is a $^{13}$C NMR (CDCl$_3$, 100 MHz) spectrum of the ethylene bridge region of HENB from an HENB and liquid MDI (Mondur® MLQ) pre-reacted mixture at time zero, immediately after mixing.

FIG. 2 is a $^{13}$C NMR (CDCl$_3$, 100 MHz) spectrum of the ethylene bridge region of HENB from an HENB and liquid MDI (Mondur® MLQ) pre-reacted mixture five days after mixing.

DETAILED DESCRIPTION OF THE DISCLOSURE

Terminology and Definitions

Unless otherwise indicated, the invention is not limited to specific reactants, substituents, catalysts, resin compositions, reaction conditions, or the like, as such may vary. It is also to be understood that the terminology used herein is for the purpose of describing particular embodiments only and is not to be interpreted as being limiting.

As used in the specification and the appended claims, the singular forms "a," "an," and "the" include plural referents unless the context clearly dictates otherwise. Thus, for example, reference to "an α-olefin" includes a single α-olefin as well as a combination or mixture of two or more α-olefins, reference to "a substituent" encompasses a single substituent as well as two or more substituents, and the like.

As used in the specification and the appended claims, the terms "for example," "for instance," "such as," or "including" are meant to introduce examples that further clarify more general subject matter. Unless otherwise specified, these examples are provided only as an aid for understanding the invention, and are not meant to be limiting in any fashion.

In this specification and in the claims that follow, reference will be made to a number of terms, which shall be defined to have the following meanings:

The term "alkyl" as used herein refers to a linear, branched, or cyclic saturated hydrocarbon group typically although not necessarily containing 1 to about 24 carbon atoms, preferably 1 to about 12 carbon atoms, such as methyl, ethyl, n-propyl, isopropyl, n-butyl, isobutyl, t-butyl, octyl, decyl, and the like, as well as cycloalkyl groups such as cyclopentyl, cyclohexyl, and the like. Generally, although again not necessarily, alkyl groups herein contain 1 to about 12 carbon atoms. The term "lower alkyl" refers to an alkyl group of 1 to 6 carbon atoms, and the specific term "cycloalkyl" refers to a cyclic alkyl group, typically having 4 to 8, preferably 5 to 7, carbon atoms. The term "substituted alkyl" refers to alkyl substituted with one or more substituent groups, and the terms "heteroatom-containing alkyl" and "heteroalkyl" refer to alkyl in which at least one carbon atom is replaced with a heteroatom. If not otherwise indicated, the terms "alkyl" and "lower alkyl" include linear, branched, cyclic, unsubstituted, substituted, and/or heteroatom-containing alkyl and lower alkyl, respectively.

The term "alkylene" as used herein refers to a difunctional linear, branched, or cyclic alkyl group, where "alkyl" is as defined above.

The term "alkenyl" as used herein refers to a linear, branched, or cyclic hydrocarbon group of 2 to about 24 carbon atoms containing at least one double bond, such as ethenyl, n-propenyl, isopropenyl, n-butenyl, isobutenyl, octenyl, decenyl, tetradecenyl, hexadecenyl, eicosenyl, tetracosenyl, and the like. Preferred alkenyl groups herein contain 2 to about 12 carbon atoms. The term "lower alkenyl" refers to an alkenyl group of 2 to 6 carbon atoms, and the specific term "cycloalkenyl" refers to a cyclic alkenyl group, preferably having 5 to 8 carbon atoms. The term "substituted alkenyl" refers to alkenyl substituted with one or more substituent groups, and the terms "heteroatom-containing alkenyl" and "heteroalkenyl" refer to alkenyl in which at least one carbon atom is replaced with a heteroatom. If not otherwise indicated, the terms "alkenyl" and "lower alkenyl" include linear, branched, cyclic, unsubstituted, substituted, and/or heteroatom-containing alkenyl and lower alkenyl, respectively.

The term "alkenylene" as used herein refers to a difunctional linear, branched, or cyclic alkenyl group, where "alkenyl" is as defined above.

The term "alkynyl" as used herein refers to a linear or branched hydrocarbon group of 2 to about 24 carbon atoms containing at least one triple bond, such as ethynyl, n-propynyl, and the like. Preferred alkynyl groups herein contain 2 to about 12 carbon atoms. The term "lower alkynyl" refers to an alkynyl group of 2 to 6 carbon atoms. The term "substituted alkynyl" refers to alkynyl substituted with one or more substituent groups, and the terms "heteroatom-containing alkynyl" and "heteroalkynyl" refer to alkynyl in which at least one carbon atom is replaced with a heteroatom. If not otherwise indicated, the terms "alkynyl" and "lower alkynyl" include linear, branched, unsubstituted, substituted, and/or heteroatom-containing alkynyl and lower alkynyl, respectively.

The term "alkoxy" as used herein refers to an alkyl group bound through a single, terminal ether linkage; that is, an "alkoxy" group may be represented as —O-alkyl where alkyl is as defined above. A "lower alkoxy" group refers to an alkoxy group containing 1 to 6 carbon atoms. Analogously, "alkenyloxy" and "lower alkenyloxy" respectively refer to an alkenyl and lower alkenyl group bound through a single, terminal ether linkage, and "alkynyloxy" and "lower alkynyloxy" respectively refer to an alkynyl and lower alkynyl group bound through a single, terminal ether linkage.

The term "aryl" as used herein, and unless otherwise specified, refers to an aromatic substituent containing a single aromatic ring or multiple aromatic rings that are fused together, directly linked, or indirectly linked (such that the different aromatic rings are bound to a common group such as a methylene or ethylene moiety). Preferred aryl groups contain 5 to 24 carbon atoms, and particularly preferred aryl groups contain 5 to 14 carbon atoms. Exemplary aryl groups contain one aromatic ring or two fused or linked aromatic rings, e.g., phenyl, naphthyl, biphenyl, diphenylether, diphenylamine, benzophenone, and the like. "Substituted aryl" refers to an aryl moiety substituted with one or more substituent groups, and the terms "heteroatom-containing aryl" and "heteroaryl" refer to aryl substituents in which at least one carbon atom is replaced with a heteroatom, as will be described in further detail infra.

The term "aryloxy" as used herein refers to an aryl group bound through a single, terminal ether linkage, wherein "aryl" is as defined above. An "aryloxy" group may be represented as —O-aryl where aryl is as defined above. Preferred aryloxy groups contain 5 to 24 carbon atoms, and particularly preferred aryloxy groups contain 5 to 14 carbon atoms. Examples of aryloxy groups include, without limitation, phenoxy, o-halo-phenoxy, m-halo-phenoxy, p-halo-phenoxy, o-methoxy-phenoxy, m-methoxy-phenoxy, p-methoxy-phenoxy, 2,4-dimethoxy-phenoxy, 3,4,5-trimethoxy-phenoxy, and the like.

The term "alkaryl" refers to an aryl group with an alkyl substituent, and the term "aralkyl" refers to an alkyl group with an aryl substituent, wherein "aryl" and "alkyl" are as defined above. Preferred alkaryl and aralkyl groups contain 6 to 24 carbon atoms, and particularly preferred alkaryl and aralkyl groups contain 6 to 16 carbon atoms. Alkaryl groups include, without limitation, p-methylphenyl, 2,4-dimethylphenyl, p-cyclohexylphenyl, 2,7-dimethylnaphthyl, 7-cyclooctylnaphthyl, 3-ethyl-cyclopenta-1,4-diene, and the like. Examples of aralkyl groups include, without limitation, benzyl, 2-phenyl-ethyl, 3-phenyl-propyl, 4-phenyl-butyl, 5-phenyl-pentyl, 4-phenylcyclohexyl, 4-benzylcyclohexyl, 4-phenylcyclohexylmethyl, 4-benzylcyclohexylmethyl, and the like. The terms "alkaryloxy" and "aralkyloxy" refer to substituents of the formula —OR wherein R is alkaryl or aralkyl, respectively, as just defined.

The term "acyl" refers to substituents having the formula —(CO)-alkyl, —(CO)-aryl, —(CO)-aralkyl, —(CO)-alkaryl, —(CO)-alkenyl, or —(CO)-alkynyl, and the term "acyloxy" refers to substituents having the formula —O(CO)-alkyl, —O(CO)-aryl, —O(CO)-aralkyl, —O(CO)—alkaryl, —O(CO)-alkenyl, —O(CO)-alkynyl wherein "alkyl," "aryl," "aralkyl", alkaryl, alkenyl, and alkynyl are as defined above.

The terms "cyclic" and "ring" refer to alicyclic or aromatic groups that may or may not be substituted and/or heteroatom containing, and that may be monocyclic, bicyclic, or polycyclic. The term "alicyclic" is used in the conventional sense to refer to an aliphatic cyclic moiety, as opposed to an aromatic cyclic moiety, and may be monocyclic, bicyclic, or polycyclic.

The terms "halo" and "halogen" are used in the conventional sense to refer to a chloro, bromo, fluoro, or iodo substituent.

"Hydrocarbyl" refers to univalent hydrocarbyl radicals containing 1 to about 30 carbon atoms, preferably 1 to about 24 carbon atoms, most preferably 1 to about 12 carbon atoms, including linear, branched, cyclic, saturated, and unsaturated species, such as alkyl groups, alkenyl groups, alkynyl groups, aryl groups, and the like. The term "lower hydrocarbyl" intends a hydrocarbyl group of 1 to 6 carbon atoms, preferably 1 to 4 carbon atoms, and the term "hydrocarbylene" refers to a divalent hydrocarbyl moiety containing 1 to about 30 carbon atoms, preferably 1 to about 24 carbon atoms, most preferably 1 to about 12 carbon atoms, including linear, branched, cyclic, saturated, and unsaturated species. The term "lower hydrocarbylene" refers to a hydrocarbylene group of 1 to 6 carbon atoms. "Substituted hydrocarbyl" refers to hydrocarbyl substituted with one or more substituent groups, and the terms "heteroatom-containing hydrocarbyl" and "heterohydrocarbyl" refer to hydrocarbyl in which at least one carbon atom is replaced with a heteroatom. Similarly, "substituted hydrocarbylene" refers to hydrocarbylene substituted with one or more substituent groups, and the terms "heteroatom-containing hydrocarbylene" and "heterohydrocarbylene" refer to hydrocarbylene in which at least one carbon atom is replaced with a heteroatom. Unless otherwise indicated, the term "hydrocarbyl" and "hydrocarbylene" are to be interpreted as including substituted and/or heteroatom-containing hydrocarbyl and heteroatom-containing hydrocarbylene moieties, respectively.

The term "heteroatom-containing" as in a "heteroatom-containing hydrocarbyl group" refers to a hydrocarbon molecule or a hydrocarbyl molecular fragment in which one or more carbon atoms is replaced with an atom other than carbon, e.g., nitrogen, oxygen, sulfur, phosphorus, or silicon, typically nitrogen, oxygen, or sulfur. Similarly, the term "heteroalkyl" refers to an alkyl substituent that is heteroatom-containing, the term "heterocyclic" refers to a cyclic substituent that is heteroatom-containing, the terms "heteroaryl" and "heteroaromatic" respectively refer to "aryl" and "aromatic" substituents that are heteroatom-containing, and the like. It should be noted that a "heterocyclic" group or compound may or may not be aromatic, and further that "heterocycles" may be monocyclic, bicyclic, or polycyclic as described above with respect to the term "aryl." Examples of heteroalkyl groups include without limitation alkoxyaryl, alkylsulfanyl-substituted alkyl, N-alkylated amino alkyl, and the like. Examples of heteroaryl substituents include without limitation pyrrolyl, pyrrolidinyl, pyridinyl, quinolinyl, indolyl, pyrimidinyl, imidazolyl, 1,2,4-triazolyl, tetrazolyl, etc., and examples of heteroatom-containing alicyclic groups include without limitation pyrrolidino, morpholino, piperazino, piperidino, etc.

By "substituted" as in "substituted hydrocarbyl," "substituted alkyl," "substituted aryl," and the like, as alluded to in some of the aforementioned definitions, is meant that in the hydrocarbyl, alkyl, aryl, or other moiety, at least one hydrogen atom bound to a carbon (or other) atom is replaced with one or more non-hydrogen substituents. Examples of such substituents include, without limitation: functional groups referred to herein as "Fn," such as halo, hydroxyl, sulfhydryl, $C_1$-$C_{24}$ alkoxy, $C_2$-$C_{24}$ alkenyloxy, $C_2$-$C_{24}$ alkynyloxy, $C_5$-$C_{24}$ aryloxy, $C_6$-$C_{24}$ aralkyloxy, $C_6$-$C_{24}$ alkaryloxy, acyl (including $C_2$-$C_{24}$ alkylcarbonyl (—CO-alkyl) and $C_6$-$C_{24}$ arylcarbonyl (—CO-aryl)), acyloxy (—O-acyl, including $C_2$-$C_{24}$ alkylcarbonyloxy (—O—CO-alkyl) and $C_6$-$C_{24}$ arylcarbonyloxy (—O—CO-aryl)), $C_2$-$C_{24}$ alkoxycarbonyl (—(CO)—O-alkyl), $C_6$-$C_{24}$ aryloxycarbonyl (—(CO)—O-aryl), halocarbonyl (—CO)—X where X is halo), $C_2$-$C_{24}$ alkylcarbonato (—O—(CO)—O-alkyl), $C_6$-$C_{24}$ arylcarbonato (—O—(CO)—O-aryl), carboxy (—COOH), carboxylato (—COO$^-$), carbamoyl (—(CO)—NH$_2$), mono-($C_1$-$C_{24}$ alkyl)-substituted carbamoyl (—(CO)—NH($C_1$-$C_{24}$ alkyl)), di-($C_1$-$C_{24}$ alkyl)-substituted carbamoyl (—(CO)—N($C_1$-$C_{24}$ alkyl)$_2$), mono-($C_1$-$C_{24}$ haloalkyl)-substituted carbamoyl (—(CO)—NH($C_1$-$C_{24}$ haloalkyl)), di-($C_1$-$C_{24}$ haloalkyl)-substituted carbamoyl (—(CO)—N($C_1$-$C_{24}$ haloalkyl)$_2$), mono-($C_5$-$C_{24}$ aryl)-substituted carbamoyl (—(CO)—NH-aryl), di-($C_5$-$C_{24}$ aryl)-substituted carbamoyl (—(CO)—N($C_5$-$C_{24}$ aryl)$_2$), di-N—($C_1$-$C_{24}$ alkyl), N—($C_5$-$C_{24}$ aryl)-substituted carbamoyl (—(CO)—N($C_1$-$C_{24}$ alkyl)($C_5$-$C_{24}$ aryl), thiocarbamoyl (—(CS)—NH$_2$), mono-($C_1$-$C_{24}$ alkyl)-substituted thiocarbamoyl (—(CS)—NH($C_1$-$C_{24}$ alkyl)), di-($C_1$-$C_{24}$ alkyl)-substituted thiocarbamoyl (—(CS)—N($C_1$-$C_{24}$ alkyl)$_2$), mono-($C_5$-$C_{24}$ aryl)-substituted thiocarbamoyl (—(CS)—NH-aryl), di-($C_5$-$C_{24}$ aryl)-substituted thiocarbamoyl (—(CS)—N($C_5$-$C_{24}$ aryl)$_2$), di-N—($C_1$-$C_{24}$ alkyl), N—($C_5$-$C_{24}$ aryl)-substituted thiocarbamoyl (—(CS)—N($C_1$-$C_{24}$ alkyl)($C_5$-$C_{24}$ aryl), carbamido (—NH—(CO)—NH$_2$), cyano (—C≡N), cyanato (—O—C≡N), thiocyanato (—S—C≡N), isocyanate (—N═C═O), thioisocyanate (—N═C═S), formyl (—(CO)—H), thioformyl (—(CS)—H), amino (—NH$_2$), mono-(C$_1$-C$_{24}$ alkyl)-substituted amino (—NH(C$_1$-C$_{24}$ alkyl), di-(C$_1$-C$_{24}$ alkyl)-substituted amino (—N(C$_1$-C$_{24}$ alkyl)$_2$), mono-(C$_5$-C$_{24}$ aryl)-substituted amino (—NH(C$_5$-C$_{24}$ aryl), di-(C$_5$-C$_{24}$ aryl)-substituted amino (—N(C$_5$-C$_{24}$ aryl)$_2$), C$_2$-C$_{24}$ alkylamido (—NH—(CO)-alkyl), C$_6$-C$_{24}$ arylamido (—NH—(CO)-aryl), imino (—CR═NH where R includes without limitation hydrogen, C$_1$-C$_{24}$ alkyl, C$_5$-C$_{24}$ aryl, C$_6$-C$_{24}$ alkaryl, C$_6$-C$_{24}$ aralkyl, etc.), C$_2$-C$_{20}$ alkylimino (—CR═N(alkyl), where R includes without limitation hydrogen, C$_1$-C$_{24}$ alkyl, C$_5$-C$_{24}$ aryl, C$_6$-C$_{24}$ alkaryl, C$_6$-C$_{24}$ aralkyl, etc.), arylimino (—CR═N(aryl), where R includes without limitation hydrogen, C$_1$-C$_{20}$ alkyl, C$_5$-C$_{24}$ aryl, C$_6$-C$_{24}$ alkaryl, C$_6$-C$_{24}$ aralkyl, etc.), nitro (—NO$_2$), nitroso (—NO), sulfo (—SO$_2$—OH), sulfonato (—SO$_2$—O), C$_1$-C$_{24}$ alkylsulfanyl (—S-alkyl; also termed "alkylthio"), C$_5$-C$_{24}$ arylsulfanyl (—S-aryl; also termed "arylthio"), C$_1$-C$_{24}$ alkylsulfinyl (—(SO)-alkyl), C$_5$-C$_{24}$ arylsulfinyl (—(SO)-aryl), C$_1$-C$_{24}$ alkylsulfonyl (—SO$_2$-alkyl), C$_1$-C$_{24}$ monoalkylaminosulfonyl (—SO$_2$—N(H) alkyl), C$_1$-C$_{24}$ dialkylaminosulfonyl (—SO$_2$—N(alkyl)$_2$), C$_5$-C$_{24}$ arylsulfonyl (—SO$_2$-aryl), boryl (—BH$_2$), borono (—B(OH)$_2$), boronato (—B(OR)$_2$ where R includes without limitation alkyl or other hydrocarbyl), phosphono (—P(O)(OH)$_2$), phosphonato (—P(O)(O)$_2$), phosphinato (—P(O)(O$^-$), phospho (—PO$_2$), and phosphino (—PH$_2$); and the hydrocarbyl moieties C$_1$-C$_{24}$ alkyl (preferably C$_1$-C$_{12}$ alkyl, more preferably C$_1$-C$_6$ alkyl), C$_2$-C$_{24}$ alkenyl (preferably C$_2$-C$_{12}$ alkenyl, more preferably C$_2$-C$_6$ alkenyl), C$_2$-C$_{24}$ alkynyl (preferably C$_2$-C$_{12}$ alkynyl, more preferably C$_2$-C$_6$ alkynyl), C$_5$-C$_{24}$ aryl (preferably C$_5$-C$_{14}$ aryl), C$_6$-C$_{24}$ alkaryl (preferably C$_6$-C$_{16}$ alkaryl), and C$_6$-C$_{24}$ aralkyl (preferably C$_6$-C$_{16}$ aralkyl).

By "functionalized" as in "functionalized hydrocarbyl," "functionalized alkyl," "functionalized olefin," "functionalized cyclic olefin," and the like, is meant that in the hydrocarbyl, alkyl, olefin, cyclic olefin, or other moiety, at least one hydrogen atom bound to a carbon (or other) atom is replaced with one or more functional groups such as those described hereinabove. The term "functional group" is meant to include any functional species that is suitable for the uses described herein. In particular, as used herein, a functional group would necessarily possess the ability to react with or bond to corresponding functional groups on a substrate surface.

In addition, the aforementioned functional groups may, if a particular group permits, be further substituted with one or more additional functional groups or with one or more hydrocarbyl moieties such as those specifically mentioned above. Analogously, the abovementioned hydrocarbyl moieties may be further substituted with one or more functional groups or additional hydrocarbyl moieties as noted above.

"Optional" or "optionally" means that the subsequently described circumstance may or may not occur, so that the description includes instances where the circumstance occurs and instances where it does not. For example, the phrase "optionally substituted" means that a non-hydrogen substituent may or may not be present on a given atom, and, thus, the description includes structures wherein a non-hydrogen substituent is present and structures wherein a non-hydrogen substituent is not present.

The term "substrate material" as used herein, is intended to generally mean any material that the resin compositions of the invention may be contacted with, applied to, or have the substrate material incorporated in to the resin. Without limitation, such materials include reinforcing materials, such as filaments, fibers, rovings, mats, weaves, fabrics, knitted material, cloth or other known structures, glass fibers and fabrics, carbon fibers and fabrics, aramid fibers and fabrics, and polyolefin or other polymer fibers or fabrics. Other suitable substrate materials include metallic density modulators, microparticulate density modulators, such as microspheres, and macroparticulate density modulators, such as glass or ceramic beads.

As used herein, the term "storage stable" means, by way of example, that an adhesion promoter composition will exhibit little or no changes in color, little or no changes in viscosity, little or no gel formation, and/or little or no loss of activity for at least 150 days, preferably for at least 90 days, and more preferably for at least 30 days, when stored in a sealed container under a dry, inert atmosphere (e.g., under argon or nitrogen) at normal storage, shipping, and use temperatures, which by way of example may vary from as low as −10° C. to as high as 60° C., preferably from 5° C. to 50° C., and more preferably from 15° C. to 40° C.

By way of example, the storage stability of adhesion promoter compositions may be measured by contacting an adhesion promoter composition with a resin composition comprising at least one cyclic olefin, using the resin composition to prepare polymer-matrix composites, and measuring the ILSS of the polymer-matrix composites. Adhesion promoter compositions which are storage stable will exhibit little or no decrease (loss) in measured ILSS values over some specified time period. Adhesion promoter compositions which are storage stable for at least 156 days have been prepared as shown herein by the measured ILSS values of polymer-matrix composites of Examples 32a-33a (Table 12).

As used herein, the term "dry" means a substantial absence of water, by way of example the water concentration may vary from 0 ppm to 70 ppm, from 5 ppm to 40 ppm, and from 10 ppm to 35 ppm.

As used herein, the term "in-resin storage stability" or "in-resin storage stable" means that an adhesion promoter composition, when contacted with or added to or combined with a resin composition comprising at least one cyclic olefin, exhibits little or no loss of activity for at least 150 days, preferably for at least 90 days, more preferably for at least 30 days, when the resin composition is stored in a sealed container under a dry, inert atmosphere (e.g., under argon or nitrogen) at normal storage, shipping, and use temperatures, which by way of example may vary from as low as −10° C. to as high as 60° C., preferably from 5° C. to 50° C., and more preferably from 15° C. to 40° C.

By way of example, the in-resin storage stability of adhesion promoter compositions may be measured by preparing polymer-matrix composites using a resin composition comprising at least one cyclic olefin and at least one adhesion promoter composition, and measuring the ILSS of the polymer-matrix composites. Adhesion promoter compositions having in-resin storage stability will exhibit little or no decrease (loss) in measured ILSS values over some specified time period. Adhesion promoter compositions having in-resin storage stability for at least 326 days have been prepared as shown herein by the as measured ILSS values of polymer-matrix composites of Examples 7a-7f (Table 3). Additionally, adhesion promoter compositions having in-resin storage stability for at least 202 days have been prepared as shown herein in by the as measured ILSS values of polymer-matrix composites of Examples 8a-8d (Table 4).

Adhesion Promoter

Adhesion promoters that may be used in the present invention disclosed herein are generally compounds containing at least two isocyanate groups such as, for example, methylene diphenyl diisocyanate and hexamethylene diisocyanate. The adhesion promoter may be a diisocyanate, triisocyanate, or polyisocyanate (i.e., containing four or more isocyanate groups). The adhesion promoter may be a mixture of at least one diisocyanate, triisocyanate, or polyisocyanate. In a more particular aspect of the invention, the adhesion promoter comprises, or is limited to, a diisocyanate compound, or mixtures of diisocyanate compounds.

In general, adhesion promoters that may be used in the present invention may be any compound having at least two isocyanate groups. Suitable adhesion promoters include, without limitation, isocyanate compounds comprising at least two isocyanate groups, and wherein the compounds are selected from hydrocarbyl, substituted hydrocarbyl, heteroatom-containing hydrocarbyl, substituted heteroatom-containing hydrocarbyl, and functionalized hydrocarbyl compounds. As described above, suitable hydrocarbyl adhesion promoter compounds generally include alkyl, cycloalkyl, alkylene, alkenyl, alkynyl, aryl, cycloalkyl, alkyaryl, and aralkyl compounds. Substituted heteroatom-containing, and functionalized hydrocarbyl adhesion promoter compounds include the afore-mentioned hydrocarbyl compounds, as well as the variations thereof noted hereinabove.

Adhesion promoters that may be used in the present invention may be an alkyl diisocyanate. An alkyl diisocyanate refers to a linear, branched, or cyclic saturated or unsaturated hydrocarbon group typically although not necessarily containing 1 to about 24 carbon atoms, preferably a diisocyanate containing 2 to about 12 carbon atoms, and more preferably a diisocyanate containing 6 to 12 carbon atoms such as hexamethylene diisocyanate (HDI), octamethylene diisocyanate, decamethylene diisocyanate, and the like. Cycloalkyl diisocyanates contain cyclic alkyl group, typically having 4 to 16 carbon atoms. A preferred cycloalkyl diisocyanate containing 6 to about 12 carbon atoms are cyclohexyl, cyclooctyl, cyclodecyl, and the like. A more preferred cycloalkyl diisocyanate originates as a condensation product of acetone called 5-isocyanato-1-(isocyanatomethyl)-1,3,3-trimethyl-cyclohexane, commonly known as Isophorone diisocyanate (IPDI) and the isomers of isocyanato-[(isocyanatocyclohexyl)methyl]cyclohexane ($H_{12}$MDI). $H_{12}$MDI is derived from the hydrogenated form of the aryl diisocyanate methylene diphenyl diisocyanate (MDI).

Adhesion promoters that may be used in the present invention may also be an aryl diisocyanate. Aryl diisocyanates refers to aromatic diisocyanates containing a single aromatic ring or multiple aromatic rings that are fused together, directly linked, or indirectly linked (such that the different aromatic rings are bound to a common group such as a methylene or ethylene moiety). Preferred aryl diisocyanates contain 5 to 24 carbon atoms, and particularly preferred aryl diisocyanates contain 5 to 14 carbon atoms. Exemplary aryl diisocyanates contain one aromatic ring or two fused or linked aromatic rings, e.g., phenyl, tolyl, xylyl, napthyl, biphenyl, diphenylether, benzophenone, and the like. Preferred aromatic diisocyanates include toluene diisocyanates, xylene diisocyanate, xylylene diisocyanate, tetramethylxylylene diisocyanate (TMXDI), and methylene diphenyl diisocyanate (MDI), which may comprise any mixture of its three isomers, 2.2'-MDI, 2,4'-MDI, and 4,4'-MDI.

Adhesion promoters that may be used in the present invention may be a polymer-containing isocyanate, such as, for example, diisocyanates. Polymer-containing isocyanates refers to a polymer-containing two or more terminal and/or pendant alkyl or aryl isocyanate groups. The polymer-containing isocyanates generally have to have a minimal solubility in the resin to provide improved mechanical properties. Preferred polymer-containing isocyanates include, but are not limited to, PM200 (poly MDI), Lupranate® (poly MDI from BASF), Krasol® isocyanate terminated polybutadiene prepolymers, such as, for example, Krasol® LBD2000 (TDI based), Krasol® LBD3000 (TDI based), Krasol® NN-22 (MDI based), Krasol® NN-23 (MDI based), Krasol® NN-25 (MDI based), and the like. Krasol® isocyanate terminated polybutadiene prepolymers are available from Cray Valley.

Adhesion promoters that may be used in the present invention may be a trimer of alkyl diisocyanates and aryl diisocyanates. In its simplest form, any combination of polyisocyanate compounds may be trimerized to form an isocyanurate ring containing isocyanate functional groups. Trimers of alkyl diisocyanate and aryl diisocyanates may also be referred to as isocyanurates of alkyl diisocyanate or aryl diisocyanate. Preferred alkyl diisocyanate and aryl diisocyanate trimers include, but are not limited to, hexamethylene diisocyanate trimer (HDIt), isophorone diisocyanate trimer, toluene diisocyanate trimer, tetramethylxylene diisocyanate trimer, methylene diphenyl diisocyanate trimers, and the like. More preferred adhesion promoters are toluene diisocyanates, tetramethylxylylene diisocyanate (e.g., TMXDI® diisocyanate from Cytec Industries Inc.), and methylene diphenyl diisocyanate (MDI) including any mixture of its three isomers 2.2'-MDI, 2,4'-MDI and 4,4'-MDI; liquid MDI; solid MDI; hexamethylenediisocyanatetrimer (HDIt); hexamethylenediisocyanate (HDI); isophorone diisocyanate (IPDI); 4,4'-methylene bis(cyclohexyl isocyanate) ($H_{12}$MDI); polymeric MDI (PM200); MDI prepolymer (Lupranate® 5080); liquid carbodiimide modified 4,4'-MDI (Lupranate® MM103); liquid MDI (Lupranate® MI); liquid MDI (Mondur® ML); and liquid MDI (Mondur® MLQ). Even more preferred adhesion promoters are methylene diphenyl diisocyanate (MDI) including any mixture of its three isomers 2,2'-MDI, 2,4'-MDI and 4,4'-MDI; liquid MDI; solid MDI; hexamethylenediisocyanatetrimer (HDIt); hexamethylene diisocyanate (HDI); isophorone diisocyanate (IPDI); 4,4'-methylene bis(cyclohexyl isocyanate) ($H_{12}$MDI); polymeric MDI (PM200); MDI prepolymer (Lupranate® 5080); liquid carbodiimide modified 4,4'-MDI (Lupranate® MM103); liquid MDI (Lupranate® MI); liquid MDI (Mondur® ML); liquid MDI (Mondur® MLQ).

A compound containing at least two isocyanate groups is combined with a compound comprising a heteroatom-containing functional group and a metathesis active olefin and pre-reacted providing an adhesion promoter composition having in-resin storage stability and providing an olefin metathesis composite with improved mechanical properties. Any concentration of a compound containing at least two isocyanate groups is sufficient for use in preparing adhesion promoter compositions of the invention, where the mol % or mol equivalents of a compound containing at least two isocyanate groups used to form the pre-reacted mixture is greater than the mol % or mol equivalents of a compound comprising a heteroatom-containing functional group and a metathesis active olefin used to form the pre-reacted mixture. Mol ratios of a compound comprising a heteroatom-containing functional group and a metathesis active olefin relative to a compound containing at least two isocyanate groups range from 0.001:1 to 0.90:1. Preferred mol ratios of a compound comprising a heteroatom-containing functional group and a metathesis active olefin relative to a compound containing at least two isocyanate groups range from 0.01:1 to 0.75:1, particularly 0.01:1 to 0.5:1, more particularly 0.02:1 to 0.25:1. One skilled in the art will recognize that the optimal ratio of a compound comprising a heteroatom-containing functional group and a metathesis active olefin to a compound containing at least two isocyanate groups may need to be adjusted as a function of the amount of adhesion promoter composition added to the cyclic olefin resin composition.

Compounds Comprising a Heteroatom-Containing Functional Group and a Metathesis Active Olefin The compound comprising a heteroatom-containing functional group and a metathesis active olefin typically contains between 2 and 20 carbons with hydroxyl, amine, thiol, phosphorus, or silane functional groups. Compounds comprising a heteroatom-containing functional group and a metathesis active olefin that may be used in the present invention disclosed herein are generally compounds containing at least one heteroatom containing functional group and at least one metathesis active olefin and are of the following general structure:

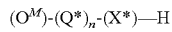

wherein $O^M$, $Q^*$, and $X^*$ are as follows:

$O^M$ is a metathesis active olefin fragment selected from cyclic olefins and acyclic olefins, where the carbon-carbon double bond typically is not tetra-substituted (e.g., at least one substituent is a hydrogen);

$Q^*$ is an optional linker group (e.g., n=0 or 1) such as, for example, a hydrocarbylene (including, for example, substituted hydrocarbylene, heteroatom-containing hydrocarbylene, and substituted heteroatom-containing hydrocarbylene, such as substituted and/or heteroatom-containing alkylene) or —(CO)— group; and $X^*$ is oxygen, sulfur, or a heteroatom-containing fragment such as $N(R^X)$, $P(R^X)$, $OP(R^X)$, $OP(R^X)O$, $OP(OR^X)O$, $P(\!=\!O)(R^X)$, $OP(\!=\!O)(R^X)$, $OP(\!=\!O)(R^X)O$, $OP(\!=\!O)(OR^X)O$, $Si(R^X)_2$, $Si(R^X)_2O$, $Si(OR^X)_2O$, or $Si(R^X)(OR^X)O$, wherein each $R^X$ is, independent of one another, a hydrogen or a hydrocarbyl group optionally comprising further functional groups. Each $R^X$ is, independent of one another, most commonly a hydrogen, aryl, or lower alkyl group.

Metathesis active olefins include cyclic olefins as described herein, where such cyclic olefins may be optionally substituted, optionally heteroatom-containing, mono-unsaturated, di-unsaturated, or poly-unsaturated $C_5$ to $C_{24}$ hydrocarbons that may be mono-, di-, or poly-cyclic. The cyclic olefin may generally be any strained or unstrained cyclic olefin, provided the cyclic olefin is able to participate in a ROMP reaction either individually or as part of a ROMP cyclic olefin composition. Metathesis active olefins also include acyclic olefins, where such acyclic olefins may be optionally substituted, optionally heteroatom-containing, mono-unsaturated, di-unsaturated, or poly-unsaturated $C_2$ to $C_{30}$ hydrocarbons, typically $C_2$ to $C_{20}$ hydrocarbons, or more typically $C_2$ to $C_{12}$ hydrocarbons. Acyclic olefins may contain one or more terminal olefins and/or one or more internal olefins, and/or any combination of terminal olefins and/or internal olefins.

In the heteroatom-containing functional group, $X^*$ is commonly oxygen, sulfur, or $NR^X$ and is most commonly oxygen, i.e., a hydroxy-substituted olefin. Preferred compounds comprising a heteroatom-containing functional group and a metathesis active olefin include, but are not limited to, 5-norbornene-2-methanol (NB-MeOH); 2-hydroxyethyl bicycle[2.2.1]hept-2-ene-carboxylate (HENB); 2-hydroxyethyl acrylate (HEA); allyl alcohol; oleyl alcohol; 9-decen-1-ol; vinyl alcohol, allyl alcohol, cis-13-dodecenol, and trans-9-octadecenol, and other unsaturated alcohols, norbornyl alcohol, 2-cycloocten-1-ol, 2-cyclooctadiene-1-ol, and p-vinyl phenol, and other alcohols which have an alicyclic structure; 2-hydroxyethyl methacrylate; 2-hydroxy-3-acryloxypropyl methacrylate, ethoxylated hydroxyethyl acrylate, ethoxylated hydroxyethyl methacrylate, polypropyleneglycol monomethacrylate, polypropylene glycol monoacrylate, phenol acrylate, phenol methacrylate, bisphenol A type epoxy acrylate, novolac type epoxy acrylate, and brominated bisphenol A type epoxy acrylate, and other methacrylics or acrylics which have one or more methacryl or acryl groups and hydroxyl groups, etc.

The compound comprising a heteroatom-containing functional group and a metathesis active olefin is combined with a compound containing at least two isocyanate groups and pre-reacted providing an adhesion promoter composition having in-resin storage stability and providing an olefin metathesis composite with improved mechanical properties. Any concentration of a compound comprising a heteroatom-containing functional group and a metathesis active olefin is sufficient for use in preparing adhesion promoter compositions of the invention, where the mol % or mol equivalents of a compound comprising a heteroatom-containing functional group and a metathesis active olefin used to form the pre-reacted mixture is less than the mol % or mol equivalents of a compound containing at least two isocyanate groups used to form the pre-reacted mixture. Mol ratios of a compound comprising a heteroatom-containing functional group and a metathesis active olefin relative to a compound containing at least two isocyanate groups range from 0.001:1 to 0.90:1. Preferred mol ratios of a compound comprising a heteroatom-containing functional group and a metathesis active olefin relative to a compound containing at least two isocyanate groups range from 0.01:1 to 0.75:1, particularly 0.01:1 to 0.5:1, more particularly 0.02:1 to 0.25:1. One skilled in the art will recognize that the optimal ratio of a compound comprising a heteroatom-containing functional group and a metathesis active olefin to a compound containing at least two isocyanate groups may need to be adjusted as a function of the amount of adhesion promoter composition added to the cyclic olefin resin composition.

Adhesion Promoter Compositions

Adhesion promoter compositions that may be used in the present invention disclosed herein are generally compositions comprising at least one adhesion promoter, discussed supra (i.e., at least one compound containing at least two isocyanate groups (e.g., methylene diphenyl diisocyanate, hexamethylene diisocyanate)) and at least one compound comprising a heteroatom-containing functional group and a metathesis active olefin, discussed supra (e.g., 2-hydroxyethyl bicyclo[2.2.1]hept-2-ene-5-carboxylate (HENB), 2-hydroxyethyl acrylate (HEA), oleyl alcohol, 9-decen-1-ol), where the compounds may be combined in various ratios to form a pre-reacted mixture, wherein the pre-reacted mixture is then subsequently added to a cyclic olefin resin composition, and where the adhesion promoter composition possesses in-resin storage stability. Furthermore, adhesion promoter compositions of the invention may also be storage stable.

Compounds containing at least two isocyanate groups and compounds comprising a heteroatom-containing functional group and a metathesis active olefin useful for preparing adhesion promoter compositions of the invention are disclosed herein.

Preferred adhesion promoter compositions include pre-reacted mixtures of liquid MDI (Mondur® MLQ) and 2-hydroxyethyl bicycle[2.2.1]hept-2-ene-carboxylate (HENB); pre-reacted mixtures of liquid MDI (Mondur® MLQ) and 2-hydroxyethyl acrylate (HEA); pre-reacted mixtures of liquid MDI (Mondur® MLQ) and oleyl alcohol; and pre-reacted mixtures of liquid MDI (Mondur® MLQ) and 9-decen-1-ol.

More preferred adhesion promoter compositions include prereacted mixtures of liquid MDI (Mondur® MLQ) and 2-hydroxyethyl bicycle[2.2.1]hept-2-ene-carboxylate (HENB).

Any concentration of adhesion promoter composition which improves the mechanical properties of the olefin composite is sufficient for the invention. In general, suitable amounts of adhesion promoter composition range from 0.001-50 phr, particularly 0.05-10 phr, more particularly 0.1-10 phr, or even more particularly, 0.5-4.0 phr.

Substrate Surfaces

The present invention is generally suitable for use with any substrate material in which the addition of an adhesion promoter composition of the invention provides beneficial improvements in the adhesion of a resin (e.g., ROMP) composition to the substrate material as compared to a resin composition that is the same with the exception that the adhesion promoter composition of the invention is not included. Furthermore, the present invention is generally suitable for use with any substrate material in which the addition of an adhesion promoter composition of the invention provides beneficial improvements in the adhesion of a polymer-matrix (e.g., ROMP polymer-matrix) to a substrate material compared to a polymer-matrix that is the same with the exception that the adhesion promoter composition of the invention is not included. The present invention is particularly beneficial for use with glass and carbon material surfaces suitable for use with epoxy and methacrylate resins, including those containing finishes or sizings, in which case the finishes or sizings do not need to be removed (e.g., by washing or heat cleaning) for the inventive adhesion promoter compositions to be effective. The present invention is also suitable for use with wood and aluminum materials. Suitable substrate materials may also be selected from fibrous, woven, microparticulate, ceramic, metal, polymer, and semiconductor materials. A polymer-matrix composite (e.g., ROMP polymer matrix composite) may be comprised of one substrate material or a mixture of different substrate materials.

Cyclic Olefin

Resin compositions that may be used with the present invention disclosed herein comprise one or more cyclic olefins. In general, any cyclic olefin suitable for the metathesis reactions disclosed herein may be used. Such cyclic olefins may be optionally substituted, optionally heteroatom-containing, mono-unsaturated, di-unsaturated, or poly-unsaturated $C_5$ to $C_{24}$ hydrocarbons that may be mono-, di-, or poly-cyclic. The cyclic olefin may generally be any strained or unstrained cyclic olefin, provided the cyclic olefin is able to participate in a ROMP reaction either individually or as part of a ROMP cyclic olefin composition. While certain unstrained cyclic olefins such as cyclohexene are generally understood to not undergo ROMP reactions by themselves, under appropriate circumstances, such unstrained cyclic olefins may nonetheless be ROMP active. For example, when present as a co-monomer in a ROMP composition, unstrained cyclic olefins may be ROMP active. Accordingly, as used herein and as would be appreciated by the skilled artisan, the term "unstrained cyclic olefin" is intended to refer to those unstrained cyclic olefins that may undergo a ROMP reaction under any conditions, or in any ROMP composition, provided the unstrained cyclic olefin is ROMP active.

In general, the cyclic olefin may be represented by the structure of formula (A)

(A)

wherein J, $R^{41}$, and $R^{42}$ are as follows:

$R^{41}$ and $R^{42}$ is selected independently from the group consisting of hydrogen, hydrocarbyl (e.g., $C_1$-$C_{20}$ alkyl, $C_5$-$C_{20}$ aryl, $C_5$-$C_{30}$ aralkyl, or $C_5$-$C_{30}$ alkaryl), substituted hydrocarbyl (e.g., substituted $C_1$-$C_{20}$ alkyl, $C_5$-$C_{20}$ aryl, $C_5$-$C_{30}$ aralkyl, or $C_5$-$C_{30}$ alkaryl), heteroatom-containing hydrocarbyl (e.g., $C_1$-$C_{20}$ heteroalkyl, $C_5$-$C_{20}$ heteroaryl, heteroatom-containing $C_5$-$C_{30}$ aralkyl, or heteroatom-containing $C_5$-$C_{30}$ alkaryl), and substituted heteroatom-containing hydrocarbyl (e.g., substituted $C_1$-$C_{20}$ heteroalkyl, $C_5$-$C_{20}$ heteroaryl, heteroatom-containing $C_5$-$C_{30}$ aralkyl, or heteroatom-containing $C_5$-$C_{30}$ alkaryl) and, if substituted hydrocarbyl or substituted heteroatom-containing hydrocarbyl, wherein the substituents may be functional groups ("Fn") such as phosphonato, phosphoryl, phosphanyl, phosphino, sulfonato, $C_1$-$C_{20}$ alkylsulfanyl, $C_5$-$C_{20}$ arylsulfanyl, $C_1$-$C_{20}$ alkylsulfonyl, $C_5$-$C_{20}$ arylsulfonyl, $C_1$-$C_{20}$ alkylsulfinyl, $C_5$-$C_{20}$ arylsulfinyl, sulfonamido, amino, amido, imino, nitro, nitroso, hydroxyl, $C_1$-$C_{20}$ alkoxy, $C_5$-$C_{20}$ aryloxy, $C_2$-$C_{20}$ alkoxycarbonyl, $C_5$-$C_{20}$ aryloxycarbonyl, carboxyl, carboxylato, mercapto, formyl, $C_1$-$C_{20}$ thioester, cyano, cyanato, thiocyanato, isocyanate, thioisocyanate, carbamoyl, epoxy, styrenyl, silyl, silyloxy, silanyl, siloxazanyl, boronato, boryl, or halogen, or a metal-containing or metalloid-containing group (wherein the metal may be, for example, Sn or Ge). $R^{41}$ and $R^{42}$ may itself be one of the aforementioned groups, such that the Fn moiety is directly bound to the olefinic carbon atom indicated in the structure. In the latter case, however, the functional group will generally not be directly bound to the olefinic carbon through a heteroatom containing one or more lone pairs of electrons, e.g., an oxygen, sulfur, nitrogen, or phosphorus atom, or through an electron-rich metal or metalloid such as Ge, Sn, As, Sb, Se, Te, etc. With such functional groups, there will normally be an intervening linkage Z*, such that $R^{41}$ and/or $R^{42}$ then has the structure -(Z*)$_n$-Fn wherein n is 1, Fn is the functional group, and Z* is a hydrocarbylene linking group such as an alkylene, substituted alkylene, heteroalkylene, substituted heteroalkene, arylene, substituted arylene, heteroarylene, or substituted heteroarylene linkage.

J is a saturated or unsaturated hydrocarbylene, substituted hydrocarbylene, heteroatom-containing hydrocarbylene, or substituted heteroatom-containing hydrocarbylene linkage, wherein when J is substituted hydrocarbylene or substituted heteroatom-containing hydrocarbylene, the substituents may include one or more -(Z*)$_n$-Fn groups, wherein n is zero or 1, and Fn and Z* are as defined previously. Additionally, two or more substituents attached to ring carbon (or other) atoms within J may be linked to form a bicyclic or polycyclic olefin. J will generally contain in the range of approximately 5 to 14 ring atoms, typically 5 to 8 ring atoms, for a monocyclic olefin, and, for bicyclic and polycyclic olefins, each ring will generally contain 4 to 8, typically 5 to 7, ring atoms.

Mono-unsaturated cyclic olefins encompassed by structure (A) may be represented by the structure (B)

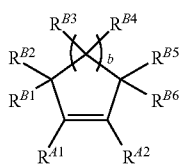

(B)

wherein b is an integer generally although not necessarily in the range of 1 to 10, typically 1 to 5, $R^{A1}$ and $R^{A2}$ are as defined above for structure (A), and $R^{B1}$, $R^{B2}$, $R^{B3}$, $R^{B4}$, $R^{B5}$, and $R^{B6}$ are independently selected from the group consisting of hydrogen, hydrocarbyl, substituted hydrocarbyl, heteroatom-containing hydrocarbyl, substituted heteroatom-containing hydrocarbyl and -(Z*)$_n$-Fn where n, Z* and Fn are as defined previously, and wherein if any of the $R^{B1}$ through $R^{B6}$ moieties is substituted hydrocarbyl or substituted heteroatom-containing hydrocarbyl, the substituents may include one or more -(Z*)$_n$-Fn groups. Accordingly, $R^{B1}$, $R^{B2}$, $R^{B3}$, $R^{B4}$, $R^{B5}$, and $R^{B6}$ may be, for example, hydrogen, hydroxyl, $C_1$-$C_{20}$ alkyl, $C_5$-$C_{20}$ aryl, $C_1$-$C_{20}$ alkoxy, $C_5$-$C_{20}$ aryloxy, $C_2$-$C_{20}$ alkoxycarbonyl, $C_5$-$C_{20}$ aryloxycarbonyl, amino, amido, nitro, etc. Furthermore, any of the $R^{B1}$, $R^{B2}$, $R^{B3}$, $R^{B4}$, $R^{B5}$, and $R^{B6}$ moieties can be linked to any of the other $R^{B1}$, $R^{B2}$, $R^{B3}$, $R^{B4}$, $R^{B5}$, and $R^{B6}$ moieties to provide a substituted or unsubstituted alicyclic group containing 4 to 30 ring carbon atoms or a substituted or unsubstituted aryl group containing 6 to 18 ring carbon atoms or combinations thereof and the linkage may include heteroatoms or functional groups, e.g., the linkage may include without limitation an ether, ester, thioether, amino, alkylamino, imino, or anhydride moiety. The alicyclic group can be monocyclic, bicyclic, or polycyclic. When unsaturated the cyclic group can contain monounsaturation or multiunsaturation, with monounsaturated cyclic groups being preferred. When substituted, the rings contain mono-substitution or multisubstitution wherein the substituents are independently selected from hydrogen, hydrocarbyl, substituted hydrocarbyl, heteroatom-containing hydrocarbyl, substituted heteroatom-containing hydrocarbyl, -(Z*)$_n$-Fn where n is zero or 1, Z* and Fn are as defined previously, and functional groups (Fn) provided above.

Examples of monounsaturated, monocyclic olefins encompassed by structure (B) include, without limitation, cyclopentene, cyclohexene, cycloheptene, cyclooctene, cyclononene, cyclodecene, cycloundecene, cyclododecene, tricyclodecene, tetracyclodecene, octacyclodecene, and cycloeicosene, and substituted versions thereof such as 1-methylcyclopentene, 1-ethylcyclopentene, 1-isopropylcyclohexene, 1-chloropentene, 1-fluorocyclopentene, 4-methylcyclopentene, 4-methoxy-cyclopentene, 4-ethoxy-cyclopentene, cyclopent-3-ene-thiol, cyclopent-3-ene, 4-methylsulfanyl-cyclopentene, 3-methylcyclohexene, 1-methylcyclooctene, 1,5-dimethylcyclooctene, etc.

Monocyclic diene reactants encompassed by structure (A) may be generally represented by the structure (C)

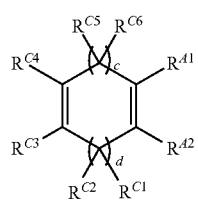

(C)

wherein c and d are independently integers in the range of 1 to about 8, typically 2 to 4, preferably 2 (such that the reactant is a cyclooctadiene), $R^{A1}$ and $R^{A2}$ are as defined above for structure (A), and $R^{C1}$, $R^{C2}$, $R^{C3}$, $R^{C4}$, $R^{C5}$, and $R^{C6}$ are defined as for $R^{B1}$ through $R^{B6}$. In this case, it is preferred that $R^{C3}$ and $R^{C4}$ be non-hydrogen substituents, in which case the second olefinic moiety is tetrasubstituted. Examples of monocyclic diene reactants include, without limitation, 1,3-cyclopentadiene, 1,3-cyclohexadiene, 1,4-cyclohexadiene, 5-ethyl-1,3-cyclohexadiene, 1,3-cycloheptadiene, cyclohexadiene, 1,5-cyclooctadiene, 1,3-cyclooctadiene, and substituted analogs thereof. Triene reactants are analogous to the diene structure (C), and will generally contain at least one methylene linkage between any two olefinic segments.

Bicyclic and polycyclic olefins encompassed by structure (A) may be generally represented by the structure (D)

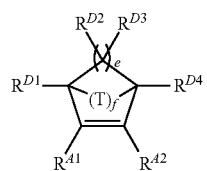

(D)

wherein $R^{A1}$ and $R^{A2}$ are as defined above for structure (A), $R^{D1}$, $R^{D2}$, $R^{D3}$, and $R^{D4}$ are as defined for $R^{B1}$ through $R^{B6}$, e is an integer in the range of 1 to 8 (typically 2 to 4) f is generally 1 or 2; T is lower alkylene or alkenylene (generally substituted or unsubstituted methyl or ethyl), CHR$^{G1}$, C(R$^{G1}$)$_2$, O, S, N—R$^{G1}$, P—R$^{G1}$, O=R—R$^{G1}$, Si(R$^{G1}$)$_2$, B—R$^{G1}$, or As—R$^{G1}$ where R$^{G1}$ is alkyl, alkenyl, cycloalkyl, cycloalkenyl, aryl, alkaryl, aralkyl, or alkoxy. Furthermore, any of the $R^{D1}$, $R^{D2}$, $R^{D3}$, and $R^{D4}$ moieties can be linked to any of the other $R^{D1}$, $R^{D2}$, $R^{D3}$, and $R^{D4}$ moieties to provide a substituted or unsubstituted alicyclic group containing 4 to 30 ring carbon atoms or a substituted or unsubstituted aryl group containing 6 to 18 ring carbon atoms or combinations thereof and the linkage may include heteroatoms or functional groups, e.g., the linkage may include without limitation an ether, ester, thioether, amino, alkylamino, imino, or anhydride moiety. The cyclic group can be monocyclic, bicyclic, or polycyclic. When unsaturated the cyclic group can contain monounsaturation or multiunsaturation, with monounsaturated cyclic groups being preferred. When substituted, the rings contain monosubstitution or multisubstitution wherein the substituents are independently selected from hydrogen, hydrocarbyl, substituted hydrocarbyl, heteroatom-containing hydrocarbyl, substituted heteroatom-containing hydrocarbyl, -(Z*)$_n$-Fn where n is zero or 1, Z* and Fn are as defined previously, and functional groups (Fn) provided above.

Cyclic olefins encompassed by structure (D) are in the norbornene family. As used herein, norbornene means any compound that includes at least one norbornene or substituted norbornene moiety, including without limitation norbornene, substituted norbornene(s), norbornadiene, substituted norbornadiene(s), polycyclic norbornenes, and substituted polycyclic norbornene(s). Norbornenes within this group may be generally represented by the structure (E)

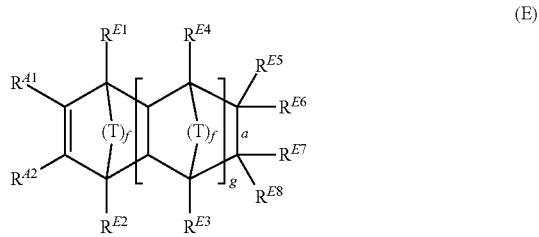

(E)

wherein $R^{41}$ and $R^{42}$ are as defined above for structure (A), T is as defined above for structure (D), $R^{E1}$, $R^{E2}$, $R^{E3}$, $R^{E4}$, $R^{E5}$, $R^{E6}$, $R^{E7}$, and $R^{E8}$ are as defined for $R^{B1}$ through $R^{B6}$, and "a" represents a single bond or a double bond, f is generally 1 or 2, "g" is an integer from 0 to 5, and when "a" is a double bond one of $R^{E5}$, $R^{E6}$ and one of $R^{E7}$, $R^{E8}$ is not present.

Furthermore, any of the $R^{E5}$, $R^{E6}$, $R^{E7}$, and $R^{E8}$ moieties can be linked to any of the other $R^{E5}$, $R^{E6}$, $R^{E7}$, and $R^{E8}$ moieties to provide a substituted or unsubstituted alicyclic group containing 4 to 30 ring carbon atoms or a substituted or unsubstituted aryl group containing 6 to 18 ring carbon atoms or combinations thereof and the linkage may include heteroatoms or functional groups, e.g., the linkage may include without limitation an ether, ester, thioether, amino, alkylamino, imino, or anhydride moiety. The cyclic group can be monocyclic, bicyclic, or polycyclic. When unsaturated the cyclic group can contain monounsaturation or multiunsaturation, with monounsaturated cyclic groups being preferred. When substituted, the rings contain monosubstitution or multisubstitution wherein the substituents are independently selected from hydrogen, hydrocarbyl, substituted hydrocarbyl, heteroatom-containing hydrocarbyl, substituted heteroatom-containing hydrocarbyl, -(Z*)$_n$-Fn where n is zero or 1, Z* and Fn are as defined previously, and functional groups (Fn) provided above.

More preferred cyclic olefins possessing at least one norbornene moiety have the structure (F):

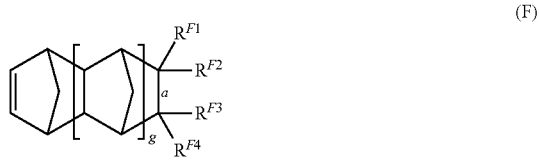

(F)

wherein $R^{F1}$, $R^{F2}$, $R^{F3}$, and $R^{F4}$ are as defined for $R^{B1}$ through $R^{B6}$, and "a" represents a single bond or a double bond, "g" is an integer from 0 to 5, and when "a" is a double bond one of $R^{F1}$, $R^{F2}$ and one of $R^{F3}$, $R^{F4}$ is not present.

Furthermore, any of the $R^{F1}$, $R^{F2}$, $R^{F3}$, and $R^{F4}$ moieties can be linked to any of the other $R^{F1}$, $R^{F2}$, $R^{F3}$, and $R^{F4}$ moieties to provide a substituted or unsubstituted alicyclic group containing 4 to 30 ring carbon atoms or a substituted or unsubstituted aryl group containing 6 to 18 ring carbon atoms or combinations thereof and the linkage may include heteroatoms or functional groups, e.g., the linkage may include without limitation an ether, ester, thioether, amino, alkylamino, imino, or anhydride moiety. The alicyclic group can be monocyclic, bicyclic, or polycyclic. When unsaturated the cyclic group can contain monounsaturation or multiunsaturation, with monounsaturated cyclic groups being preferred. When substituted, the rings contain monosubstitution or multisubstitution wherein the substituents are independently selected from hydrogen, hydrocarbyl, substituted hydrocarbyl, heteroatom-containing hydrocarbyl, substituted heteroatom-containing hydrocarbyl, -(Z*)$_n$-Fn where n is zero or 1, Z* and Fn are as defined previously, and functional groups (Fn) provided above.

One route for the preparation of hydrocarbyl substituted and functionally substituted norbornenes employs the Diels-Alder cycloaddition reaction in which cyclopentadiene or substituted cyclopentadiene is reacted with a suitable dienophile at elevated temperatures to form the substituted norbornene adduct generally shown by the following reaction Scheme 1:

SCHEME 1

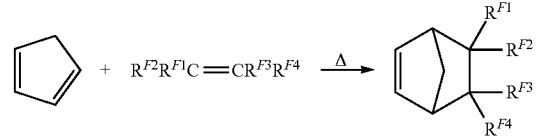

wherein $R^{F1}$ to $R^{F4}$ are as previously defined for structure (F).

Other norbornene adducts can be prepared by the thermal pyrolysis of dicyclopentadiene in the presence of a suitable dienophile. The reaction proceeds by the initial pyrolysis of dicyclopentadiene to cyclopentadiene followed by the Diels-Alder cycloaddition of cyclopentadiene and the dienophile to give the adduct shown below in Scheme 2:

SCHEME 2

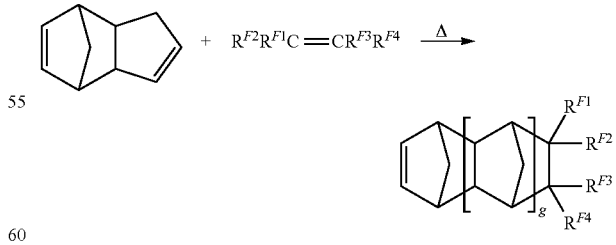

wherein "g" is an integer from 0 to 5, and $R^{F1}$ to $R^{F4}$ are as previously defined for structure (F).

Norbornadiene and higher Diels-Alder adducts thereof similarly can be prepared by the thermal reaction of cyclopentadiene and dicyclopentadiene in the presence of an acetylenic reactant as shown below in Scheme 3:

Scheme 3

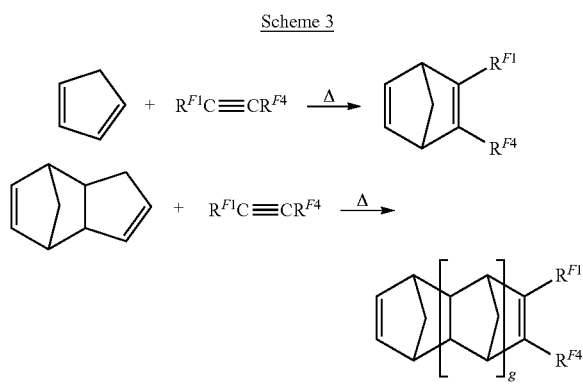

wherein "g" is an integer from 0 to 5, $R^{F1}$ and $R^{F4}$ are as previously defined for structure (F)

Examples of bicyclic and polycyclic olefins thus include, without limitation, dicyclopentadiene (DCPD); trimer and other higher order oligomers of cyclopentadiene including without limitation tricyclopentadiene (cyclopentadiene trimer), cyclopentadiene tetramer, and cyclopentadiene pentamer; ethylidenenorbornene; dicyclohexadiene; norbornene; 5-methyl-2-norbornene; 5-ethyl-2-norbornene; 5-isobutyl-2-norbornene; 5,6-dimethyl-2-norbornene; 5-phenylnorbornene; 5-benzylnorbornene; 5-acetylnorbornene; 5-methoxycarbonylnorbornene; 5-ethyoxycarbonyl-1-norbornene; 5-methyl-5-methoxy-carbonylnorbornene; 5-cyanonorbornene; 5,5,6-trimethyl-2-norbornene; cyclo-hexenylnorbornene; endo, exo-5,6-dimethoxynorbornene; endo, endo-5,6-dimethoxynorbornene; endo, exo-5,6-dimethoxycarbonylnorbornene; endo,endo-5,6-dimethoxycarbonylnorbornene; 2,3-dimethoxynorbornene; norbornadiene; tricycloundecene; tetracyclododecene; 8-methyltetracyclododecene; 8-ethyltetracyclododecene; 8-methoxycarbonyltetracyclododecene; 8-methyl-8-tetracyclododecene; 8-cyanotetracyclododecene; pentacyclopentadecene; pentacyclohexadecene; and the like, and their structural isomers, stereoisomers, and mixtures thereof. Additional examples of bicyclic and polycyclic olefins include, without limitation, $C_2$-$C_{12}$ hydrocarbyl substituted norbornenes such as 5-butyl-2-norbornene, 5-hexyl-2-norbornene, 5-octyl-2-norbornene, 5-decyl-2-norbornene, 5-dodecyl-2-norbornene, 5-vinyl-2-norbornene, 5-ethylidene-2-norbornene, 5-isopropenyl-2-norbornene, 5-propenyl-2-norbornene, and 5-butenyl-2-norbornene, and the like.

Preferred cyclic olefins include $C_5$ to $C_{24}$ unsaturated hydrocarbons. Also preferred are $C_5$ to $C_{24}$ cyclic hydrocarbons that contain one or more (typically 2 to 12) heteroatoms such as O, N, S, or P. For example, crown ether cyclic olefins may include numerous O heteroatoms throughout the cycle, and these are within the scope of the invention. In addition, preferred cyclic olefins are $C_5$ to $C_{24}$ hydrocarbons that contain one or more (typically 2 or 3) olefins. For example, the cyclic olefin may be mono-, di-, or tri-unsaturated. Examples of cyclic olefins include without limitation cyclooctene, cyclododecene, and (c,t,t)-1,5,9-cyclododecatriene.

The cyclic olefins may also comprise multiple (typically 2 or 3) rings. For example, the cyclic olefin may be mono-, di-, or tri-cyclic. When the cyclic olefin comprises more than one ring, the rings may or may not be fused. Preferred examples of cyclic olefins that comprise multiple rings include norbornene, dicyclopentadiene, tricyclopentadiene, and 5-ethylidene-2-norbornene.

The cyclic olefin may also be substituted, for example, a $C_5$ to $C_{24}$ cyclic hydrocarbon wherein one or more (typically 2, 3, 4, or 5) of the hydrogens are replaced with non-hydrogen substituents. Suitable non-hydrogen substituents may be chosen from the substituents described hereinabove. For example, functionalized cyclic olefins, i.e., $C_5$ to $C_{24}$ cyclic hydrocarbons wherein one or more (typically 2, 3, 4, or 5) of the hydrogens are replaced with functional groups, are within the scope of the invention. Suitable functional groups may be chosen from the functional groups described hereinabove. For example, a cyclic olefin functionalized with an alcohol group may be used to prepare a telechelic polymer comprising pendent alcohol groups. Functional groups on the cyclic olefin may be protected in cases where the functional group interferes with the metathesis catalyst, and any of the protecting groups commonly used in the art may be employed. Acceptable protecting groups may be found, for example, in Greene et al., Protective Groups in Organic Synthesis, 3rd Ed. (New York: Wiley, 1999). Examples of functionalized cyclic olefins include without limitation 2-hydroxymethyl-5-norbornene, 2-[(2-hydroxyethyl)carboxylate]-5-norbornene, cydecanol, 5-n-hexyl-2-norbornene, 5-n-butyl-2-norbornene.

Cyclic olefins incorporating any combination of the abovementioned features (i.e., heteroatoms, substituents, multiple olefins, multiple rings) are suitable for the methods disclosed herein. Additionally, cyclic olefins incorporating any combination of the abovementioned features (i.e., heteroatoms, substituents, multiple olefins, multiple rings) are suitable for the invention disclosed herein.

The cyclic olefins useful in the methods disclosed herein may be strained or unstained. It will be appreciated that the amount of ring strain varies for each cyclic olefin compound, and depends upon a number of factors including the size of the ring, the presence and identity of substituents, and the presence of multiple rings. Ring strain is one factor in determining the reactivity of a molecule towards ring-opening olefin metathesis reactions. Highly strained cyclic olefins, such as certain bicyclic compounds, readily undergo ring opening reactions with olefin metathesis catalysts. Less strained cyclic olefins, such as certain unsubstituted hydrocarbon monocyclic olefins, are generally less reactive. In some cases, ring opening reactions of relatively unstrained (and therefore relatively unreactive) cyclic olefins may become possible when performed in the presence of the olefinic compounds disclosed herein. Additionally, cyclic olefins useful in the invention disclosed herein may be strained or unstrained.

The resin compositions of the present invention may comprise a plurality of cyclic olefins. A plurality of cyclic olefins may be used to prepare metathesis polymers from the olefinic compound. For example, two cyclic olefins selected from the cyclic olefins described hereinabove may be employed in order to form metathesis products that incorporate both cyclic olefins. Where two or more cyclic olefins are used, one example of a second cyclic olefin is a cyclic alkenol, i.e., a $C_5$-$C_{24}$ cyclic hydrocarbon wherein at least one of the hydrogen substituents is replaced with an alcohol or protected alcohol moiety to yield a functionalized cyclic olefin.

The use of a plurality of cyclic olefins, and in particular when at least one of the cyclic olefins is functionalized, allows for further control over the positioning of functional groups within the products. For example, the density of cross-linking points can be controlled in polymers and macromonomers prepared using the methods disclosed herein. Control over the quantity and density of substituents and functional groups also allows for control over the physical properties (e.g., melting point, tensile strength, glass transition temperature, etc.) of the products. Control over these and other properties is possible for reactions using only a single cyclic olefin, but it will be appreciated that the use of a plurality of cyclic olefins further enhances the range of possible metathesis products and polymers formed.

More preferred cyclic olefins include dicyclopentadiene; tricyclopentadiene; dicyclohexadiene; norbornene; 5-methyl-2-norbornene; 5-ethyl-2-norbornene; 5-isobutyl-2-norbornene; 5,6-dimethyl-2-norbornene; 5-phenylnorbornene; 5-benzylnorbornene; 5-acetylnorbornene; 5-methoxycarbonylnorbornene; 5-ethoxycarbonyl-1-norbornene; 5-methyl-5-methoxy-carbonylnorbornene; 5-cyanonorbornene; 5,5,6-trimethyl-2-norbornene; cyclo-hexenylnorbornene; endo, exo-5,6-dimethoxynorbornene; endo, endo-5,6-dimethoxynorbornene; endo, exo-5-6-dimethoxycarbonylnorbornene; endo, endo-5,6-dimethoxycarbonylnorbornene; 2,3-dimethoxynorbornene; norbornadiene; tricycloundecene; tetracyclododecene; 8-methyltetracyclododecene; 8-ethyl-tetracyclododecene; 8-methoxycarbonyltetracyclododecene; 8-methyl-8-tetracyclo-dodecene; 8-cyanotetracyclododecene; pentacyclopentadecene; pentacyclohexadecene; higher order oligomers of cyclopentadiene such as cyclopentadiene tetramer, cyclopentadiene pentamer, and the like; and $C_2$-$C_{12}$ hydrocarbyl substituted norbornenes such as 5-butyl-2-norbornene; 5-hexyl-2-norbornene; 5-octyl-2-norbornene; 5-decyl-2-norbornene; 5-dodecyl-2-norbornene; 5-vinyl-2-norbornene; 5-ethylidene-2-norbornene; 5-isopropenyl-2-norbornene; 5-propenyl-2-norbornene; and 5-butenyl-2-norbornene, and the like. Even more preferred cyclic olefins include dicyclopentadiene, tricyclopentadiene, and higher order oligomers of cyclopentadiene, such as cyclopentadiene tetramer, cyclopentadiene pentamer, and the like, tetracyclododecene, norbornene, and $C_2$-$C_{12}$ hydrocarbyl substituted norbornenes, such as 5-butyl-2-norbornene, 5-hexyl-2-norbornene, 5-octyl-2-norbornene, 5-decyl-2-norbornene, 5-dodecyl-2-norbornene, 5-vinyl-2-norbornene, 5-ethylidene-2-norbornene, 5-isopropenyl-2-norbornene, 5-propenyl-2-norbornene, 5-butenyl-2-norbornene, and the like.

Olefin Metathesis Catalysts

An olefin metathesis catalyst that may be used in the invention disclosed herein, is preferably a Group 8 transition metal complex having the structure of formula (I)

in which:
M is a Group 8 transition metal;
$L^1$, $L^2$, and $L^3$ are neutral electron donor ligands;
n is 0 or 1, such that $L^3$ may or may not be present;
m is 0, 1, or 2;
k is 0 or 1;
$X^1$ and $X^2$ are anionic ligands; and
$R^1$ and $R^2$ are independently selected from hydrogen, hydrocarbyl, substituted hydrocarbyl, heteroatom-containing hydrocarbyl, substituted heteroatom-containing hydrocarbyl, and functional groups,
wherein any two or more of $X^1$, $X^2$, $L^1$, $L^2$, $L^3$, $R^1$, and $R^2$ can be taken together to form one or more cyclic groups, and further wherein any one or more of $X^1$, $X^2$, $L^1$, $L^2$, $L^3$, $R^1$, and $R^2$ may be attached to a support.

Additionally, in formula (I), one or both of $R^1$ and $R^2$ may have the structure —$(W)_n$—$U^+V^-$, in which W is selected from hydrocarbylene, substituted hydrocarbylene, heteroatom-containing hydrocarbylene, or substituted heteroatom-containing hydrocarbylene; U is a positively charged Group 15 or Group 16 element substituted with hydrogen, hydrocarbyl, substituted hydrocarbyl, heteroatom-containing hydrocarbyl, or substituted heteroatom-containing hydrocarbyl; V is a negatively charged counterion; and n is zero or 1. Furthermore, $R^1$ and $R^2$ may be taken together to form an indenylidene moiety. Additionally, $R^1$ and $R^2$ may be taken together to form a phenylindenylidene.

Preferred catalysts contain Ru or Os as the Group 8 transition metal, with Ru particularly preferred.

Numerous embodiments of the catalysts useful in the reactions disclosed herein are described in more detail infra. For the sake of convenience, the catalysts are described in groups, but it should be emphasized that these groups are not meant to be limiting in any way. That is, any of the catalysts useful in the invention may fit the description of more than one of the groups described herein.

A first group of catalysts, then, are commonly referred to as First Generation Grubbs-type catalysts, and have the structure of formula (I). For the first group of catalysts, M is a Group 8 transition metal, m is 0, 1, or 2, and n, $X^1$, $X^2$, $L^1$, $L^2$, $L^3$, $R^1$, and $R^2$ are described as follows.

For the first group of catalysts, n is 0, and $L^1$ and $L^2$ are independently selected from phosphine, sulfonated phosphine, phosphite, phosphinite, phosphonite, arsine, stibine, ether, (including cyclic ethers), amine, amide, imine, sulfoxide, carboxyl, nitrosyl, pyridine, substituted pyridine, imidazole, substituted imidazole, pyrazine, substituted pyrazine and thioether. Exemplary ligands are trisubstituted phosphines. Preferred trisubstituted phosphines are of the formula $PR^{H1}R^{H2}R^{H3}$, where $R^{H1}$, $R^{H2}$, and $R^{H3}$ are each independently substituted or unsubstituted aryl or $C_1$-$C_{10}$ alkyl, particularly primary alkyl, secondary alkyl, or cycloalkyl. In the most preferred, $L^1$ and $L^2$ are independently selected from the group consisting of trimethylphosphine ($PMe_3$), triethylphosphine ($PEt_3$), tri-n-butylphosphine ($PBu_3$), tri(ortho-tolyl)phosphine (P-o-tolyl$_3$), tri-tert-butylphosphine (P-tert-Bu$_3$), tricyclopentylphosphine (PCyclopentyl$_3$), tricyclohexylphosphine ($PCy_3$), triisopropylphosphine (P-i-Pr$_3$), trioctylphosphine (POct$_3$), triisobutylphosphine, (P-i-Bu$_3$), triphenylphosphine ($PPh_3$), tri(pentafluorophenyl)phosphine ($P(C_6F_5)_3$), methyldiphenylphosphine ($PMePh_2$), dimethylphenylphosphine ($PMe_2Ph$), and diethylphenylphosphine ($PEt_2Ph$). Alternatively, $L^1$ and $L^2$ may be independently selected from phosphabicycloalkane (e.g., monosubstituted 9-phosphabicyclo-[3.3.1]nonane, or monosubstituted 9-phosphabicyclo[4.2.1]nonane] such as cyclohexylphoban, isopropylphoban, ethylphoban, methylphoban, butylphoban, pentylphoban and the like).

$X^1$ and $X^2$ are anionic ligands, and may be the same or different, or are linked together to form a cyclic group, typically although not necessarily a five- to eight-membered ring. In preferred embodiments, $X^1$ and $X^2$ are each independently hydrogen, halide, or one of the following groups: $C_1$-$C_{20}$ alkyl, $C_5$-$C_{24}$ aryl, $C_1$-$C_{20}$ alkoxy, $C_5$-$C_{24}$ aryloxy, $C_2$-$C_{20}$ alkoxycarbonyl, $C_6$-$C_{24}$ aryloxycarbonyl, $C_2$-$C_{24}$ acyl, $C_2$-$C_{24}$ acyloxy, $C_1$-$C_{20}$ alkylsulfonato, $C_5$-$C_{24}$ arylsulfonato, $C_1$-$C_{20}$ alkylsulfanyl, $C_5$-$C_{24}$ arylsulfanyl, $C_1$-$C_{20}$ alkylsulfinyl, $NO_3$, —N=C=O, —N=C=S, or $C_5$-$C_{24}$ arylsulfinyl. Optionally, $X^1$ and $X^2$ may be substituted with one or more moieties selected from $C_1$-$C_{12}$ alkyl, $C_1$-$C_{12}$ alkoxy, $C_5$-$C_{24}$ aryl, and halide, which may, in turn, with the exception of halide, be further substituted with one or more groups selected from halide, $C_1$-$C_6$ alkyl, $C_1$-$C_6$ alkoxy, and phenyl. In more preferred embodiments, $X^1$ and $X^2$ are halide, benzoate, $C_2$-$C_6$ acyl, $C_2$-$C_6$ alkoxycarbonyl, $C_1$-$C_6$ alkyl, phenoxy, $C_1$-$C_6$ alkoxy, $C_1$-$C_6$ alkylsulfanyl, aryl, or $C_1$-$C_6$ alkylsulfonyl. In even more preferred embodiments, $X^1$ and $X^2$ are each halide, $CF_3CO_2$, $CH_3CO_2$, $CFH_2CO_2$, $(CH_3)_3CO$, $(CF_3)_2(CH_3)CO$, $(CF_3)(CH_3)_2CO$, PhO, MeO, EtO, tosylate, mesylate, or trifluoromethanesulfonate. In the most preferred embodiments, $X^1$ and $X^2$ are each chloride.

$R^1$ and $R^2$ are independently selected from hydrogen, hydrocarbyl (e.g., $C_1$-$C_{20}$ alkyl, $C_2$-$C_{20}$ alkenyl, $C_2$-$C_{20}$ alkynyl, $C_5$-$C_{24}$ aryl, $C_6$-$C_{24}$ alkaryl, $C_6$-$C_{24}$ aralkyl, etc.), substituted hydrocarbyl (e.g., substituted $C_1$-$C_{20}$ alkyl, $C_2$-$C_{20}$ alkenyl, $C_2$-$C_{20}$ alkynyl, $C_5$-$C_{24}$ aryl, $C_6$-$C_{24}$ alkaryl, $C_6$-$C_{24}$ aralkyl, etc.), heteroatom-containing hydrocarbyl (e.g., heteroatom-containing $C_1$-$C_{20}$ alkyl, $C_2$-$C_{20}$ alkenyl, $C_2$-$C_{20}$ alkynyl, $C_5$-$C_{24}$ aryl, $C_6$-$C_{24}$ alkaryl, $C_6$-$C_{24}$ aralkyl, etc.), and substituted heteroatom-containing hydrocarbyl (e.g., substituted heteroatom-containing $C_1$-$C_{20}$ alkyl, $C_2$-$C_{20}$ alkenyl, $C_2$-$C_{20}$ alkynyl, $C_5$-$C_{24}$ aryl, $C_6$-$C_{24}$ alkaryl, $C_6$-$C_{24}$ aralkyl, etc.), and functional groups. $R^1$ and $R^2$ may also be linked to form a cyclic group, which may be aliphatic or aromatic, and may contain substituents and/or heteroatoms. Generally, such a cyclic group will contain 4 to 12, preferably 5, 6, 7, or 8 ring atoms.

In preferred catalysts, $R^1$ is hydrogen and $R^2$ is selected from $C_1$-$C_{20}$ alkyl, $C_2$-$C_{20}$ alkenyl, and $C_5$-$C_{24}$ aryl, more preferably $C_1$-$C_6$ alkyl, $C_2$-$C_6$ alkenyl, and $C_5$-$C_{14}$ aryl. Still more preferably, $R^2$ is phenyl, vinyl, methyl, isopropyl, or t-butyl, optionally substituted with one or more moieties selected from $C_1$-$C_6$ alkyl, $C_1$-$C_6$ alkoxy, phenyl, and a functional group Fn as defined earlier herein. Most preferably, $R^2$ is phenyl or vinyl substituted with one or more moieties selected from methyl, ethyl, chloro, bromo, iodo, fluoro, nitro, dimethylamino, methyl, methoxy, and phenyl. Optimally, $R^2$ is phenyl or —CH=C(CH$_3$)$_2$.

Any two or more (typically two, three, or four) of $X^1$, $X^2$, $L^1$, $L^2$, $L^3$, $R^1$, and $R^2$ can be taken together to form a cyclic group, including bidentate or multidentate ligands, as disclosed, for example, in U.S. Pat. No. 5,312,940, the disclosure of which is incorporated herein by reference. When any of $X^1$, $X^2$, $L^1$, $L^2$, $L^3$, $R^1$, and $R^2$ are linked to form cyclic groups, those cyclic groups may contain 4 to 12, preferably 4, 5, 6, 7, or 8 atoms, or may comprise two or three of such rings, which may be either fused or linked. The cyclic groups may be aliphatic or aromatic, and may be heteroatom-containing and/or substituted. The cyclic group may, in some cases, form a bidentate ligand or a tridentate ligand. Examples of bidentate ligands include, but are not limited to, bisphosphines, dialkoxides, alkyldiketonates, and aryldiketonates.

A second group of catalysts, commonly referred to as Second Generation Grubbs-type catalysts, have the structure of formula (I), wherein $L^1$ is a carbene ligand having the structure of formula (II)

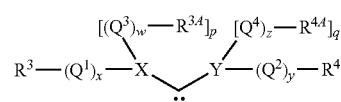

such that the complex may have the structure of formula (III)

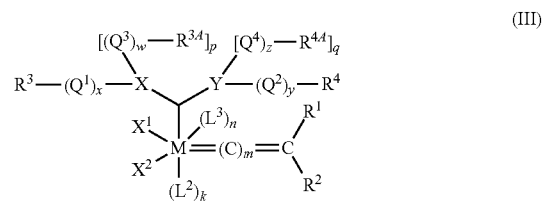

wherein M, m, n, $X^1$, $X^2$, $L^2$, $L^3$, $R^1$, and $R^2$ are as defined for the first group of catalysts, and the remaining substituents are as follows;

X and Y are heteroatoms typically selected from N, O, S, and P. Since O and S are divalent, p is necessarily zero when X is O or S, q is necessarily zero when Y is O or S, and k is zero or 1. However, when X is N or P, then p is 1, and when Y is N or P, then q is 1. In a preferred embodiment, both X and Y are N;

$Q^1$, $Q^2$, $Q^3$, and $Q^4$ are linkers, e.g., hydrocarbylene (including substituted hydrocarbylene, heteroatom-containing hydrocarbylene, and substituted heteroatom-containing hydrocarbylene, such as substituted and/or heteroatom-containing alkylene) or —(CO)—, and w, x, y, and z are independently zero or 1, meaning that each linker is optional. Preferably, w, x, y, and z are all zero. Further, two or more substituents on adjacent atoms within $Q^1$, $Q^2$, $Q^3$, and $Q^4$ may be linked to form an additional cyclic group; and $R^3$, $R^{3A}$, $R^4$, and $R^{4A}$ are independently selected from hydrogen, hydrocarbyl, substituted hydrocarbyl, heteroatom-containing hydrocarbyl, and substituted heteroatom-containing hydrocarbyl. In addition, X and Y may be independently selected from carbon and one of the heteroatoms mentioned above, preferably no more than one of X or Y is carbon. Also, $L^2$ and $L^3$ may be taken together to form a single bindentate electron-donating heterocyclic ligand. Furthermore, $R^1$ and $R^2$ may be taken together to form an indenylidene moiety. Moreover, $X^1$, $X^2$, $L^2$, $L^3$, X and Y may be further coordinated to boron or to a carboxylate. Additionally, $R^1$ and $R^2$ may be taken together to form a phenylindenylidene.

In addition, any two or more of $X^1$, $X^2$, $L^1$, $L^2$, $L^3$, $R^1$, $R^2$, $R^3$, $R^{3A}$, $R^4$, $R^{4A}$, $Q^1$, $Q^2$, $Q^3$, and $Q^4$ can be taken together to form a cyclic group, and any one or more of $X^1$, $X^2$, $L^2$, $L^3$, $Q^1$, $Q^2$, $Q^3$, $Q^4$, $R^1$, $R^2$, $R^3$, $R^{3A}$, $R^4$, and $R^{4A}$ may be attached to a support. Any two or more of $X^1$, $X^2$, $L^1$, $L^2$, $L^3$, $R^1$, $R^2$, $R^3$, $R^{3A}$, $R^4$, and $R^{4A}$ can also be taken to be -A-Fn, wherein "A" is a divalent hydrocarbon moiety selected from alkylene and arylalkylene, wherein the alkyl portion of the alkylene and arylalkylene groups can be linear or branched, saturated or unsaturated, cyclic or acyclic, and substituted or unsubstituted, wherein the aryl portion of the of arylalkylene can be substituted or unsubstituted, and wherein hetero atoms and/or functional groups may be present in either the aryl or the alkyl portions of the alkylene and arylalkylene groups, and Fn is a functional group, or together to form a cyclic group, and any one or more of $X^1$, $X^2$, $L^2$, $L^3$, $Q^1$, $Q^2$, $Q^3$, $Q^4$, $R^1$, $R^2$, $R^3$, $R^{3,4}$, $R^4$, and $R^{4,4}$ may be attached to a support.

A particular class of carbene ligands having the structure of formula (II), where $R^{3,4}$ and $R^{4,4}$ are linked to form a cyclic group and at least one of X or Y is a nitrogen, or at least one of $Q^3$ or $Q^4$ is a heteroatom-containing hydrocarbylene or substituted heteroatom-containing hydrocarbylene, where at least one heteroatom is a nitrogen, are commonly referred to as N-heterocyclic carbene (NHC) ligands.

Preferably, $R^{3,4}$ and $R^{4,4}$ are linked to form a cyclic group so that the carbene ligand has the structure of formula (IV)

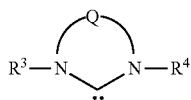

(IV)

wherein $R^3$ and $R^4$ are as defined for the second group of catalysts above, with preferably at least one of $R^3$ and $R^4$, and more preferably both $R^3$ and $R^4$, being alicyclic or aromatic of one to about five rings, and optionally containing one or more heteroatoms and/or substituents. Q is a linker, typically a hydrocarbylene linker, including substituted hydrocarbylene, heteroatom-containing hydrocarbylene, and substituted heteroatom-containing hydrocarbylene linkers, wherein two or more substituents on adjacent atoms within Q may also be linked to form an additional cyclic structure, which may be similarly substituted to provide a fused polycyclic structure of two to about five cyclic groups. Q is often, although not necessarily, a two-atom linkage or a three-atom linkage.

Examples of N-heterocyclic carbene (NHC) ligands and acyclic diaminocarbene ligands suitable as $L^1$ thus include, but are not limited to, the following where DIPP or DiPP is diisopropylphenyl and Mes is 2,4,6-trimethylphenyl:

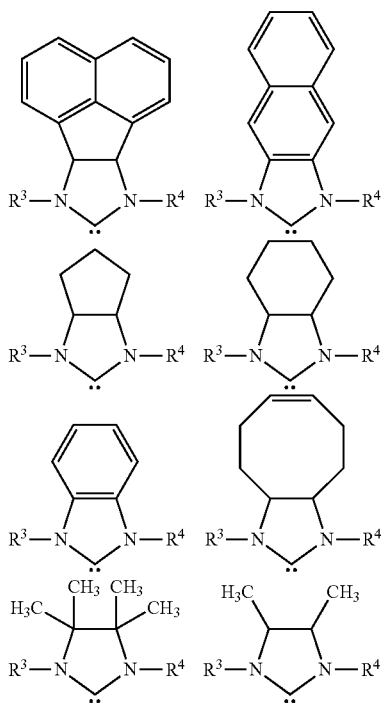

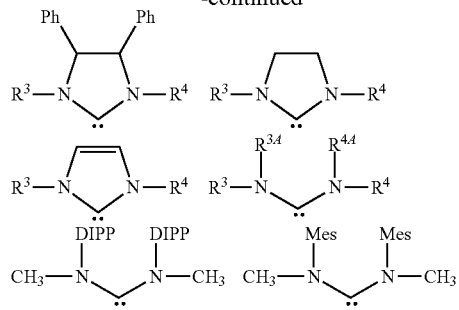

-continued

Additional examples of N-heterocyclic carbene (NHC) ligands and acyclic diaminocarbene ligands suitable as $L^1$ thus include, but are not limited to the following:

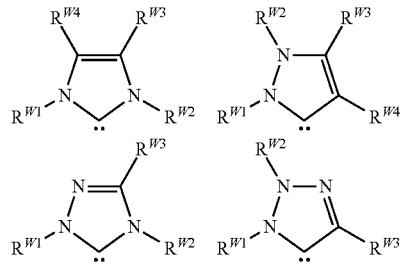

wherein $R^{W1}$, $R^{W2}$, $R^{W3}$, $R^{W4}$ are independently hydrogen, unsubstituted hydrocarbyl, substituted hydrocarbyl, or heteroatom containing hydrocarbyl, and where one or both of $R^{W3}$ and $R^{W4}$ may be in independently selected from halogen, nitro, amido, carboxyl, alkoxy, aryloxy, sulfonyl, carbonyl, thio, or nitroso groups.

Additional examples of N-heterocyclic carbene (NHC) ligands suitable as $L^1$ are further described in U.S. Pat. Nos. 7,378,528; 7,652,145; 7,294,717; 6,787,620; 6,635,768; and 6,552,139 the contents of each are incorporated herein by reference.

Additionally, thermally activated N-Heterocyclic Carbene Precursors as disclosed in U.S. Pat. No. 6,838,489, the contents of which are incorporated herein by reference, may also be used with the present invention.

When M is ruthenium, then, the preferred complexes have the structure of formula (V)

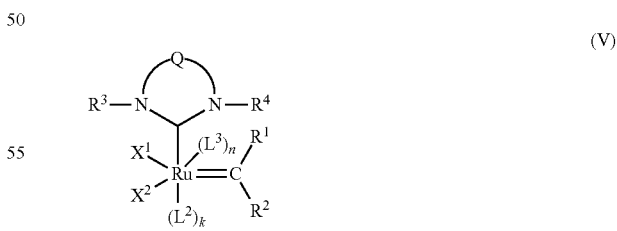

(V)

In a more preferred embodiment, Q is a two-atom linkage having the structure $-CR^{11}R^{12}-CR^{13}R^{14}-$ or $-CR^{11}=CR^{13}-$, preferably $-CR^{11}R^{12}-CR^{13}R^{14}-$, wherein $R^{11}$, $R^{12}$, $R^{13}$, and $R^{14}$ are independently selected from hydrogen, hydrocarbyl, substituted hydrocarbyl, heteroatom-containing hydrocarbyl, substituted heteroatom-containing hydrocarbyl, and functional groups. Examples of functional groups here include without limitation carboxyl, $C_1$-$C_{20}$ alkoxy, $C_5$-$C_{24}$ aryloxy, $C_2$-$C_{20}$ alkoxycarbonyl, $C_5$-$C_{24}$ alkoxycarbonyl, $C_2$-$C_{24}$ acyloxy, $C_1$-$C_{20}$ alkylthio, $C_5$-$C_{24}$ arylthio, $C_1$-$C_{20}$ alkylsulfonyl, and $C_1$-$C_{20}$ alkylsulfinyl, optionally substituted with one or more moieties selected from $C_1$-$C_{12}$ alkyl, $C_1$-$C_{12}$ alkoxy, $C_5$-$C_{14}$ aryl, hydroxyl, sulfhydryl, formyl, and halide. $R^{11}$, $R^{12}$, $R^{13}$, and $R^{14}$ are preferably independently selected from hydrogen, $C_1$-$C_{12}$ alkyl, substituted $C_1$-$C_{12}$ alkyl, $C_1$-$C_{12}$ heteroalkyl, substituted $C_1$-$C_{12}$ heteroalkyl, phenyl, and substituted phenyl. Alternatively, any two of $R^{11}$, $R^{12}$, $R^{13}$, and $R^{14}$ may be linked together to form a substituted or unsubstituted, saturated or unsaturated ring structure, e.g., a $C_4$-$C_{12}$ alicyclic group or a $C_5$ or $C_6$ aryl group, which may itself be substituted, e.g., with linked or fused alicyclic or aromatic groups, or with other substituents. In one further aspect, any one or more of $R^{11}$, $R^{12}$, $R^{13}$, and $R^{14}$ comprises one or more of the linkers. Additionally, $R^3$ and $R^4$ may be unsubstituted phenyl or phenyl substituted with one or more substituents selected from $C_1$-$C_{20}$ alkyl, substituted $C_1$-$C_{20}$ alkyl, $C_1$-$C_{20}$ heteroalkyl, substituted $C_1$-$C_{20}$ heteroalkyl, $C_5$-$C_{24}$ aryl, substituted $C_5$-$C_{24}$ aryl, $C_5$-$C_{24}$ heteroaryl, $C_6$-$C_{24}$ aralkyl, $C_6$-$C_{24}$ alkaryl, or halide. Furthermore, $X^1$ and $X^2$ may be halogen.

When $R^3$ and $R^4$ are aromatic, they are typically although not necessarily composed of one or two aromatic rings, which may or may not be substituted, e.g., $R^3$ and $R^4$ may be phenyl, substituted phenyl, biphenyl, substituted biphenyl, or the like. In one preferred embodiment, $R^3$ and $R^4$ are the same and are each unsubstituted phenyl or phenyl substituted with up to three substituents selected from $C_1$-$C_{20}$ alkyl, substituted $C_1$-$C_{20}$ alkyl, $C_1$-$C_{20}$ heteroalkyl, substituted $C_1$-$C_{20}$ heteroalkyl, $C_5$-$C_{24}$ aryl, substituted $C_5$-$C_{24}$ aryl, $C_5$-$C_{24}$ heteroaryl, $C_6$-$C_{24}$ aralkyl, $C_6$-$C_{24}$ alkaryl, or halide. Preferably, any substituents present are hydrogen, $C_1$-$C_{12}$ alkyl, $C_1$-$C_{12}$ alkoxy, $C_5$-$C_{14}$ aryl, substituted $C_5$-$C_{14}$ aryl, or halide. As an example, $R^3$ and $R^4$ are mesityl (i.e., Mes as defined herein).

In a third group of catalysts having the structure of formula (I), M, m, n, $X^1$, $X^2$, $R^1$, and $R^2$ are as defined for the first group of catalysts, $L^1$ is a strongly coordinating neutral electron donor ligand such as any of those described for the first and second group of catalysts, and $L^2$ and $L^3$ are weakly coordinating neutral electron donor ligands in the form of optionally substituted heterocyclic groups. Again, n is zero or 1, such that $L^3$ may or may not be present. Generally, in the third group of catalysts, $L^2$ and $L^3$ are optionally substituted five- or six-membered monocyclic groups containing 1 to 4, preferably 1 to 3, most preferably 1 to 2 heteroatoms, or are optionally substituted bicyclic or polycyclic structures composed of 2 to 5 such five- or six-membered monocyclic groups. If the heterocyclic group is substituted, it should not be substituted on a coordinating heteroatom, and any one cyclic moiety within a heterocyclic group will generally not be substituted with more than 3 substituents.

For the third group of catalysts, examples of $L^2$ and $L^3$ include, without limitation, heterocycles containing nitrogen, sulfur, oxygen, or a mixture thereof.

Examples of nitrogen-containing heterocycles appropriate for $L^2$ and $L^3$ include pyridine, bipyridine, pyridazine, pyrimidine, bipyridamine, pyrazine, 1,3,5-triazine, 1,2,4-triazine, 1,2,3-triazine, pyrrole, 2H-pyrrole, 3H-pyrrole, pyrazole, 2H-imidazole, 1,2,3-triazole, 1,2,4-triazole, indole, 3H-indole, 1H-isoindole, cyclopenta(b)pyridine, indazole, quinoline, bisquinoline, isoquinoline, bisisoquinoline, cinnoline, quinazoline, naphthyridine, piperidine, piperazine, pyrrolidine, pyrazolidine, quinuclidine, imidazolidine, picolylimine, purine, benzimidazole, bisimidazole, phenazine, acridine, and carbazole. Additionally, the nitrogen-containing heterocycles may be optionally substituted on a non-coordinating heteroatom with a non-hydrogen substituent.

Examples of sulfur-containing heterocycles appropriate for $L^2$ and $L^3$ include thiophene, 1,2-dithiole, 1,3-dithiole, thiepin, benzo(b)thiophene, benzo(c)thiophene, thionaphthene, dibenzothiophene, 2H-thiopyran, 4H-thiopyran, and thioanthrene.

Examples of oxygen-containing heterocycles appropriate for $L^2$ and $L^3$ include 2H-pyran, 4H-pyran, 2-pyrone, 4-pyrone, 1,2-dioxin, 1,3-dioxin, oxepin, furan, 2H-1-benzopyran, coumarin, coumarone, chromene, chroman-4-one, isochromen-1-one, isochromen-3-one, xanthene, tetrahydrofuran, 1,4-dioxan, and dibenzofuran.

Examples of mixed heterocycles appropriate for $L^2$ and $L^3$ include isoxazole, oxazole, thiazole, isothiazole, 1,2,3-oxadiazole, 1,2,4-oxadiazole, 1,3,4-oxadiazole, 1,2,3,4-oxatriazole, 1,2,3,5-oxatriazole, 3H-1,2,3-dioxazole, 3H-1,2-oxathiole, 1,3-oxathiole, 4H-1,2-oxazine, 2H-1,3-oxazine, 1,4-oxazine, 1,2,5-oxathiazine, o-isooxazine, phenoxazine, phenothiazine, pyrano[3,4-b]pyrrole, indoxazine, benzoxazole, anthranil, and morpholine.

Preferred $L^2$ and $L^3$ ligands are aromatic nitrogen-containing and oxygen-containing heterocycles, and particularly preferred $L^2$ and $L^3$ ligands are monocyclic N-heteroaryl ligands that are optionally substituted with 1 to 3, preferably 1 or 2, substituents. Specific examples of particularly preferred $L^2$ and $L^3$ ligands are pyridine and substituted pyridines, such as 3-bromopyridine, 4-bromopyridine, 3,5-dibromopyridine, 2,4,6-tribromopyridine, 2,6-dibromopyridine, 3-chloropyridine, 4-chloropyridine, 3,5-dichloropyridine, 2,4,6-trichloropyridine, 2,6-dichloropyridine, 4-iodopyridine, 3,5-diiodopyridine, 3,5-dibromo-4-methylpyridine, 3,5-dichloro-4-methylpyridine, 3,5-dimethyl-4-bromopyridine, 3,5-dimethylpyridine, 4-methylpyridine, 3,5-diisopropylpyridine, 2,4,6-trimethylpyridine, 2,4,6-triisopropylpyridine, 4-(tert-butyl)pyridine, 4-phenylpyridine, 3,5-diphenylpyridine, 3,5-dichloro-4-phenylpyridine, and the like.

In general, any substituents present on $L^2$ and/or $L^3$ are selected from halo, $C_1$-$C_{20}$ alkyl, substituted $C_1$-$C_{20}$ alkyl, $C_1$-$C_{20}$ heteroalkyl, substituted $C_1$-$C_{20}$ heteroalkyl, $C_5$-$C_{24}$ aryl, substituted $C_5$-$C_{24}$ aryl, $C_5$-$C_{24}$ heteroaryl, substituted $C_5$-$C_{24}$ heteroaryl, $C_6$-$C_{24}$ alkaryl, substituted $C_6$-$C_{24}$ alkaryl, $C_6$-$C_{24}$ heteroalkaryl, substituted $C_6$-$C_{24}$ heteroalkaryl, $C_6$-$C_{24}$ aralkyl, substituted $C_6$-$C_{24}$ aralkyl, $C_6$-$C_{24}$ heteroaralkyl, substituted $C_6$-$C_{24}$ heteroaralkyl, and functional groups, with suitable functional groups including, without limitation, $C_1$-$C_{20}$ alkoxy, $C_5$-$C_{24}$ aryloxy, $C_2$-$C_{20}$ alkylcarbonyl, $C_6$-$C_{24}$ arylcarbonyl, $C_2$-$C_{20}$ alkylcarbonyloxy, $C_6$-$C_{24}$ arylcarbonyloxy, $C_2$-$C_{20}$ alkoxycarbonyl, $C_6$-$C_{24}$ aryloxycarbonyl, halocarbonyl, $C_2$-$C_{20}$ alkylcarbonato, $C_6$-$C_{24}$ arylcarbonato, carboxy, carboxylato, carbamoyl, mono-($C_1$-$C_{20}$ alkyl)-substituted carbamoyl, di-($C_1$-$C_{20}$ alkyl)-substituted carbamoyl, di-N—($C_1$-$C_{20}$ alkyl), N—($C_5$-$C_{24}$ aryl)-substituted carbamoyl, mono-($C_5$-$C_{24}$ aryl)-substituted carbamoyl, di-($C_6$-$C_{24}$ aryl)-substituted carbamoyl, thiocarbamoyl, mono-($C_1$-$C_{20}$ alkyl)-substituted thiocarbamoyl, di-($C_1$-$C_{20}$ alkyl)-substituted thiocarbamoyl, di-N—($C_1$-$C_{20}$ alkyl)-N—($C_6$-$C_{24}$ aryl)-substituted thiocarbamoyl, mono-($C_6$-$C_{24}$ aryl)-substituted thiocarbamoyl, di-($C_6$-$C_{24}$ aryl)-substituted thiocarbamoyl, carbamido, formyl, thioformyl, amino, mono-($C_1$-$C_{20}$ alkyl)-substituted amino, di-($C_1$-$C_{20}$ alkyl)-substituted amino, mono-($C_5$-$C_{24}$ aryl)-substituted amino, di-($C_5$-$C_{24}$ aryl)-substituted amino, di-N—($C_1$-$C_{20}$ alkyl), N—($C_5$-$C_{24}$ aryl)-substituted amino, $C_2$-$C_{20}$ alkylamido, $C_6$-$C_{24}$ arylamido, imino, $C_1$-$C_{20}$ alkylimino, $C_5$-$C_{24}$ arylimino, nitro, and nitroso. In addition, two adjacent substituents may be taken together to form a ring, generally a five- or six-membered alicyclic or aryl ring, optionally containing 1 to 3 heteroatoms and 1 to 3 substituents as above.

Preferred substituents on $L^2$ and $L^3$ include, without limitation, halo, $C_1$-$C_{12}$ alkyl, substituted $C_1$-$C_{12}$ alkyl, $C_1$-$C_{12}$ heteroalkyl, substituted $C_1$-$C_{12}$ heteroalkyl, $C_5$-$C_{14}$ aryl, substituted $C_5$-$C_{14}$ aryl, $C_5$-$C_{14}$ heteroaryl, substituted $C_5$-$C_{14}$ heteroaryl, $C_6$-$C_{16}$ alkaryl, substituted $C_6$-$C_{16}$ alkaryl, $C_6$-$C_{16}$ heteroalkaryl, substituted $C_6$-$C_{16}$ heteroalkaryl, $C_6$-$C_{16}$ aralkyl, substituted $C_6$-$C_{16}$ aralkyl, $C_6$-$C_{16}$ heteroaralkyl, substituted $C_6$-$C_{16}$ heteroaralkyl, $C_1$-$C_{12}$ alkoxy, $C_5$-$C_{14}$ aryloxy, $C_2$-$C_{12}$ alkylcarbonyl, $C_6$-$C_{14}$ arylcarbonyl, $C_2$-$C_{12}$ alkylcarbonyloxy, $C_6$-$C_{14}$ arylcarbonyloxy, $C_2$-$C_{12}$ alkoxycarbonyl, $C_6$-$C_{14}$ aryloxycarbonyl, halocarbonyl, formyl, amino, mono-($C_1$-$C_{12}$ alkyl)-substituted amino, di-($C_1$-$C_{12}$ alkyl)-substituted amino, mono-($C_5$-$C_{14}$ aryl)-substituted amino, di-($C_5$-$C_{14}$ aryl)-substituted amino, and nitro.

Of the foregoing, the most preferred substituents are halo, $C_1$-$C_6$ alkyl, $C_1$-$C_6$ haloalkyl, $C_1$-$C_6$ alkoxy, phenyl, substituted phenyl, formyl, N,N-di($C_1$-$C_6$ alkyl)amino, nitro, and nitrogen heterocycles as described above (including, for example, pyrrolidine, piperidine, piperazine, pyrazine, pyrimidine, pyridine, pyridazine, etc.).

In certain embodiments, $L^2$ and $L^3$ may also be taken together to form a bidentate or multidentate ligand containing two or more, generally two, coordinating heteroatoms such as N, O, S, or P, with preferred such ligands being diimine ligands of the Brookhart type. One representative bidentate ligand has the structure of formula (VI)

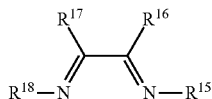

(VI)

wherein $R^{15}$, $R^{16}$, $R^{17}$, and $R^{18}$ hydrocarbyl (e.g., $C_1$-$C_{20}$ alkyl, $C_2$-$C_{20}$ alkenyl, $C_2$-$C_{20}$ alkynyl, $C_5$-$C_{24}$ aryl, $C_6$-$C_{24}$ alkaryl, or $C_6$-$C_{24}$ aralkyl), substituted hydrocarbyl (e.g., substituted $C_1$-$C_{20}$ alkyl, $C_2$-$C_{20}$ alkenyl, $C_2$-$C_{20}$ alkynyl, $C_5$-$C_{24}$ aryl, $C_6$-$C_{24}$ alkaryl, or $C_6$-$C_{24}$ aralkyl), heteroatom-containing hydrocarbyl (e.g., $C_1$-$C_{20}$ heteroalkyl, $C_5$-$C_{24}$ heteroaryl, heteroatom-containing $C_6$-$C_{24}$ aralkyl, or heteroatom-containing $C_6$-$C_{24}$ alkaryl), or substituted heteroatom-containing hydrocarbyl (e.g., substituted $C_1$-$C_{20}$ heteroalkyl, $C_5$-$C_{24}$ heteroaryl, heteroatom-containing $C_6$-$C_{24}$ aralkyl, or heteroatom-containing $C_6$-$C_{24}$ alkaryl), or (1) $R^{15}$ and $R^{16}$, (2) $R^{17}$ and R18, (3) $R^{16}$ and $R^{17}$, or (4) both $R^{15}$ and $R^{16}$, and $R^{17}$ and V, may be taken together to form a ring, i.e., an N-heterocycle. Preferred cyclic groups in such a case are five- and six-membered rings, typically aromatic rings.

In a fourth group of catalysts that have the structure of formula (I), two of the substituents are taken together to form a bidentate ligand or a tridentate ligand. Examples of bidentate ligands include, but are not limited to, bisphosphines, dialkoxides, alkyldiketonates, and aryldiketonates. Specific examples include —P(Ph)$_2$CH$_2$CH$_2$P(Ph)$_2$-, —As(Ph)$_2$CH$_2$CH$_2$As(Ph)$_2$-, —P(Ph)$_2$CH$_2$CH$_2$C(CF$_3$)$_2$O—, binaphtholate dianions, pinacolate dianions, —P(CH$_3$)$_2$(CH$_2$)$_2$P(CH$_3$)$_2$—, and —OC(CH$_3$)$_2$(CH$_3$)$_2$CO—. Preferred bidentate ligands are —P(Ph)$_2$ CH$_2$CH$_2$P(Ph)$_2$- and —P(CH$_3$)$_2$(CH$_2$)$_2$P(CH$_3$)$_2$—. Tridentate ligands include, but are not limited to, (CH$_3$)$_2$NCH$_2$CH$_2$P(Ph)CH$_2$CH$_2$N(CH$_3$)$_2$. Other preferred tridentate ligands are those in which any three of $X^1$, $X^2$, $L^1$, $L^2$, $L^3$, $R^1$, and $R^2$ (e.g., $X^1$, $L^1$, and $L^2$) are taken together to be cyclopentadienyl, indenyl, or fluorenyl, each optionally substituted with $C_2$-$C_{20}$ alkenyl, $C_2$-$C_{20}$ alkynyl, $C_1$-$C_{20}$ alkyl, $C_5$-$C_{20}$ aryl, $C_1$-$C_{20}$ alkoxy, $C_2$-$C_{20}$ alkenyloxy, $C_2$-$C_{20}$ alkynyloxy, $C_5$-$C_{20}$ aryloxy, $C_2$-$C_{20}$ alkoxycarbonyl, $C_1$-$C_{20}$ alkylthio, $C_1$-$C_{20}$ alkylsulfonyl, or $C_1$-$C_{20}$ alkylsulfinyl, each of which may be further substituted with $C_1$-$C_6$ alkyl, halide, $C_1$-$C_6$ alkoxy or with a phenyl group optionally substituted with halide, $C_1$-$C_6$ alkyl, or $C_1$-$C_6$ alkoxy. More preferably, in compounds of this type, X, $L^1$, and $L^2$ are taken together to be cyclopentadienyl or indenyl, each optionally substituted with vinyl, $C_1$-$C_{10}$ alkyl, $C_5$-$C_{20}$ aryl, $C_1$-$C_{10}$ carboxylate, $C_2$-$C_{10}$ alkoxycarbonyl, $C_1$-$C_{10}$ alkoxy, or $C_5$-$C_{20}$ aryloxy, each optionally substituted with $C_1$-$C_6$ alkyl, halide, $C_1$-$C_6$ alkoxy or with a phenyl group optionally substituted with halide, $C_1$-$C_6$ alkyl or $C_1$-$C_6$ alkoxy. Most preferably, X, $L^1$ and $L^2$ may be taken together to be cyclopentadienyl, optionally substituted with vinyl, hydrogen, methyl, or phenyl. Tetradentate ligands include, but are not limited to O$_2$C(CH$_2$)$_2$P(Ph)(CH$_2$)$_2$P(Ph)(CH$_2$)$_2$CO$_2$, phthalocyanines, and porphyrins.

Complexes wherein Y is coordinated to the metal are examples of a fifth group of catalysts, and are commonly called "Grubbs-Hoveyda" catalysts. Grubbs-Hoveyda metathesis-active metal carbene complexes may be described by the formula (VII)

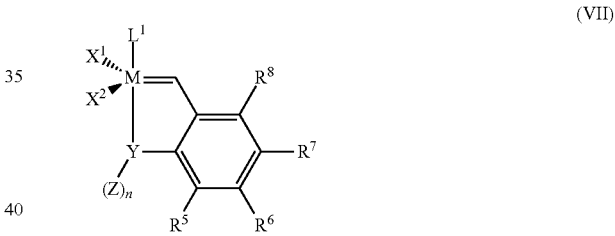

(VII)

wherein:

M is a Group 8 transition metal, particularly Ru or Os, or, more particularly, Ru;

$X^1$, $X^2$, and $L^1$ are as previously defined herein for the first and second groups of catalysts;

Y is a heteroatom selected from N, O, S, and P; preferably Y is O or N;

$R^5$, $R^6$, $R^7$, and $R^8$ are each, independently, selected from the group consisting of hydrogen, halogen, alkyl, alkenyl, alkynyl, aryl, heteroalkyl, heteroatom containing alkenyl, heteroalkenyl, heteroaryl, alkoxy, alkenyloxy, aryloxy, alkoxycarbonyl, carbonyl, alkylamino, alkylthio, aminosulfonyl, monoalkylaminosulfonyl, dialkylaminosulfonyl, alkylsulfonyl, nitrile, nitro, alkylsulfinyl, trihaloalkyl, perfluoroalkyl, carboxylic acid, ketone, aldehyde, nitrate, cyano, isocyanate, hydroxyl, ester, ether, amine, imine, amide, halogen-substituted amide, trifluoroamide, sulfide, disulfide, sulfonate, carbamate, silane, siloxane, phosphine, phosphate, borate, or -A-Fn, wherein "A" and Fn have been defined above; and any combination of Y, Z, $R^5$, $R^6$, $R^7$, and $R^8$ can be linked to form one or more cyclic groups;

n is 0, 1, or 2, such that n is 1 for the divalent heteroatoms O or S, and n is 2 for the trivalent heteroatoms N or P; and Z is a group selected from hydrogen, alkyl, aryl, functionalized alkyl, functionalized aryl where the functional group(s) may independently be one or more or the following: alkoxy, aryloxy, halogen, carboxylic acid, ketone, aldehyde, nitrate, cyano, isocyanate, hydroxyl, ester, ether, amine, imine, amide, trifluoroamide, sulfide, disulfide, carbamate, silane, siloxane, phosphine, phosphate, or borate; methyl, isopropyl, sec-butyl, t-butyl, neopentyl, benzyl, phenyl and trimethylsilyl; and wherein any combination or combinations of $X^1$, $X^2$, $L^1$, Y, Z, $R^5$, $R^6$, $R^7$, and $R^8$ may be linked to a support. Additionally, $R^5$, $R^6$, $R^7$, $R^8$, and Z may independently be thioisocyanate, cyanato, or thiocyanato.

Examples of complexes comprising Grubbs-Hoveyda ligands suitable in the invention include:

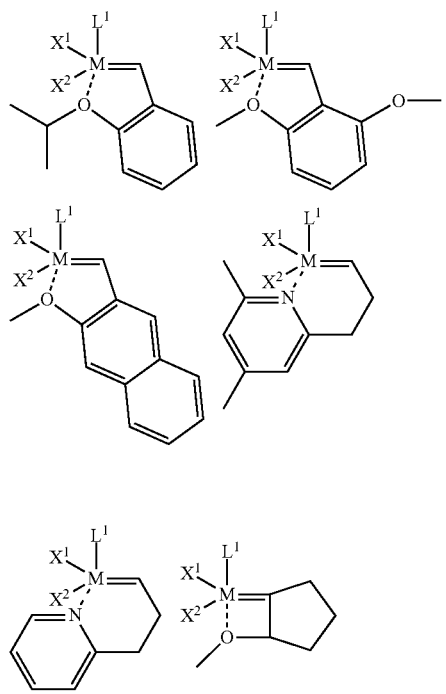

wherein $L^1$, $X^1$, $X^2$, and M are as described for any of the other groups of catalysts. Suitable chelating carbenes and carbene precursors are further described by Pederson et al. (U.S. Pat. Nos. 7,026,495 and 6,620,955, the disclosures of both of which are incorporated herein by reference) and Hoveyda et al. (U.S. Pat. No. 6,921,735 and WO0214376, the disclosures of both of which are incorporated herein by reference).

Other useful complexes include structures wherein $L^2$ and $R^2$ according to formulae (I), (III), or (V) are linked, such as styrenic compounds that also include a functional group for attachment to a support. Examples in which the functional group is a trialkoxysilyl functionalized moiety include, but are not limited to, the following:

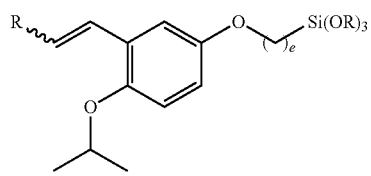

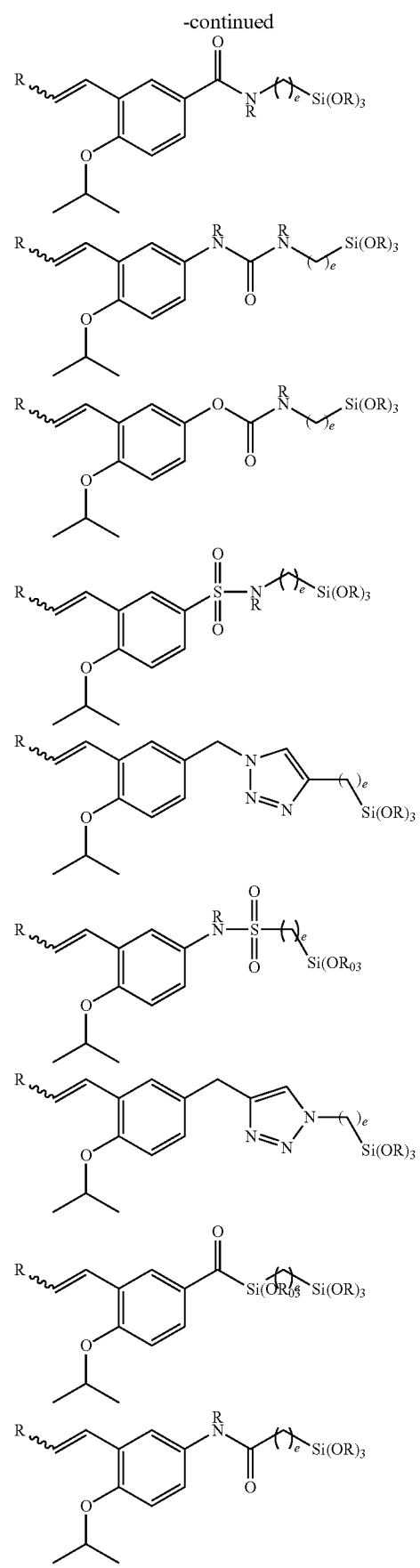

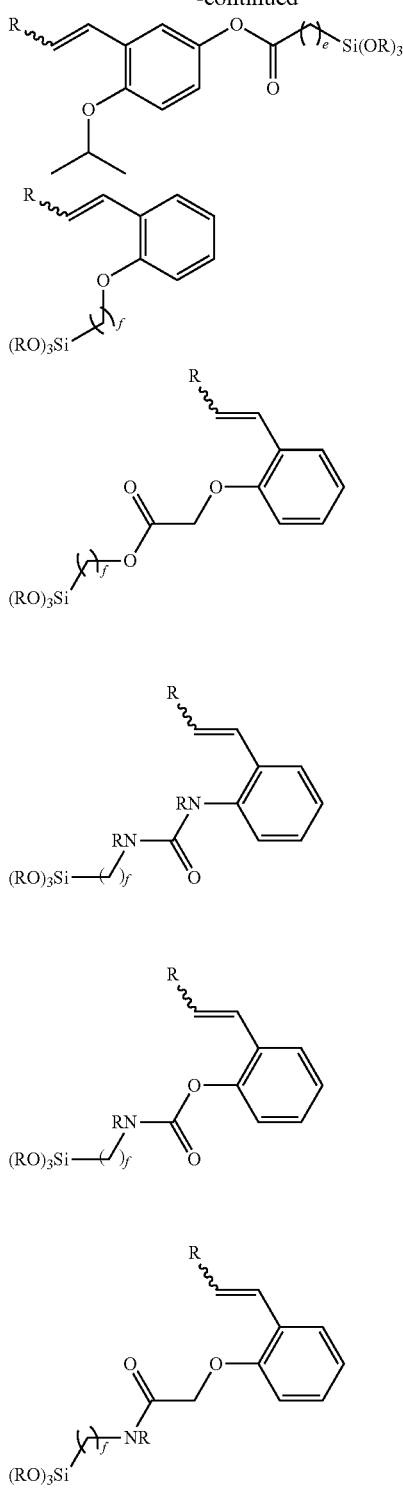

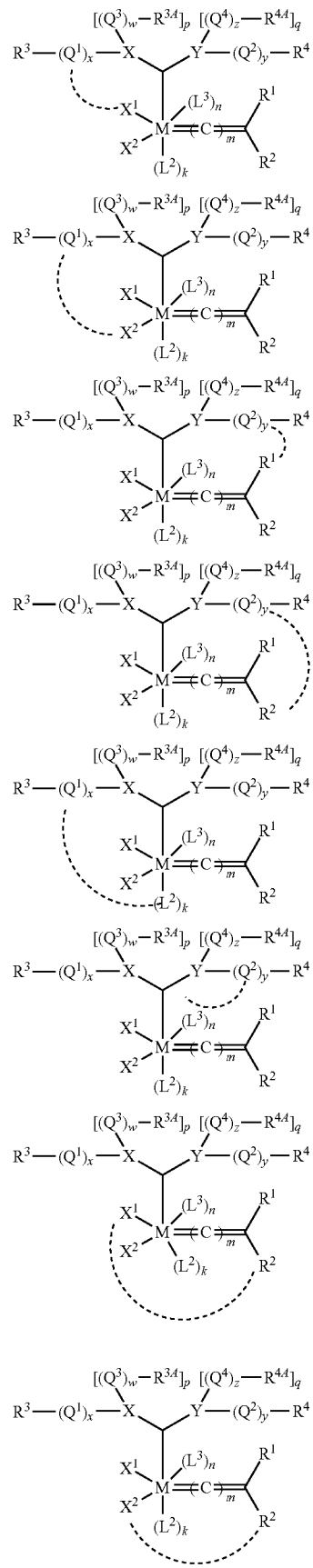

Further examples of complexes having linked ligands include those having linkages between a neutral NHC ligand and an anionic ligand, a neutral NHC ligand and an alkylidine ligand, a neutral NHC ligand and an $L^2$ ligand, a neutral NHC ligand and an $L^3$ ligand, an anionic ligand and an alkylidine ligand, and any combination thereof. While the possible structures are too numerous to list herein, some suitable structures based on formula (III) include:

-continued

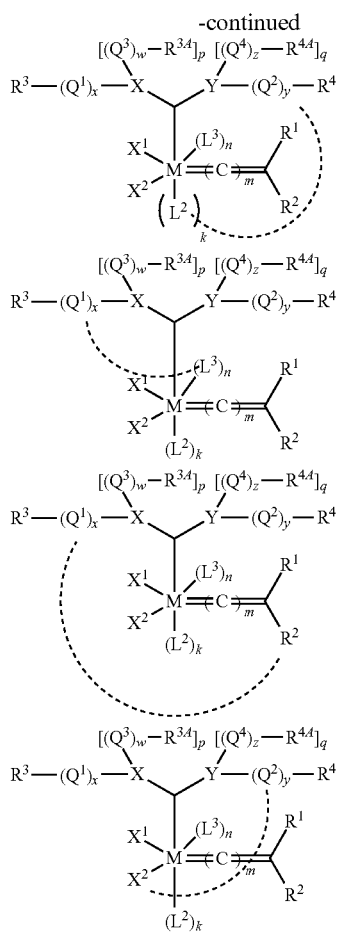

In addition to the catalysts that have the structure of formula (I), as described above, other transition metal carbene complexes include, but are not limited to:

neutral ruthenium or osmium metal carbene complexes containing metal centers that are formally in the +2 oxidation state, have an electron count of 16, are penta-coordinated, and are of the general formula (IX);

neutral ruthenium or osmium metal carbene complexes containing metal centers that are formally in the +2 oxidation state, have an electron count of 18, are hexa-coordinated, and are of the general formula (X);

cationic ruthenium or osmium metal carbene complexes containing metal centers that are formally in the +2 oxidation state, have an electron count of 14, are tetra-coordinated, and are of the general formula (XI); and cationic ruthenium or osmium metal carbene complexes containing metal centers that are formally in the +2 oxidation state, have an electron count of 14 or 16, are tetra-coordinated or penta-coordinated, respectively, and are of the general formula (XII)

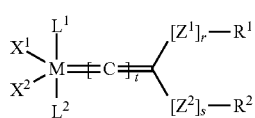
(IX)

-continued

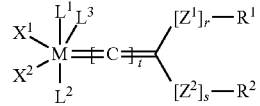
(X)

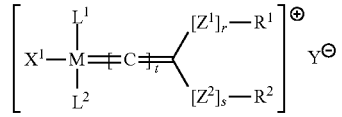
(XI)

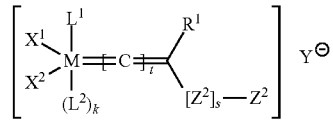
(XII)

wherein:

M, $X^1$, $X^2$, $L^1$, $L^2$, $L^3$, $R^1$, and $R^2$ are as defined for any of the previously defined four groups of catalysts;

r and s are independently zero or 1;

t is an integer in the range of zero to 5;

k is an integer in the range of zero to 1;

Y is any non-coordinating anion (e.g., a halide ion, $BF_4^-$, etc.);

$Z^1$ and $Z^2$ are independently selected from —O—, —S—, —$NR^2$—, —$PR^2$—, —P(=O)$R^2$—, —P(O$R^2$)—, —P(=O)(O$R^2$)—, —C(=O)—, —C(=O)O—, —OC(=O)—, —OC(=O)O—, —S(=O)—, —S(=O)$_2$—, -, and an optionally substituted and/or optionally heteroatom—containing $C_1$-$C_{20}$ hydrocarbylene linkage;

$Z^3$ is any cationic moiety such as —P($R^2$)$_3^+$ or —N($R^2$)$_3^+$; and any two or more of $X^1$, $X^2$, $L^1$, $L^2$, $L^3$, $Z^1$, $Z^2$, $Z^3$, $R^1$, and $R^2$ may be taken together to form a cyclic group, e.g., a multidentate ligand, and wherein any one or more of $X^1$, $X^2$, $L^1$, $L^2$, $L^3$, $Z^1$, $Z^2$, $Z^3$, $R^1$, and $R^2$ may be attached to a support.

Additionally, another group of olefin metathesis catalysts that may be used in the invention disclosed herein, is a Group 8 transition metal complex having the structure of formula (XIII):

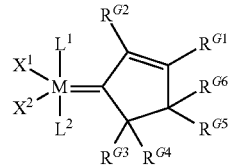
(XIII)

wherein M is a Group 8 transition metal, particularly ruthenium or osmium, or more particularly, ruthenium;

$X^1$, $X^2$, $L^1$ and $L^2$ are as defined for the first and second groups of catalysts defined above; and $R^{G1}$, $R^{G2}$, $R^{G3}$, $R^{G4}$, $R^{G5}$, and $R^{G6}$ are each independently selected from the group consisting of hydrogen, halogen, alkyl, alkenyl, alkynyl, aryl, heteroalkyl, heteroatom containing alkenyl, heteroalkenyl, heteroaryl, alkoxy, alkenyloxy, aryloxy, alkoxycarbonyl, carbonyl, alkylamino, alkylthio, aminosulfonyl, monoalkylaminosulfonyl, dialkylaminosulfonyl, alkylsulfonyl, nitrile, nitro, alkylsulfinyl, trihaloalkyl, perfluoroalkyl, carboxylic acid, ketone, aldehyde, nitrate, cyano, isocyanate, thioisocyanate, cyanato, thiocyanato, hydroxyl, ester, ether, thioether, amine, alkylamine, imine, amide, halogen-substituted amide, trifluoroamide, sulfide, disulfide, sulfonate, carbamate, silane, siloxane, phosphine, phosphate, borate, or -A-Fn, wherein "A" is a divalent hydrocarbon moiety selected from alkylene and arylalkylene, wherein the alkyl portion of the alkylene and arylalkylene groups can be linear or branched, saturated or unsaturated, cyclic or acyclic, and substituted or unsubstituted, wherein the aryl portion of the arylalkylene can be substituted or unsubstituted, and wherein hetero atoms and/or functional groups may be present in either the aryl or the alkyl portions of the alkylene and arylalkylene groups, and Fn is a functional group, or any one or more of the $R^{G1}$, $R^{G2}$, $R^{G3}$, $R^{G4}$, $R^{G5}$, and $R^{G6}$ may be linked together to form a cyclic group, or any one or more of the $R^{G1}$, $R^{G2}$, $R^{G3}$, $R^{G4}$, $R^{G5}$, and $R^{G6}$ may be attached to a support.

Additionally, one preferred embodiment of the Group 8 transition metal complex of formula (XIII) is a Group 8 transition metal complex of formula (XIV):

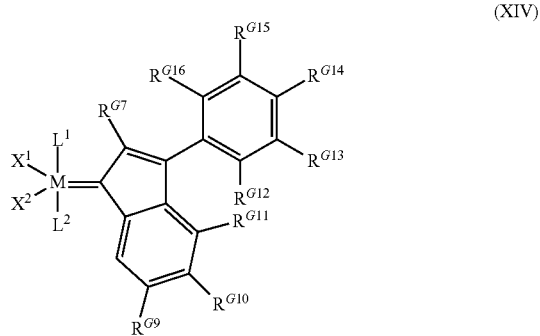

(XIV)

wherein M, $X^1$, $X^2$, $L^1$, and $L^2$ are as defined above for Group 8 transition metal complex of formula (XIII); and
$R^{G7}$, $R^{G8}$, $R^{G9}$, $R^{G10}$, $R^{G11}$, $R^{G12}$, $R^{G13}$, $R^{G14}$, $R^{G15}$, and $R^{G16}$ are as defined above for $R^{G1}$, $R^{G2}$, $R^{G3}$, $R^{G4}$, $R^{G5}$, and $R^{G6}$ for Group 8 transition metal complex of formula (XIII) or any one or more of the $R^{G7}$, $R^{G8}$, $R^{G9}$, $R^{G10}$, $R^{G11}$, $R^{G12}$, $R^{G13}$, $R^{G14}$, $R^{G15}$, and $R^{G16}$ may be linked together to form a cyclic group, or any one or more of the $R^{G7}$, $R^{G8}$, $R^{G9}$, $R^{G10}$, $R^{G11}$, $R^{G12}$, $R^{G13}$, $R^{G14}$, $R^{G15}$, and $R^{G16}$ may be attached to a support.

Additionally, another preferred embodiment of the Group 8 transition metal complex of formula (XIII) is a Group 8 transition metal complex of formula (XV):

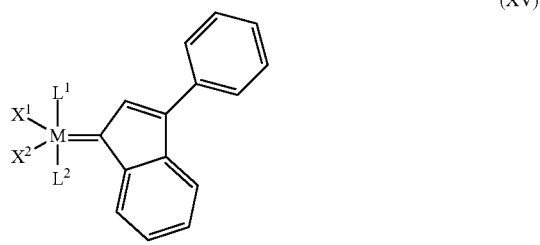

(XV)

wherein M, $X^1$, $X^2$, $L^1$, and $L^2$ are as defined above for Group 8 transition metal complex of formula (XIII).

Additionally, another group of olefin metathesis catalysts that may be used in the invention disclosed herein, is a Group 8 transition metal complex comprising a Schiff base ligand having the structure of formula (XVI):

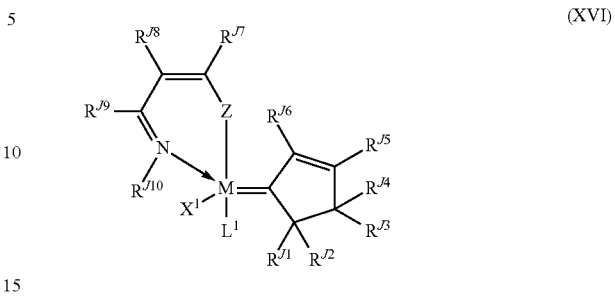

(XVI)

wherein M is a Group 8 transition metal, particularly ruthenium or osmium, or more particularly, ruthenium;
$X^1$ and $L^1$ are as defined for the first and second groups of catalysts defined above;
Z is selected from the group consisting of oxygen, sulfur, selenium, $NR^{J11}$, $PR^{J11}$, $AsR^{J11}$, and $SbR^{J11}$; and
$R^{J1}$, $R^{J2}$, $R^{J3}$, $R^{J4}$, $R^{J5}$, $R^{J6}$, $R^{J7}$, $R^{J8}$, $R^{J9}$, $R^{J10}$, and $R^{J11}$ are each independently selected from the group consisting of hydrogen, halogen, alkyl, alkenyl, alkynyl, aryl, heteroalkyl, heteroatom containing alkenyl, heteroalkenyl, heteroaryl, alkoxy, alkenyloxy, aryloxy, alkoxycarbonyl, carbonyl, alkylamino, alkylthio, aminosulfonyl, monoalkylaminosulfonyl, dialkylaminosulfonyl, alkylsulfonyl, nitrile, nitro, alkylsulfinyl, trihaloalkyl, perfluoroalkyl, carboxylic acid, ketone, aldehyde, nitrate, cyano, isocyanate, thioisocyanate, cyanato, thiocyanato, hydroxyl, ester, ether, thioether, amine, alkylamine, imine, amide, halogen-substituted amide, trifluoroamide, sulfide, disulfide, sulfonate, carbamate, silane, siloxane, phosphine, phosphate, borate, or -A-Fn, wherein "A" is a divalent hydrocarbon moiety selected from alkylene and arylalkylene, wherein the alkyl portion of the alkylene and arylalkylene groups can be linear or branched, saturated or unsaturated, cyclic or acyclic, and substituted or unsubstituted, wherein the aryl portion of the arylalkylene can be substituted or unsubstituted, and wherein hetero atoms and/or functional groups may be present in either the aryl or the alkyl portions of the alkylene and arylalkylene groups, and Fn is a functional group, or any one or more of the $R^{J1}$, $R^{J2}$, $R^{J3}$, $R^{J4}$, $R^{J5}$, $R^{J6}$, $R^{J7}$, $R^{J8}$, $R^{J9}$, $R^{J10}$, and $R^{J11}$ may be linked together to form a cyclic group, or any one or more of the $R^{J1}$, $R^{J2}$, $R^{J3}$, $R^{J4}$, $R^{J5}$, $R^{J6}$, $R^{J7}$, $R^{J8}$, $R^{J9}$, $R^{J10}$, and $R^{J11}$ may be attached to a support.

Additionally, one preferred embodiment of the Group 8 transition metal complex of formula (XVI) is a Group 8 transition metal complex comprising a Schiff base ligand having the structure of formula (XVII):

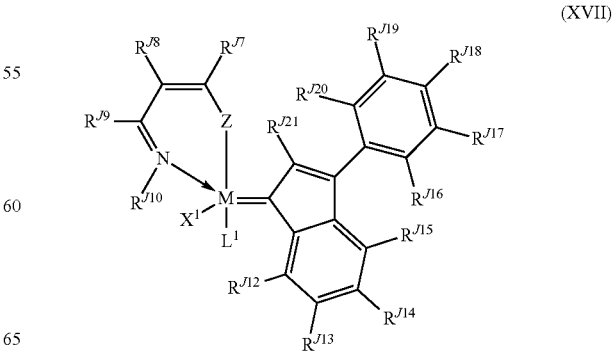

(XVII)

wherein M, $X^1$, $L^1$, Z, $R^{J7}$, $R^{J8}$, $R^{J9}$, $R^{J10}$, and $R^{J11}$ are as defined above for Group 8 transition metal complex of formula (XVI); and $R^{J12}$, $R^{J13}$, $R^{J14}$, $R^{J15}$, $R^{J16}$, $R^{J17}$, $R^{J18}$, $R^{J19}$, $R^{J20}$, and $R^{J21}$ are as defined above for $R^{J1}$, $R^{J2}$, $R^{J3}$, $R^{J4}$, $R^{J5}$, and $R^{J6}$ for Group 8 transition metal complex of formula (XVI), or any one or more of the $R^{J7}$, $R^{J8}$, $R^{J9}$, $R^{J10}$, $R^{J11}$, $R^{J12}$, $R^{J13}$, $R^{J14}$, $R^{J15}$, $R^{J16}$, $R^{J17}$, $R^{J18}$, $R^{J19}$, $R^{J20}$, and $R^{J21}$ may be linked together to form a cyclic group, or any one or more of the $R^{J7}$, $R^{J8}$, $R^{J9}$, $R^{J10}$, $R^{J11}$, $R^{J12}$, $R^{J13}$, $R^{J14}$, $R^{J15}$, $R^{J16}$, $R^{J17}$, $R^{J18}$, $R^{J19}$, $R^{J20}$, and $R^{J21}$ may be attached to a support.

Additionally, another preferred embodiment of the Group 8 transition metal complex of formula (XVI) is a Group 8 transition metal complex comprising a Schiff base ligand having the structure of formula (XVIII):

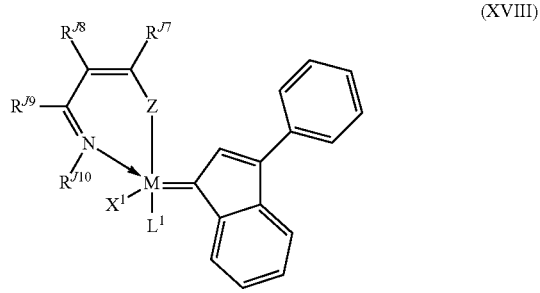

(XVIII)

wherein M, $X^1$, $L^1$, Z, $R^{J7}$, $R^{J8}$, $R^{J9}$, $R^{J10}$, and $R^{J11}$ are as defined above for Group 8 transition metal complex of formula (XVI).

Additionally, another group of olefin metathesis catalysts that may be used in the invention disclosed herein, is a Group 8 transition metal complex comprising a Schiff base ligand having the structure of formula (XIX):

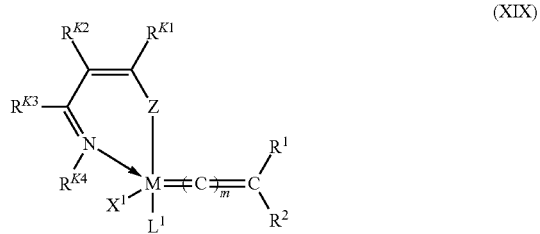

(XIX)

wherein M is a Group 8 transition metal, particularly ruthenium or osmium, or more particularly, ruthenium;

$X^1$, $L^1$, $R^1$, and $R^2$ are as defined for the first and second groups of catalysts defined above;

Z is selected from the group consisting of oxygen, sulfur, selenium, $NR^{K5}$, $AR^{K5}$, $AsR^{K5}$, and $SbR^{K5}$;

m is 0, 1, or 2; and $R^{K1}$, $R^{K2}$, $R^{K3}$, $R^{K4}$, and $R^{K5}$ are each independently selected from the group consisting of hydrogen, halogen, alkyl, alkenyl, alkynyl, aryl, heteroalkyl, heteroatom containing alkenyl, heteroalkenyl, heteroaryl, alkoxy, alkenyloxy, aryloxy, alkoxycarbonyl, carbonyl, alkylamino, alkylthio, aminosulfonyl, monoalkylaminosulfonyl, dialkylaminosulfonyl, alkylsulfonyl, nitrile, nitro, alkylsulfinyl, trihaloalkyl, perfluoroalkyl, carboxylic acid, ketone, aldehyde, nitrate, cyano, isocyanate, thioisocyanate, cyanato, thiocyanato, hydroxyl, ester, ether, thioether, amine, alkylamine, imine, amide, halogen-substituted amide, trifluoroamide, sulfide, disulfide, sulfonate, carbamate, silane, siloxane, phosphine, phosphate, borate, or -A-Fn, wherein "A" is a divalent hydrocarbon moiety selected from alkylene and arylalkylene, wherein the alkyl portion of the alkylene and arylalkylene groups can be linear or branched, saturated or unsaturated, cyclic or acyclic, and substituted or unsubstituted, wherein the aryl portion of the arylalkylene can be substituted or unsubstituted, and wherein hetero atoms and/or functional groups may be present in either the aryl or the alkyl portions of the alkylene and arylalkylene groups, and Fn is a functional group, or any one or more of the $R^{K1}$, $R^{K2}$, $R^{K3}$, $R^{K4}$, and $R^{K5}$ may be linked together to form a cyclic group, or any one or more of the $R^{K1}$, $R^{K2}$, $R^{K3}$, $R^{K4}$, and $R^{K5}$ may be attached to a support.

In addition, catalysts of formulas (XVI) to (XIX) may be optionally contacted with an activating compound, where at least partial cleavage of a bond between the Group 8 transition metal and at least one Schiff base ligand occurs, wherein the activating compound is either a metal or silicon compound selected from the group consisting of copper (I) halides; zinc compounds of the formula $Zn(R^{Y1})_2$, wherein $R^{Y1}$ is halogen, $C_1$-$C_7$ alkyl or aryl; tin compounds represented by the formula $SnR^{Y2}R^{Y3}R^{Y4}R^{Y5}$ wherein each of $R^{Y2}$, $R^{Y3}$, $R^{Y4}$, and $R^{Y5}$ is independently selected from the group consisting of halogen, $C_1$-$C_{20}$ alkyl, $C_3$-$C_{10}$ cycloalkyl, aryl, benzyl, and $C_2$-$C_7$ alkenyl; and silicon compounds represented by the formula $SiR^{Y6}R^{Y7}R^{Y8}R^{Y9}$ wherein each of $R^{Y6}$, $R^{Y7}$, $R^{Y8}$, and $R^{Y9}$ is independently selected from the group consisting of hydrogen, halogen, $C_1$-$C_{20}$ alkyl, halo, $C_1$-$C_7$ alkyl, aryl, heteroaryl, and vinyl. In addition, catalysts of formulas (XVI) to (XIX) may be optionally contacted with an activating compound where at least partial cleavage of a bond between the Group 8 transition metal and at least one Schiff base ligand occurs, wherein the activating compound is an inorganic acid such as hydrogen iodide, hydrogen bromide, hydrogen chloride, hydrogen fluoride, sulfuric acid, nitric acid, iodic acid, periodic acid, perchloric acid, $HOClO$, $HOClO_2$, and $HOIO_3$. In addition, catalysts of formulas (XVI) to (XIX) may be optionally contacted with an activating compound where at least partial cleavage of a bond between the Group 8 transition metal and at least one Schiff base ligand occurs, wherein the activating compound is an organic acid such as sulfonic acids including but not limited to methanesulfonic acid, aminobenzenesulfonic acid, benzenesulfonic acid, napthalenesulfonic acid, sulfanilic acid and trifluoromethanesulfonic acid; monocarboxylic acids including but not limited to acetoacetic acid, barbituric acid, bromoacetic acid, bromobenzoic acid, chloroacetic acid, chlorobenzoic acid, chlorophenoxyacetic acid, chloropropionic acid, cis-cinnamic acid, cyanoacetic acid, cyanobutyric acid, cyanophenoxyacetic acid, cyanopropionic acid, dichloroacetic acid, dichloroacetylacetic acid, dihydroxybenzoic acid, dihydroxymalic acid, dihydroxytartaric acid, dinicotinic acid, diphenylacetic acid, fluorobenzoic acid, formic acid, furancarboxylic acid, furoic acid, glycolic acid, hippuric acid, iodoacetic acid, iodobenzoic acid, lactic acid, lutidinic acid, mandelic acid, α-naphtoic acid, nitrobenzoic acid, nitrophenylacetic acid, o-phenylbenzoic acid, thioacetic acid, thiophene-carboxylic acid, trichloroacetic acid, and trihydroxybenzoic acid; and other acidic substances such as but not limited to picric acid and uric acid.

In addition, other examples of catalysts that may be used with the present invention are located in the following disclosures, each of which is incorporated herein by reference, U.S. Pat. Nos. 7,687,635; 7,671,224; 6,284,852; 6,486, 279; and 5,977,393; International Publication Number WO2010/037550; and U.S. patent application Ser. Nos. 12/303,615; 10/590,380; 11/465,651 (Publication No.: US 2007/0043188); and Ser. No. 11/465,651 (Publication No.: US 2008/0293905 Corrected Publication); and European Pat. Nos. EP1757613B1 and EP1577282B1.

Non-limiting examples of catalysts that may be used to prepare supported complexes and in the reactions disclosed herein include the following, some of which for convenience are identified throughout this disclosure by reference to their molecular weight:

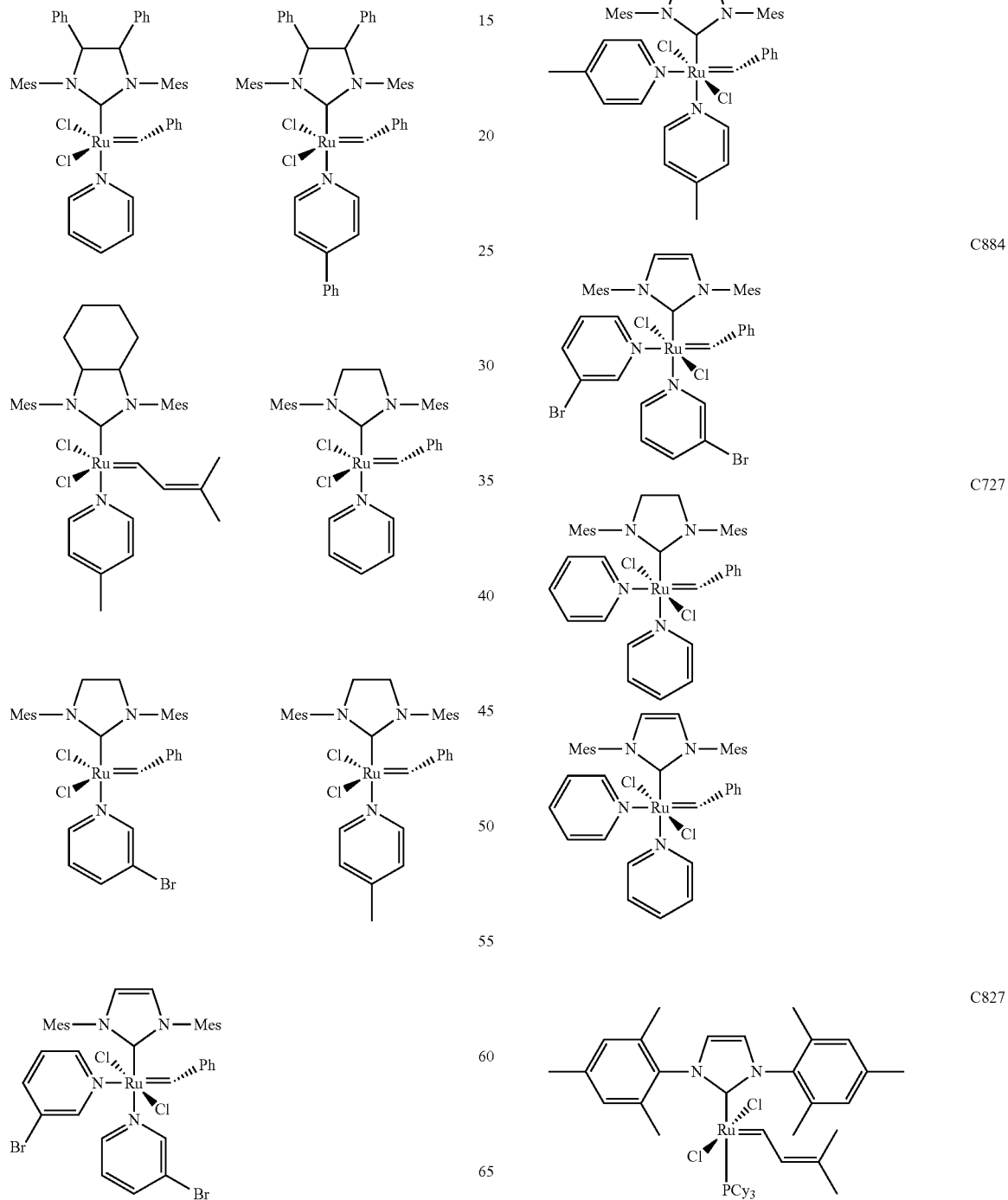

-continued
C859
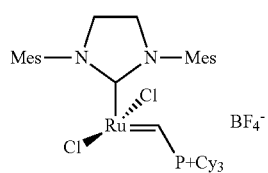
C841-n
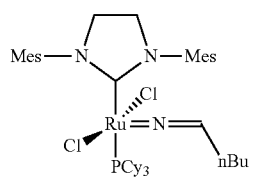
C916
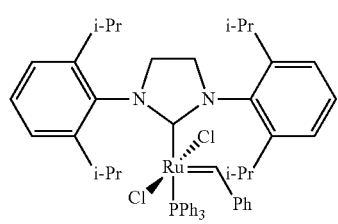
C965-p
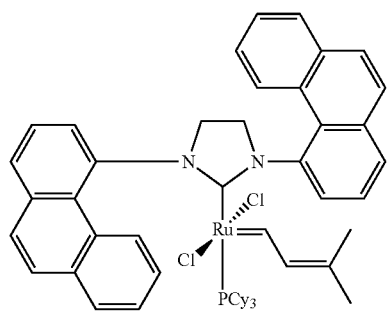
C727
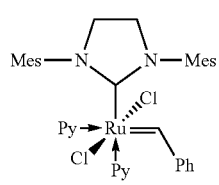
C577
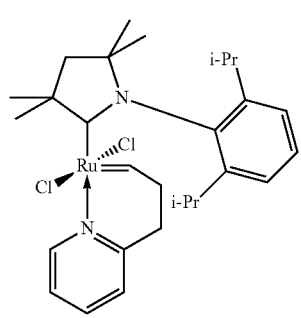
-continued
C646
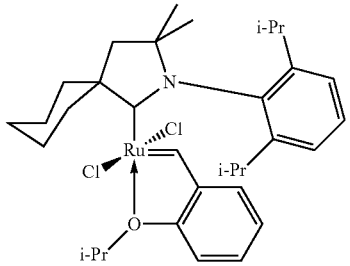
C701
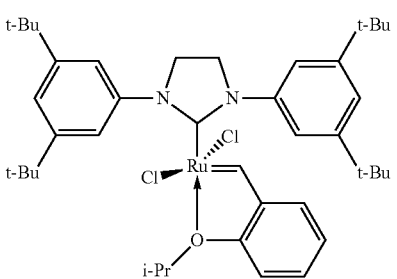
C767-m
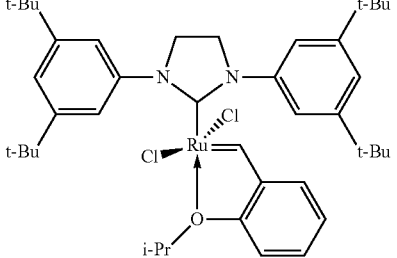
C811
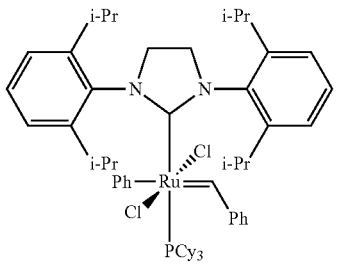
C801
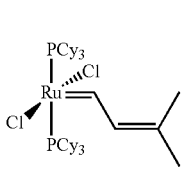
C838
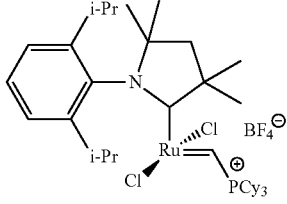
C712
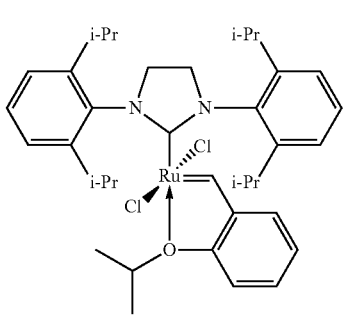

-continued
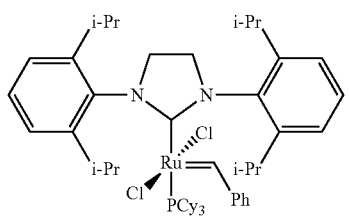
C933
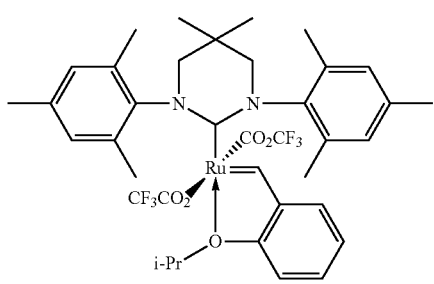
C824
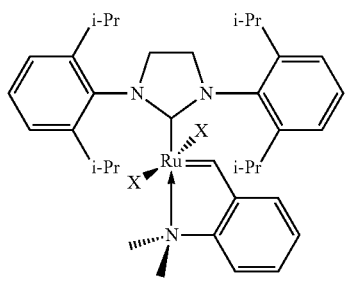
C697 (X = Cl)
C785 (X = Br)
X879 (X = I)
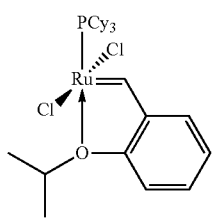
C601
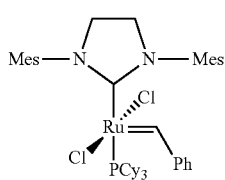
C848
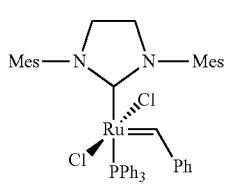
C831
-continued
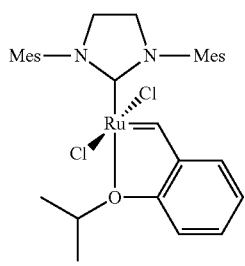
C627
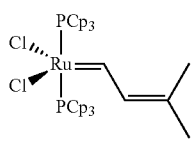
C716
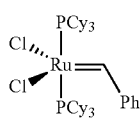
C823
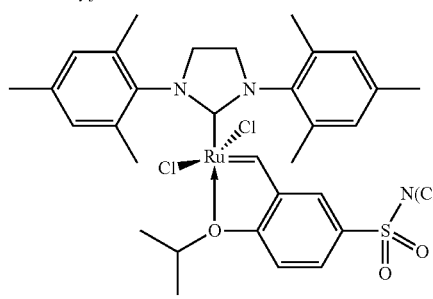
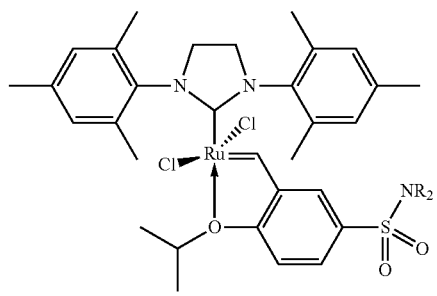
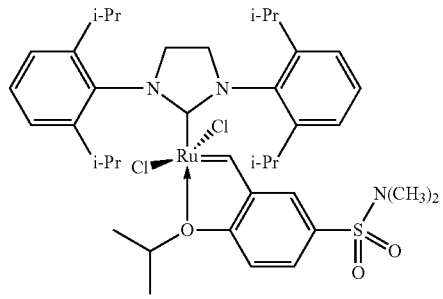
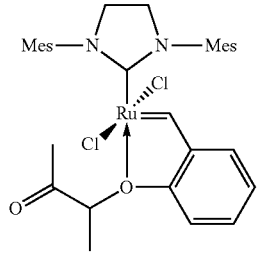

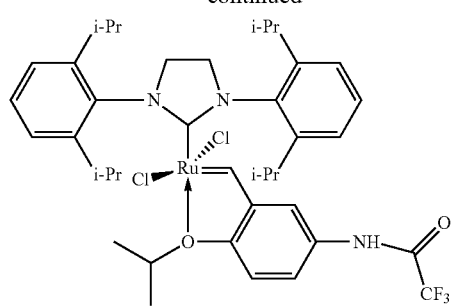
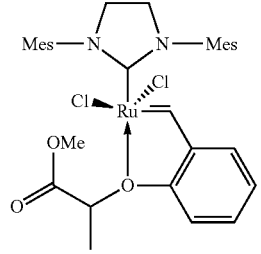
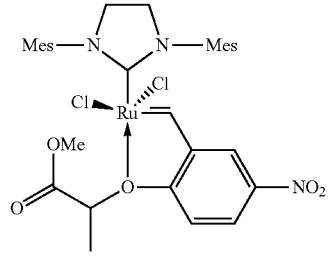
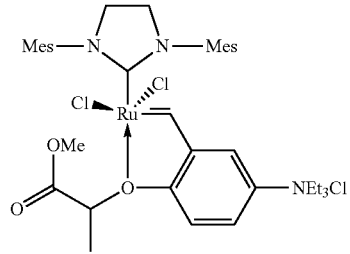
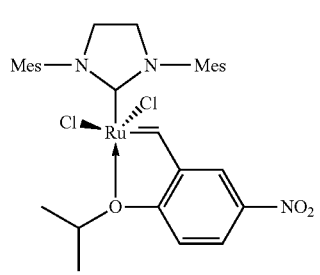
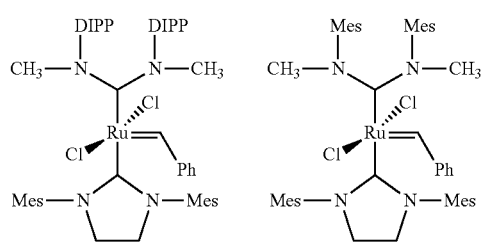
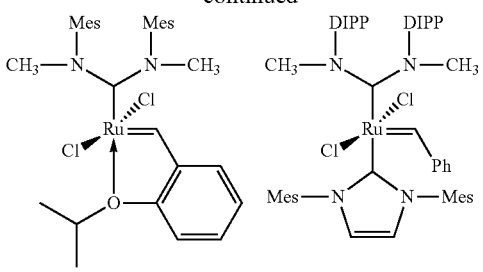
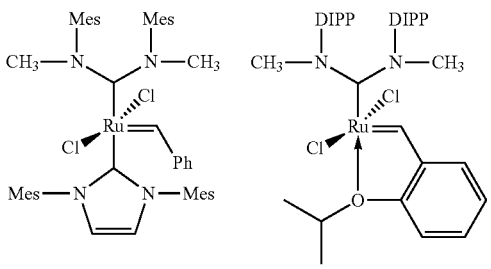
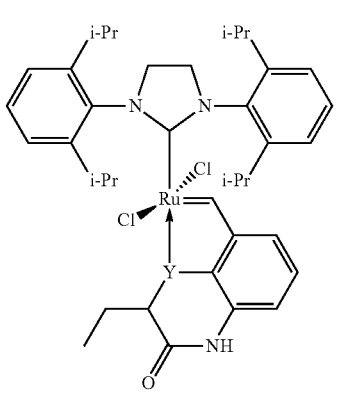
Y = O, S, NH
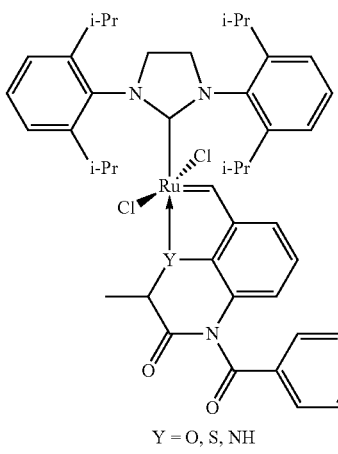
Y = O, S, NH

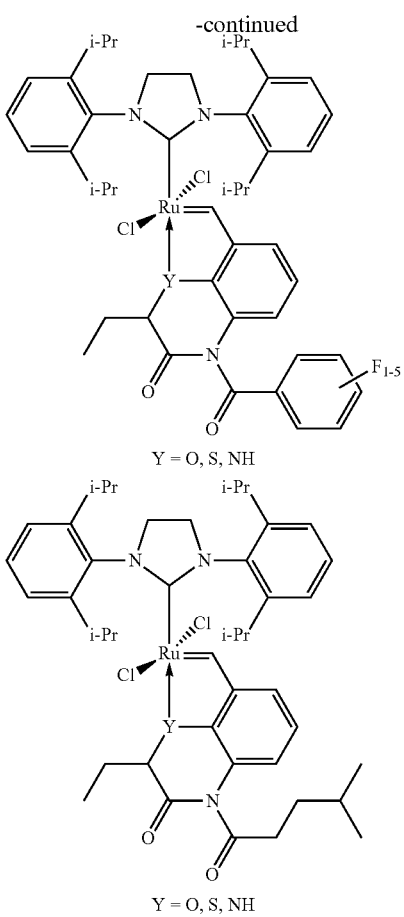

Y = O, S, NH

Y = O, S, NH

In the foregoing molecular structures and formulae, Ph represents phenyl, Cy represents cyclohexyl, Cp represents cyclopentyl, Me represents methyl, Bu represents n-butyl, t-Bu represents tert-butyl, i-Pr represents isopropyl, py represents pyridine (coordinated through the N atom), Mes represents mesityl (i.e., 2,4,6-trimethylphenyl), DiPP and DIPP represents 2,6-diisopropylphenyl, and MiPP represents 2-isopropylphenyl.

Further examples of catalysts useful to prepare supported complexes and in the reactions disclosed herein include the following: ruthenium (II) dichloro (3-methyl-2-butenylidene) bis(tricyclopentylphosphine) (C716); ruthenium (II) dichloro (3-methyl-2-butenylidene) bis(tricyclohexylphosphine) (C801); ruthenium (II) dichloro(phenylmethylene) bis(tricyclohexylphosphine) (C823); ruthenium (II) (1,3-bis-(2,4,6-trimethylphenyl)-2-imidazolidinylidene) dichloro (phenylmethylene) (triphenylphosphine) (C830); ruthenium (II) dichloro (phenylvinylidene) bis(tricyclohexylphosphine) (C835); ruthenium (II) dichloro (tricyclohexylphosphine) (o-isopropoxyphenylmethylene) (C601); ruthenium (II) (1,3-bis-(2, 4,6-trimethylphenyl)-2-imidazolidinylidene) dichloro (phenylmethylene) bis(3-bromopyridine) (C884); [1,3-bis-(2,4,6-trimethylphenyl)-2-imidazolidinylidene]dichloro(o-isopropoxyphenylmethylene) ruthenium(II) (C627); [1,3-bis-(2,4,6-trimethylphenyl)-2-imidazolidinylidene] dichloro (benzylidene) (triphenylphosphine) ruthenium(II) (C831); [1,3-bis-(2,4,6-trimethylphenyl)-2-imidazolidinylidene] dichloro (benzylidene)(methyldiphenylphosphine)ruthenium(II) (C769); [1,3-bis-(2,4,6-trimethylphenyl)-2-imidazolidinylidene]dichloro(benzylidene)(tricyclohexylphosphine)ruthenium(II) (C848); [1,3-bis-(2,4,6-trimethylphenyl)-2-imidazolidinylidene] dichloro(benzylidene) (diethylphenylphosphine) ruthenium(II) (C735); [1,3-bis-(2,4,6-trimethylphenyl)-2-imidazolidinylidene]dichloro(benzylidene)(tri-n-butylphosphine)ruthenium(II) (C771); [1,3-bis-(2,4,6-trimethylphenyl)-2-imidazolidinylidene]dichloro(3-methyl-2-butenylidene)(triphenylphosphine)ruthenium(II) (C809); [1,3-bis-(2,4,6-trimethylphenyl)-2-imidazolidinylidene]dichloro(3-methyl-2-butenylidene)(methyldiphenylphosphine)ruthenium(II) (C747); [1,3-bis-(2,4,6-trimethylphenyl)-2-imidazolidinylidene]dichloro(3-methyl-2-butenylidene) (tricyclohexylphosphine) ruthenium(II) (C827); [1,3-bis-(2,4,6-trimethylphenyl)-2-imidazolidinylidene] dichloro(3-methyl-2-butenylidene)(diethylphenylphosphine)ruthenium(II) (C713); [1,3-bis-(2,4,6-trimethylphenyl)-2-imidazolidinylidene] dichloro (3-methyl-2-butenylidene) (tri-n-butylphosphine)ruthenium(II) (C749); [1,3-bis-(2,4,6-trimethylphenyl)-2-imidazolidinylidene] dichloro(phenylindenylidene)(triphenylphosphine)ruthenium(II) (C931); [1,3-bis-(2,4,6-trimethylphenyl)-2-imidazolidinylidene] dichloro (phenylindenylidene) (methylphenylphosphine) ruthenium(II) (C869); [1,3-bis-(2,4,6-trimethylphenyl)-2-imidazolidinylidene] dichloro (phenylindenylidene) (tricyclohexylphosphine) ruthenium (II) (C949); [1,3-bis-(2,4,6-trimethylphenyl)-2-imidazolidinylidene]dichloro(phenylindenylidene)(diethylphenylphosphine)ruthenium(II) (C835); and [1,3-bis-(2,4,6-trimethylphenyl)-2-imidazolidinylidene]dichloro (phenylindenylidene)(tri-n-butylphosphine)ruthenium(II) (C871).

Additional examples of catalysts useful to prepare supported complexes and in the reactions disclosed herein include the following: [1,3-bis-(2,4,6-trimethylphenyl)-2-imidazolidinylidene]dichloro(tert-butylvinylidene) (tricyclohexylphosphine)ruthenium(II) (C841); [1,3-bis-(2,4,6-trimethylphenyl)-2-imidazolidinylidene]dichloro (phenylvinylidene) (tricyclohexylphosphine)ruthenium(II), ruthenium (II) and dichloro (tert-butylvinylidene) bis(tricyclohexylphosphine) (C815).

Still further catalysts useful in ROMP reactions, and/or in other metathesis reactions, such as ring-closing metathesis, cross metathesis, ring-opening cross metathesis, self-metathesis, ethenolysis, alkenolysis, acyclic diene metathesis polymerization, and combinations thereof, include the following structures:

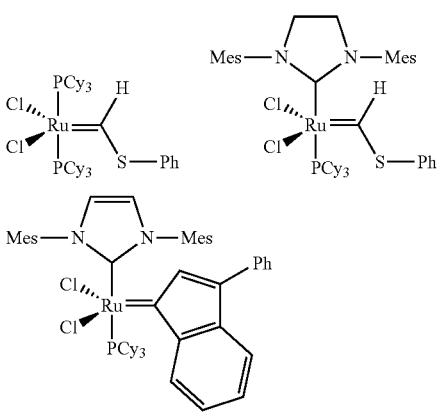

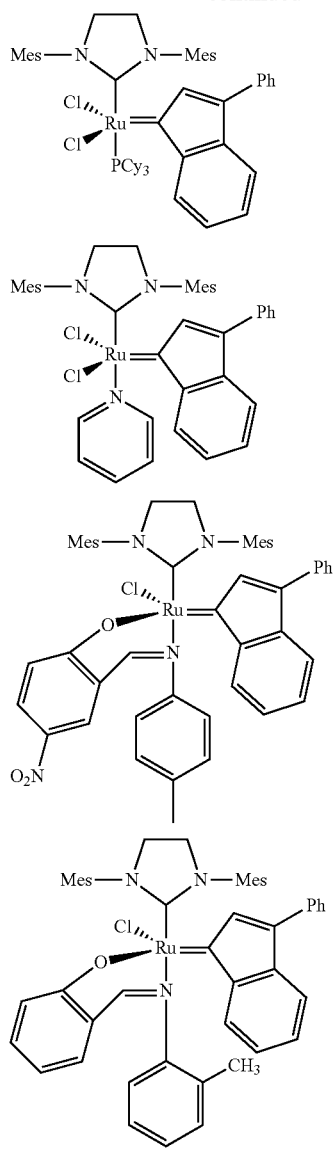
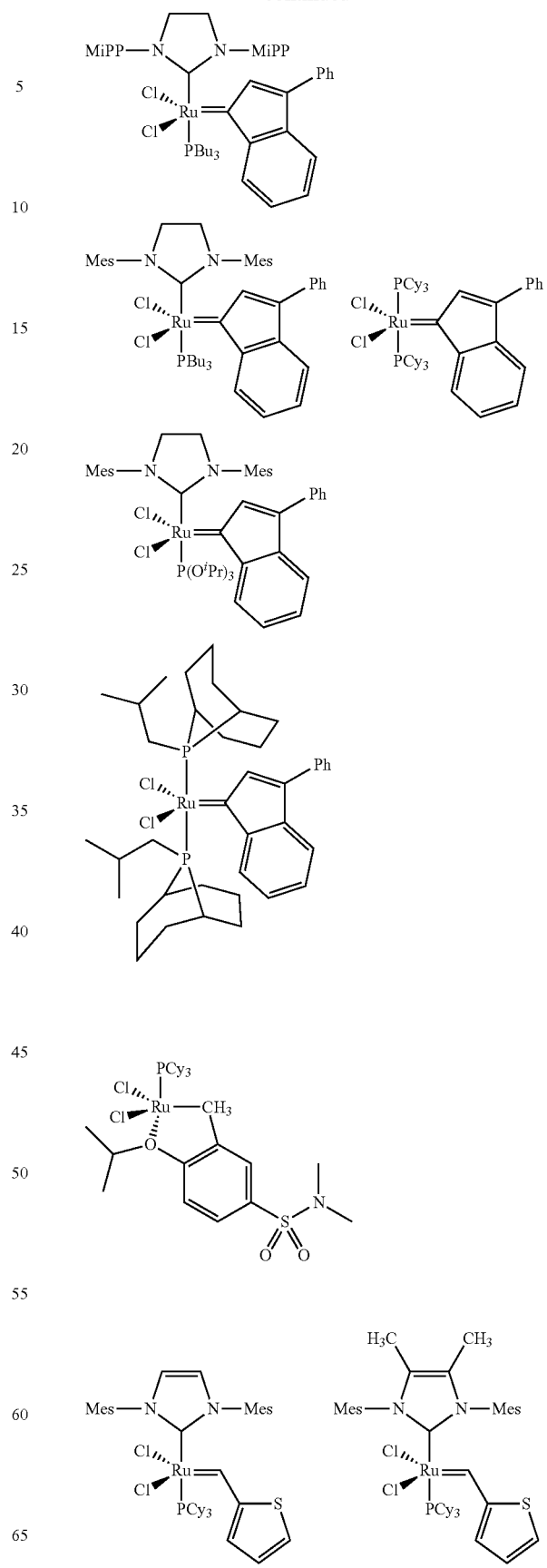

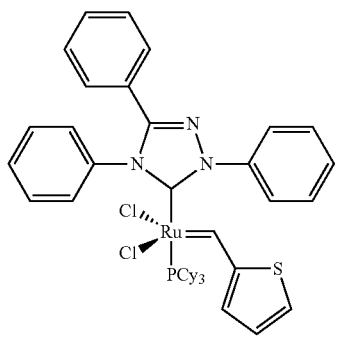

In general, the transition metal complexes used as catalysts herein can be prepared by several different methods, such as those described by Schwab et al. (1996) *J. Am. Chem. Soc.* 118:100-110, Scholl et al. (1999) *Org. Lett.* 6:953-956, Sanford et al. (2001) *J. Am. Chem. Soc.* 123:749-750, U.S. Pat. Nos. 5,312,940, and 5,342,909, the disclosures of each of which are incorporated herein by reference. Also see U.S. Pat. Pub. No. 2003/0055262 to Grubbs et al., WO 02/079208, and U.S. Pat. No. 6,613,910 to Grubbs et al., the disclosures of each of which are incorporated herein by reference. Preferred synthetic methods are described in WO 03/11455A1 to Grubbs et al., the disclosure of which is incorporated herein by reference.

Preferred olefin metathesis catalysts are Group 8 transition metal complexes having the structure of formula (I) commonly called "First Generation Grubbs" catalysts, formula (III) commonly called "Second Generation Grubbs" catalysts, or formula (VII) commonly called "Grubbs-Hoveyda" catalysts.

More preferred olefin metathesis catalysts have the structure of formula (I)

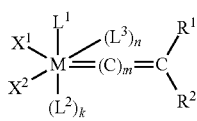

wherein:

M is a Group 8 transition metal;

$L^1$, $L^2$, and $L^3$ are neutral electron donor ligands;

n is 0 or 1;

m is 0, 1, or 2;

k is 0 or 1;

$X^1$ and $X^2$ are anionic ligands; and $R^1$ and $R^2$ are independently selected from hydrogen, hydrocarbyl, substituted hydrocarbyl, heteroatom-containing hydrocarbyl, substituted heteroatom-containing hydrocarbyl, and functional groups, wherein any two or more of $X^1$, $X^2$, $L^1$, $L^2$, $L^3$, $R^1$, and $R^2$ can be taken together to form one or more cyclic groups, and further wherein any one or more of $X^1$, $X^2$, $L^1$, $L^2$, $L^3$, $R^1$, and $R^2$ may be attached to a support;

and formula (VII)

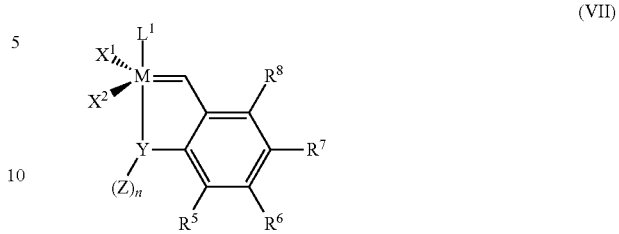

wherein:

M is a Group 8 transition metal;

$L^1$ is a neutral electron donor ligand;

$X^1$ and $X^2$ are anionic ligands;

Y is a heteroatom selected from O or N;

$R^5$, $R^6$, $R^7$, and $R^8$ are independently selected from hydrogen, hydrocarbyl, substituted hydrocarbyl, heteroatom-containing hydrocarbyl, substituted heteroatom-containing hydrocarbyl, and functional groups;

n is 0, 1, or 2; and

Z is selected from hydrogen, hydrocarbyl, substituted hydrocarbyl, heteroatom-containing hydrocarbyl, substituted heteroatom-containing hydrocarbyl, and functional groups, wherein any combination of Y, Z, $R^5$, $R^6$, $R^7$, and $R^8$ can be linked to form one or more cyclic groups, and further wherein any combination of $X^1$, $X^2$, $L^1$, Y, Z, $R^5$, $R^6$, $R^7$, and $R^8$ may be attached to a support.

Most preferred olefin metathesis catalysts have the structure of formula (I)

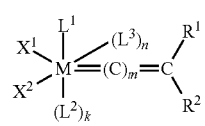

wherein:

M is ruthenium;

n is 0;

m is 0;

k is 1;

$L^1$ and $L^2$ are trisubstituted phosphines independently selected from the group consisting of tri-n-butylphosphine (Pn-Bu$_3$), tricyclopentylphosphine (PCp$_3$), tricyclohexylphosphine (PCy$_3$), triisopropylphosphine (P-i-Pr$_3$), triphenylphosphine (PPh$_3$), methyldiphenylphosphine (PMePh$_2$), dimethylphenylphosphine (PMe$_2$Ph), and diethylphenylphosphine (PEt$_2$Ph); or $L^1$ is an N-heterocyclic carbene selected from the group consisting of 1,3-bis(2,4,6-trimethylphenyl)-2-imidazolidinylidene, 1,3-bis(2,4,6-trimethylphenyl)imidazol-2-ylidene, 1,3-bis(2,6-di-isopropylphenyl)-2-imidazolidinylidene, and 1,3-bis(2,6-di-isopropylphenyl)imidazol-2-ylidene and $L^2$ is a trisubstituted phosphine selected from the group consisting of tri-n-butylphosphine (Pn-Bu$_3$), tricyclopentylphosphine (PCp$_3$), tricyclohexylphosphine (PCy$_3$), triisopropylphosphine (P-i-Pr$_3$), triphenylphosphine (PPh$_3$), methyldiphenylphosphine (PMePh$_2$), dimethylphenylphosphine (PMe$_2$Ph), and diethylphenylphosphine (PEt$_2$Ph);

$X^1$ and $X^2$ are chloride; and $R^1$ is hydrogen and $R^2$ is phenyl or —CH=C(CH$_3$)$_2$ or thienyl; or $R^1$ and $R^2$ are taken together to form 3-phenyl-1H-indene;

and formula (VII)

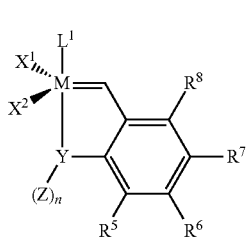

wherein:
M is ruthenium;
L¹ is a trisubstituted phosphine selected from the group consisting of tri-n-butylphosphine (Pn-Bu₃), tricyclopentylphosphine (PCp₃), tricyclohexylphosphine (PCy₃), triisopropylphosphine (P-i-Pr₃), triphenylphosphine (PPh₃), methyldiphenylphosphine (PMePh₂), dimethylphenylphosphine (PMe₂Ph), and diethylphenylphosphine (PEt₂Ph); or L¹ is an N-heterocyclic carbene selected from the group consisting of 1,3-bis(2,4,6-trimethylphenyl)-2-imidazolidinylidene, 1,3-bis(2,4,6-trimethylphenyl)imidazol-2-ylidene, 1,3-bis(2,6-di-isopropylphenyl)-2-imidazolidinylidene, and 1,3-bis(2,6-di-isopropylphenyl)imidazol-2-ylidene;
$X^1$ and $X^2$ are chloride;
Y is oxygen;
$R^5$, $R^6$, $R^7$, and $R^8$ are each hydrogen;
n is 1; and
Z is isopropyl.

Most preferred olefin metathesis catalysts have the structure of formula (I)

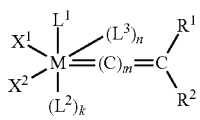

wherein:
M is ruthenium;
n is 0;
m is 0;
k is 1;
L¹ and L² are trisubstituted phosphines independently selected from the group consisting of tri-n-butylphosphine (Pn-Bu₃), tricyclopentylphosphine (PCp₃), tricyclohexylphosphine (PCy₃), triisopropylphosphine (P-i-Pr₃), triphenylphosphine (PPh₃), methyldiphenylphosphine (PMePh₂), dimethylphenylphosphine (PMe₂Ph), and diethylphenylphosphine (PEt₂Ph); or L¹ is an N-heterocyclic carbene selected from the group consisting of 1,3-bis(2,4,6-trimethylphenyl)-2-imidazolidinylidene, 1,3-bis(2,4,6-trimethylphenyl)imidazol-2-ylidene, 1,3-bis(2,6-di-isopropylphenyl)-2-imidazolidinylidene, and 1,3-bis(2,6-di-isopropylphenyl)imidazol-2-ylidene and L² is a trisubstituted phosphine selected from the group consisting of tri-n-butylphosphine (Pn-Bu₃), tricyclopentylphosphine (PCp₃), tricyclohexylphosphine (PCy₃), triisopropylphosphine (P-i-Pr₃), triphenylphosphine (PPh₃), methyldiphenylphosphine (PMePh₂), dimethylphenylphosphine (PMe₂Ph), and diethylphenylphosphine (PEt₂Ph);
$X^1$ and $X^2$ are chloride; and
$R^1$ is hydrogen and $R^2$ is phenyl or —CH=C(CH₃)₂ or thienyl; or $R^1$ and $R^2$ are taken together to form phenylindenylidene;
and formula (VII)

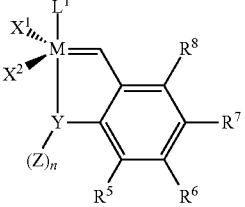

wherein:
M is ruthenium;
L¹ is a trisubstituted phosphine selected from the group consisting of tri-n-butylphosphine (Pn-Bu₃), tricyclopentylphosphine (PCp₃), tricyclohexylphosphine (PCy₃), triisopropylphosphine (P-i-Pr₃), triphenylphosphine (PPh₃), methyldiphenylphosphine (PMePh₂), dimethylphenylphosphine (PMe₂Ph), and diethylphenylphosphine (PEt₂Ph); or L¹ is an N-heterocyclic carbene selected from the group consisting of 1,3-bis(2,4,6-trimethylphenyl)-2-imidazolidinylidene, 1,3-bis(2,4,6-trimethylphenyl)imidazol-2-ylidene, 1,3-bis(2,6-di-isopropylphenyl)-2-imidazolidinylidene, and 1,3-bis(2,6-di-isopropylphenyl)imidazol-2-ylidene;
$X^1$ and $X^2$ are chloride;
Y is oxygen;
$R^5$, $R^6$, $R^7$, and $R^8$ are each hydrogen;
n is 1; and
Z is isopropyl.

Examples of preferred olefin metathesis catalysts have the structure of formula (VII)

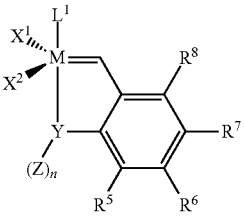

wherein:
M is ruthenium;
L¹ is a trisubstituted phosphine selected from the group consisting of tri-n-butylphosphine (Pn-Bu₃), tricyclopentylphosphine (PCp₃), tricyclohexylphosphine (PCy₃), triisopropylphosphine (P-i-Pr₃), triphenylphosphine (PPh₃), methyldiphenylphosphine (PMePh₂), dimethylphenylphosphine (PMe₂Ph), and diethylphenylphosphine (PEt₂Ph); or L¹ is an N-heterocyclic carbene selected from the group consisting of 1,3-bis(2,4,6-trimethylphenyl)-2-imidazolidinylidene, 1,3-bis(2,4,6-trimethylphenyl)imidazol-2-ylidene, 1,3-bis(2,6-di-isopropylphenyl)-2-imidazolidinylidene, and 1,3-bis(2,6-di-isopropylphenyl)imidazol-2-ylidene;
$X^1$ and $X^2$ are chloride;
Y is oxygen;
$R^5$, $R^6$, $R^7$, and $R^8$ are each hydrogen;
n is 1; and
Z is isopropyl.

Examples of preferred olefin metathesis catalysts have the structure of formula (I)

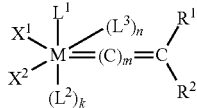
(I)

wherein:
M is Ruthenium;
n is 0;
m is 0;
k is 1;
L¹ is an N-heterocyclic carbene selected from the group consisting of 1,3-bis(2,4,6-trimethylphenyl)-2-imidazolidinylidene and 1,3-bis(2,4,6-trimethylphenyl)imidazol-2-ylidene;
L² is a trisubstituted phosphine independently selected from the group consisting of tri-n-butylphosphine (Pn-Bu₃), tricyclopentylphosphine (PCp₃), tricyclohexylphosphine (PCy₃), triisopropylphosphine (P-i-Pr₃), triphenylphosphine (PPh₃), methyldiphenylphosphine (PMePh₂), dimethylphenylphosphine (PMe₂Ph), and diethylphenylphosphine (PEt₂Ph);
X¹ and X² are chloride; and
R¹ is hydrogen and R² is phenyl or —CH═C(CH₃)₂ or thienyl; or R¹ and R² are taken together to form phenylindenylidene.

Examples of preferred olefin metathesis catalysts have the structure of formula (I)

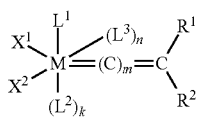
(I)

wherein:
M is Ruthenium;
n is 0;
m is 0;
k is 1;
L¹ is an N-heterocyclic carbene 1,3-bis(2,4,6-trimethylphenyl)-2-imidazolidinylidene;
L² is a trisubstituted phosphine independently selected from the group consisting of tri-n-butylphosphine (Pn-Bu₃), tricyclopentylphosphine (PCp₃), tricyclohexylphosphine (PCy₃), triisopropylphosphine (P-i-Pr₃), triphenylphosphine (PPh₃), methyldiphenylphosphine (PMePh₂), dimethylphenylphosphine (PMe₂Ph), and diethylphenylphosphine (PEt₂Ph);
X¹ and X² are chloride; and
R¹ is hydrogen and R² is phenyl or —CH═C(CH₃)₂ or thienyl; or R¹ and R² are taken together to form phenylindenylidene.

Examples of preferred olefin metathesis catalysts have the structure of formula (I)

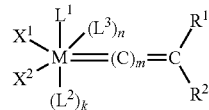
(I)

wherein:
M is Ruthenium;
n is 0;
m is 0;
k is 1;
L¹ is an N-heterocyclic carbene 1,3-bis(2,4,6-trimethylphenyl)imidazol-2-ylidene;
L² is a trisubstituted phosphine independently selected from the group consisting of tri-n-butylphosphine (Pn-Bu₃), tricyclopentylphosphine (PCp₃), tricyclohexylphosphine (PCy₃), triisopropylphosphine (P-i-Pr₃), triphenylphosphine (PPh₃), methyldiphenylphosphine (PMePh₂), dimethylphenylphosphine (PMe₂Ph), and diethylphenylphosphine (PEt₂Ph);
X¹ and X² are chloride; and
R¹ is hydrogen and R² is phenyl or —CH═C(CH₃)₂ or thienyl; or R¹ and R² are taken together to form phenylindenylidene.

Examples of preferred olefin metathesis catalysts have the structure of formula (I)

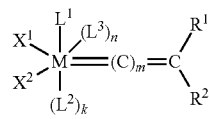
(I)

wherein:
M is Ruthenium;
n is 0;
m is 0;
k is 1;
L¹ is an N-heterocyclic carbene selected from the group consisting of 1,3-bis(2,4,6-trimethylphenyl)-2-imidazolidinylidene and 1,3-bis(2,4,6-trimethylphenyl)imidazol-2-ylidene;
L² is a trisubstituted phosphine independently selected from the group consisting of tri-n-butylphosphine (Pn-Bu₃), tricyclopentylphosphine (PCp₃), tricyclohexylphosphine (PCy₃), triisopropylphosphine (P-i-Pr₃), triphenylphosphine (PPh₃), methyldiphenylphosphine (PMePh₂), dimethylphenylphosphine (PMe₂Ph), and diethylphenylphosphine (PEt₂Ph);
X¹ and X² are chloride; and
R¹ is hydrogen and R² is phenyl or —CH═C(CH₃)₂; or R¹ and R² are taken together to form phenylindenylidene.

Examples of preferred olefin metathesis catalysts have the structure of formula (I)

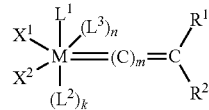
(I)

wherein:
M is Ruthenium;
n is 0;
m is 0;
k is 1;
L¹ is an N-heterocyclic carbene 1,3-bis(2,4,6-trimethylphenyl)-2-imidazolidinylidene;
L² is a trisubstituted phosphine independently selected from the group consisting of tri-n-butylphosphine (Pn-Bu₃), tricyclopentylphosphine (PCp₃), tricyclohexylphosphine (PCy₃), triisopropylphosphine (P-i-Pr₃), triphenylphosphine (PPh₃), methyldiphenylphosphine (PMePh₂), dimethylphenylphosphine (PMe₂Ph), and diethylphenylphosphine (PEt₂Ph);
X¹ and X² are chloride; and
R¹ is hydrogen and R² is phenyl or —CH═C(CH₃)₂; or R¹ and R² are taken together to form phenylindenylidene.
Examples of preferred olefin metathesis catalysts have the structure of formula (I)

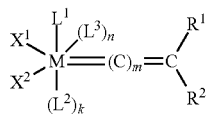

(I)

wherein:
M is Ruthenium;
n is 0;
m is 0;
k is 1;
L¹ is an N-heterocyclic carbene 1,3-bis(2,4,6-trimethylphenyl)imidazol-2-ylidene;
L² is a trisubstituted phosphine independently selected from the group consisting of tri-n-butylphosphine (Pn-Bu₃), tricyclopentylphosphine (PCp₃), tricyclohexylphosphine (PCy₃), triisopropylphosphine (P-i-Pr₃), triphenylphosphine (PPh₃), methyldiphenylphosphine (PMePh₂), dimethylphenylphosphine (PMe₂Ph), and diethylphenylphosphine (PEt₂Ph);
X¹ and X² are chloride; and
R¹ is hydrogen and R² is phenyl or —CH═C(CH₃)₂; or R¹ and R² are taken together to form phenylindenylidene.
Examples of preferred olefin metathesis catalysts have the structure of formula (I)

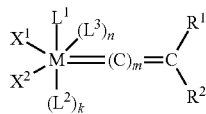

(I)

wherein:
M is Ruthenium;
n is 0;
m is 0;
k is 1;
L¹ is an N-heterocyclic carbene selected from the group consisting of 1,3-bis(2,4,6-trimethylphenyl)-2-imidazolidinylidene and 1,3-bis(2,4,6-trimethylphenyl)imidazol-2-ylidene;
L² is a trisubstituted phosphine independently selected from the group consisting of tri-n-butylphosphine (Pn-Bu₃), tricyclopentylphosphine (PCp₃), tricyclohexylphosphine (PCy₃), triisopropylphosphine (P-i-Pr₃), triphenylphosphine (PPh₃), methyldiphenylphosphine (PMePh₂), dimethylphenylphosphine (PMe₂Ph), and diethylphenylphosphine (PEt₂Ph);
X¹ and X² are chloride;
R¹ is hydrogen; and
R² is phenyl or —CH═C(CH₃)₂.
Examples of preferred olefin metathesis catalysts have the structure of formula (I)

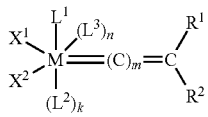

(I)

wherein:
M is Ruthenium;
n is 0;
m is 0;
k is 1;
L¹ is an N-heterocyclic carbene 1,3-bis(2,4,6-trimethylphenyl)-2-imidazolidinylidene;
L² is a trisubstituted phosphine independently selected from the group consisting of tri-n-butylphosphine (Pn-Bu₃), tricyclopentylphosphine (PCp₃), tricyclohexylphosphine (PCy₃), triisopropylphosphine (P-i-Pr₃), triphenylphosphine (PPh₃), methyldiphenylphosphine (PMePh₂), dimethylphenylphosphine (PMe₂Ph), and diethylphenylphosphine (PEt₂Ph);
X¹ and X² are chloride;
R¹ is hydrogen; and
R² is phenyl or —CH═C(CH₃)₂.
Examples of preferred olefin metathesis catalysts have the structure of formula (I)

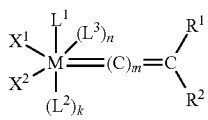

(I)

wherein:
M is Ruthenium;
n is 0;
m is 0;
k is 1;
L¹ is an N-heterocyclic carbene 1,3-bis(2,4,6-trimethylphenyl)imidazol-2-ylidene;
L² is a trisubstituted phosphine independently selected from the group consisting of tri-n-butylphosphine (Pn-Bu₃), tricyclopentylphosphine (PCp₃), tricyclohexylphosphine (PCy₃), triisopropylphosphine (P-i-Pr₃), triphenylphosphine (PPh₃), methyldiphenylphosphine (PMePh₂), dimethylphenylphosphine (PMe₂Ph), and diethylphenylphosphine (PEt₂Ph);
X¹ and X² are chloride;
R¹ is hydrogen; and
R² is phenyl or —CH═C(CH₃)₂.
Examples of preferred olefin metathesis catalysts have the structure of formula (I)

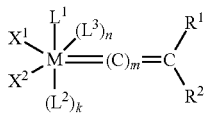

wherein:
M is Ruthenium;
n is 0;
m is 0;
k is 1;
L¹ is an N-heterocyclic carbene selected from the group consisting of 1,3-bis(2,4,6-trimethylphenyl)-2-imidazolidinylidene and 1,3-bis(2,4,6-trimethylphenyl)imidazol-2-ylidene;
L² is a trisubstituted phosphine independently selected from the group consisting of tri-n-butylphosphine (Pn-Bu₃), tricyclopentylphosphine (PCp₃), tricyclohexylphosphine (PCy₃), triisopropylphosphine (P-i-Pr₃), triphenylphosphine (PPh₃), methyldiphenylphosphine (PMePh₂), dimethylphenylphosphine (PMe₂Ph), and diethylphenylphosphine (PEt₂Ph);
X¹ and X² are chloride; and
R¹ and R² are taken together to form phenylindenylidene.
Examples of preferred olefin metathesis catalysts have the structure of formula (I)

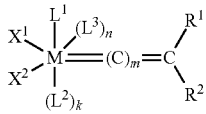

wherein:
M is Ruthenium;
n is 0;
m is 0;
k is 1;
L¹ is an N-heterocyclic carbene 1,3-bis(2,4,6-trimethylphenyl)-2-imidazolidinylidene;
L² is a trisubstituted phosphine independently selected from the group consisting of tri-n-butylphosphine (Pn-Bu₃), tricyclopentylphosphine (PCp₃), tricyclohexylphosphine (PCy₃), triisopropylphosphine (P-i-Pr₃), triphenylphosphine (PPh₃), methyldiphenylphosphine (PMePh₂), dimethylphenylphosphine (PMe₂Ph), and diethylphenylphosphine (PEt₂Ph);
X¹ and X² are chloride; and
R¹ and R² are taken together to form phenylindenylidene.
Examples of preferred olefin metathesis catalysts have the structure of formula (I)

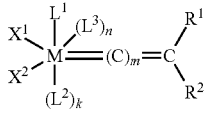

wherein:
M is ruthenium;
n is 0;
m is 0;
k is 1;
L¹ is an N-heterocyclic carbene 1,3-bis(2,4,6-trimethylphenyl)imidazol-2-ylidene;
L² is a trisubstituted phosphine independently selected from the group consisting of tri-n-butylphosphine (Pn-Bu₃), tricyclopentylphosphine (PCp₃), tricyclohexylphosphine (PCy₃), triisopropylphosphine (P-i-Pr₃), triphenylphosphine (PPh₃), methyldiphenylphosphine (PMePh₂), dimethylphenylphosphine (PMe₂Ph), and diethylphenylphosphine (PEt₂Ph);
X¹ and X² are chloride; and
R¹ and R² are taken together to form phenylindenylidene.
Examples of preferred olefin metathesis catalysts have the structure of formula (I)

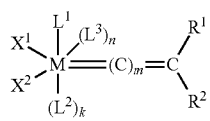

wherein:
M is ruthenium;
n is 0;
m is 1;
k is 1;
L¹ and L² are trisubstituted phosphines independently selected from the group consisting of tri-n-butylphosphine (Pn-Bu₃), tricyclopentylphosphine (PCp₃), tricyclohexylphosphine (PCy₃), triisopropylphosphine (P-i-Pr₃), triphenylphosphine (PPh₃), methyldiphenylphosphine (PMePh₂), dimethylphenylphosphine (PMe₂Ph), and diethylphenylphosphine (PEt₂Ph); or L¹ is an N-heterocyclic carbene selected from the group consisting of 1,3-bis(2,4,6-trimethylphenyl)-2-imidazolidinylidene, and 1,3-bis(2,4,6-trimethylphenyl)imidazol-2-ylidene, and L² is a trisubstituted phosphine selected from the group consisting of tri-n-butylphosphine (Pn-Bu₃), tricyclopentylphosphine (PCp₃), tricyclohexylphosphine (PCy₃), triisopropylphosphine (P-i-Pr₃), triphenylphosphine (PPh₃), methyldiphenylphosphine (PMePh₂), dimethylphenylphosphine (PMe₂Ph), and diethylphenylphosphine (PEt₂Ph);
X¹ and X² are chloride;
R¹ is hydrogen; and
R² is phenyl or tert-butyl.
Examples of preferred olefin metathesis catalysts have the structure of formula (I)

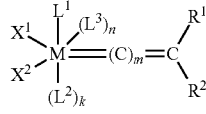

wherein:
M is ruthenium;
n is 0;
m is 1;
k is 1;
L¹ is an N-heterocyclic carbene selected from the group consisting of 1,3-bis(2,4,6-trimethylphenyl)-2-imidazolidinylidene and 1,3-bis(2,4,6-trimethylphenyl)imidazol-2-ylidene;

L² is a trisubstituted phosphine selected from the group consisting of tri-n-butylphosphine (Pn-Bu₃), tricyclopentylphosphine (PCp₃), tricyclohexylphosphine (PCy₃), triisopropylphosphine (P-i-Pr₃), triphenylphosphine (PPh₃), methyldiphenylphosphine (PMePh₂), dimethylphenylphosphine (PMe₂Ph), and diethylphenylphosphine (PEt₂Ph);
X¹ and X² are chloride;
R¹ is hydrogen; and
R² is phenyl or tert-butyl.

Examples of preferred olefin metathesis catalysts have the structure of formula (I)

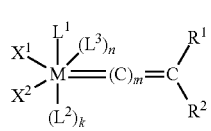

wherein:
M is ruthenium;
n is 0;
m is 1;
k is 1;
L¹ is an N-heterocyclic carbene 1,3-bis(2,4,6-trimethylphenyl)-2-imidazolidinylidene;
L² is a trisubstituted phosphine selected from the group consisting of tri-n-butylphosphine (Pn-Bu₃), tricyclopentylphosphine (PCp₃), tricyclohexylphosphine (PCy₃), triisopropylphosphine (P-i-Pr₃), triphenylphosphine (PPh₃), methyldiphenylphosphine (PMePh₂), dimethylphenylphosphine (PMe₂Ph), and diethylphenylphosphine (PEt₂Ph);
X¹ and X² are chloride;
R¹ is hydrogen; and
R² is phenyl or tert-butyl.

Examples of preferred olefin metathesis catalysts have the structure of formula (I)

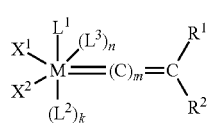

in which:
M is ruthenium;
n is 0;
m is 1;
k is 1;
L¹ is an N-heterocyclic carbene 1,3-bis(2,4,6-trimethylphenyl)imidazol-2-ylidene;
L² is a trisubstituted phosphine selected from the group consisting of tri-n-butylphosphine (Pn-Bu₃), tricyclopentylphosphine (PCp₃), tricyclohexylphosphine (PCy₃), triisopropylphosphine (P-i-Pr₃), triphenylphosphine (PPh₃), methyldiphenylphosphine (PMePh₂), dimethylphenylphosphine (PMe₂Ph), and diethylphenylphosphine (PEt₂Ph);
X¹ and X² are chloride;
R¹ is hydrogen; and
R² is phenyl or tert-butyl.

Suitable supports for any of the catalysts described herein may be of synthetic, semi-synthetic, or naturally occurring materials, which may be organic or inorganic, e.g., polymeric, ceramic, or metallic. Attachment to the support will generally, although not necessarily, be covalent, and the covalent linkage may be direct or indirect. Indirect covalent linkages are typically, though not necessarily, through a functional group on a support surface. Ionic attachments are also suitable, including combinations of one or more anionic groups on the metal complexes coupled with supports containing cationic groups, or combinations of one or more cationic groups on the metal complexes coupled with supports containing anionic groups.

When utilized, suitable supports may be selected from silicas, silicates, aluminas, aluminum oxides, silica-aluminas, aluminosilicates, zeolites, titanias, titanium dioxide, magnetite, magnesium oxides, boron oxides, clays, zirconias, zirconium dioxide, carbon, polymers, cellulose, cellulosic polymers amylose, amylosic polymers, or a combination thereof. The support preferably comprises silica, a silicate, or a combination thereof.

In certain embodiments, it is also possible to use a support that has been treated to include functional groups, inert moieties, and/or excess ligands. Any of the functional groups described herein are suitable for incorporation on the support, and may be generally accomplished through techniques known in the art. Inert moieties may also be incorporated on the support to generally reduce the available attachment sites on the support, e.g., in order to control the placement, or amount, of a complex linked to the support.

The metathesis catalysts that are described infra may be utilized in olefin metathesis reactions according to techniques known in the art. The catalyst is typically added to the resin composition as a solid, a solution, or as a suspension. When the catalyst is added to the resin composition as a suspension, the catalyst is suspended in a dispersing carrier such as mineral oil, paraffin oil, soybean oil, tri-isopropylbenzene, or any hydrophobic liquid which has a sufficiently high viscosity so as to permit effective dispersion of the catalyst, and which is sufficiently inert and which has a sufficiently high boiling point so that is does not act as a low-boiling impurity in the olefin metathesis reaction. It will be appreciated that the amount of catalyst that is used (i.e., the "catalyst loading") in the reaction is dependent upon a variety of factors such as the identity of the reactants and the reaction conditions that are employed. It is therefore understood that catalyst loading may be optimally and independently chosen for each reaction. In general, however, the catalyst will be present in an amount that ranges from a low of about 0.1 ppm, 1 ppm, or 5 ppm, to a high of about 10 ppm, 15 ppm, 25 ppm, 50 ppm, 100 ppm, 200 ppm, 500 ppm, or 1000 ppm relative to the amount of an olefinic substrate.

The catalyst will generally be present in an amount that ranges from a low of about 0.00001 mol %, 0.0001 mol %, or 0.0005 mol %, to a high of about 0.001 mol %, 0.0015 mol %, 0.0025 mol %, 0.005 mol %, 0.01 mol %, 0.02 mol %, 0.05 mol %, or 0.1 mol % relative to the olefinic substrate.

When expressed as the molar ratio of monomer to catalyst, the catalyst (the "monomer to catalyst ratio"), loading will generally be present in an amount that ranges from a low of about 10,000,000:1, 1,000,000:1, or 200,00:1, to a high of about 100,000:1 66,667:1, 40,000:1, 20,000:1, 10,000:1, 5,000:1, or 1,000:1.

Cyclic Olefin (Resin) Compositions and Articles

Cyclic olefin resin, particularly ROMP, compositions according to the invention, generally comprise at least one cyclic olefin, at least one olefin metathesis catalyst, at least one adhesion promoter composition of the invention, and at least one substrate material, such as, for example, a glass or carbon substrate material. In another embodiment, cyclic olefin resin, particularly ROMP, compositions according to the invention, generally comprise at least one cyclic olefin, at least one olefin metathesis catalyst, at least one adhesion promoter composition of the invention, and at least one heteroatom-functionalized substrate. The cyclic olefins described hereinabove are suitable for use and may be functionalized or unfunctionalized, and may be substituted or unsubstituted. In general, particularly advantageous results may be obtained for ROMP resin compositions wherein an adhesion promoter composition of the invention is present in an amount effective to improve the adhesion of the ROMP composition to the substrate material when the ROMP composition is subjected to metathesis catalysis conditions in the presence of the substrate material. Additionally, cyclic olefin resin compositions according to the invention may also comprise at least one cyclic olefin, at least one adhesion promoter composition of the invention, where the resin composition is combined with at least one olefin metathesis catalyst, and the resulting resin composition is applied to at least one substrate, such as, for example, a glass substrate or carbon substrate. Additionally, cyclic olefin resin compositions according to the invention may also comprise at least one cyclic olefin, at least one adhesion promoter composition of the invention, where the resin composition is combined with at least one olefin metathesis catalyst, and the resulting resin composition is applied to at least one substrate, wherein the substrate may be functionalized substrate, such as, for example, a heteroatom-functionalized substrate, such as, for example, an amino-functionalized substrate.

The amounts of the adhesion promoter composition in the resin composition may vary over a wide range and may vary depending on the manufacturing operation or the particular end-use application. Generally, any level of adhesion promoter composition which produces a desired increase in mechanical properties is of particular interest. When formulated or combined with a resin composition, the concentration of the adhesion promoter composition typically ranges from 0.001-50 phr, particularly 0.05-10 phr, more particularly 0.1-10 phr, or even more particularly 0.5-4.0 phr.

In a preferred aspect of the invention, increased mechanical properties may also be obtained for resin compositions comprising at least one cyclic olefin, at least one olefin metathesis catalyst, at least one adhesion promoter composition of the invention, and at least one substrate material, or resin compositions comprising at least one cyclic olefin, at least one olefin metathesis catalyst, at least one adhesion promoter composition of the invention where the resin composition is applied to at least one substrate material, compared to such resin compositions without the adhesion promoter composition of the invention. For example, the inclusion of an adhesion promoter composition of the invention may provide an improvement in mechanical properties, such as interlaminar shear strength (ILSS) compared to the same resin composition that does not contain an adhesion promoter composition of the invention. In particular aspects of the present invention, substrate materials may advantageously comprise an aminosilane-treated substrate.

In another embodiment, resin compositions according to the invention may additionally comprise an exogenous inhibitor. Exogenous inhibitors or "gel modification additives", for use in the present invention are disclosed in U.S. Pat. No. 5,939,504, the contents of which are incorporated herein by reference. In another embodiment, resin compositions according to the invention may additionally comprise a hydroperoxide gel modifier. Hydroperoxide gel modifiers for use in the present invention are disclosed in International Pat. App. No. PCT/US2012/042850, the contents of which are incorporated herein by reference.

Resin compositions of the invention may be optionally formulated with additives. Suitable additives include, but are not limited to, gel modifiers, hardness modulators, antioxidants, antiozonants, stabilizers, impact modifiers, fillers, binders, coupling agents, thixotropes, wetting agents, biocides, plasticizers, pigments, flame retardants, dyes, fibers and reinforcement materials, including sized reinforcements and substrates, such as those treated with finishes, coatings, coupling agents, film formers and/or lubricants. Furthermore, the amount of additives present in the resin compositions may vary depending on the particular type of additive used. The concentration of the additives in the resin compositions typically ranges from, for example, 0.001-85 percent by weight, particularly, from 0.1-75 percent by weight, or even more particularly, from 2-60 percent by weight.

Suitable impact modifiers or elastomers include without limitation natural rubber, butyl rubber, polyisoprene, polybutadiene, polyisobutylene, ethylene-propylene copolymer, styrene-butadiene-styrene triblock rubber, random styrene-butadiene rubber, styrene-isoprene-styrene triblock rubber, styrene-ethylene/butylene-styrene copolymer, styrene-ethylene/propylene-styrene copolymer, ethylene-propylene-diene terpolymers, ethylene-vinyl acetate and nitrile rubbers. Preferred impact modifiers or elastomers are polybutadiene Diene 55AC10 (Firestone), polybutadiene Diene 55AM5 (Firestone), EPDM Royalene 301T, EPDM Buna T9650 (Lanxess), styrene-ethylene/butylene-styrene copolymer Kraton G1651H, Butyl 301 isobutylene-isoprene copolymer (Lanxess), Buna CB 710 polybutadiene (formerly Taktene® 710; Lanxess), styrene-ethylene/butylene-styrene Kraton G1726M, Ethylene-Octene Engage 8150 (DuPont-Dow), styrene-butadiene Kraton D1184, EPDM Nordel 1070 (DuPont-Dow), and polyisobutylene Vistanex MML-140 (Exxon). Such materials are normally employed in the resin composition at levels of about 0.10 phr to 10 phr, but more preferably at levels of about 0.1 phr to 5 phr. Various polar impact modifiers or elastomers can also be used.

Resin compositions of the invention may be optionally formulated with or without a crosslinker, for example, a crosslinker selected from dialkyl peroxides, diacyl peroxides, and peroxyacids.

Antioxidants and antiozonants include any antioxidant or antiozonant used in the rubber or plastics industry. An "Index of Commercial Antioxidants and Antiozonants, Fourth Edition" is available from Goodyear Chemicals, The Goodyear Tire and Rubber Company, Akron, Ohio 44316. Suitable stabilizers (i.e., antioxidants or antiozonants) include without limitation: 2,6-di-tert-butyl-4-methylphenol (BHT); styrenated phenol, such as Wingstay® S (Goodyear); 2- and 3-tert-butyl-4-methoxyphenol; alkylated hindered phenols, such as Wingstay® C (Goodyear); 4-hydroxymethyl-2,6-di-tert-butylphenol; 2,6-di-tert-butyl-4-sec-butylphenol; 2,2'-methylenebis(4-methyl-6-tert-butylphenol); 2,2'-methylenebis(4-ethyl-6-tert-butylphenol); 4,4'-methylenebis(2,6-di-tert-butylphenol); miscellaneous bisphenols, such as Cyanox® 53 and Permanax WSO; 2,2'-ethylidenebis(4,6-di-tert-butylphenol); 2,2'-methylenebis(4-methyl-6-(1-methylcyclohexyl)phenol); 4,4'-butylidenebis(6-tert-butyl-3-methylphenol); polybutylated Bisphenol A; 4,4'-thiobis(6-tert-butyl-3-methylphenol); 4,4'-methylenebis(2,6-dimethylphenol); 1,1'-thiobis(2-naphthol); methylene bridged polyaklylphenol, such as Ethyl antioxidant 738; 2,2'-thiobis(4-methyl-6-tertbutylphenol); 2,2'-isobutylidenebis(4,6-dimethylphenol); 2,2'-methylenebis(4-methyl-6-cyclohexylphenol); butylated reaction product of p-cresol and dicyclopentadiene, such as Wingstay L; tetrakis(methylene-3,5-di-tert-butyl-4-hydroxyhydrocinnamate)methane, i.e., Irganox 1010; 1,3,5-trimethyl-2,4,6-tris(3,5-di-tert-butyl-4-hydroxybenzyl)benzene, e.g., Ethanox 330; 4,4'-methylenebis (2,6-di-tertiarybutylphenol), e.g., Ethanox 4702 or Ethanox 4710; 1,3,5-tris(3,5-di-tert-butyl-4-hydroxybenzyl)isocyanurate, i.e., Good-rite 3114, 2,5-di-tert-amylhydroquinone, tert-butylhydroquinone, tris(nonylphenylphosphite), bis(2,4-di-tert-butyl)pentaerythritol)diphosphite, distearyl pentaerythritol diphosphite, phosphited phenols and bisphenols, such as Naugard 492, phosphite/phenolic antioxidant blends, such as Irganox B215; di-n-octadecyl(3,5-di-tert-butyl-4-hydroxybenzyl)phosphonate, such as Irganox 1093; 1,6-hexamethylene bis(3-(3,5-di-tert-butyl-4-hydroxyphenylpropionate), such as Irganox 259, and octadecyl-3,5-di-tert-butyl-4-hydroxyhydrocinnamate, i.e., Irganox 1076, tetrakis(2,4-di-tert-butylphenyl)4,4'-biphenylylenediphosphonite, diphenylamine, and 4,4'-diemthoxydiphenylamine. Such materials are normally employed in the resin composition at levels of about 0.10 phr to 10 phr, but more preferably at levels of about 0.1 phr to 5 phr.

Suitable reinforcing materials include those that add to the strength or stiffness of a polymer composite when incorporated with the polymer. Reinforcing materials can be in the form of filaments, fibers, rovings, mats, weaves, fabrics, knitted material, cloth, or other known structures. Suitable reinforcement materials include glass fibers and fabrics, carbon fibers and fabrics, aramid fibers and fabrics, polyolefin fibers or fabrics (including ultrahigh molecular weight polyethylene fabrics such as those produced by Honeywell under the Spectra trade name), and polyoxazole fibers or fabrics (such as those produced by the Toyobo Corporation under the Zylon trade name). Reinforcing materials containing surface finishes, sizings, or coatings are particularly suitable for the described invention including Ahlstrom glass roving (R338-2400), Johns Manville glass roving (Star ROV®-086), Owens Corning rovings (OCV 366-AG-207, R25H-X14-2400, SE1200-207, SE1500-2400, SE2350-250), PPG glass rovings (Hybon® 2002, Hybon® 2026), Toho Tenax® carbon fiber tow (HTR-40), and Zoltek carbon fiber tow (Panex® 35). Furthermore, any fabrics prepared using reinforcing materials containing surface finishes, sizings or coatings are suitable for the invention. Advantageously, the invention does not require the expensive process of removing of surface finishes, sizings, or coatings from the reinforcing materials. Additionally, glass fibers or fabrics may include without limitation A-glass, E-glass or S-glass, S-2 glass, C-glass, R-glass, ECR-glass, M-glass, D-glass, and quartz, and silica/quartz. Preferred glass fiber reinforcements are those with finishes formulated for use with epoxy, vinyl ester, and/or polyurethane resins. When formulated for use with a combination of these resin types, the reinforcements are sometimes described as "multi-compatible." Such reinforcements are generally treated during their manufacture with organosilane coupling agents comprising vinyl, amino, glycidoxy, or methacryloxy functional groups (or various combinations thereof) and are coated with a finish to protect the fiber surface and facilitate handling and processing (e.g., spooling and weaving). Finishes typically comprise a mixture of chemical and polymeric compounds such as film formers, surfactants, and lubricants. Especially preferred glass reinforcements are those containing some amount of amino-functionalized silane coupling agent. Especially preferred finishes are those comprising and epoxy-based and/or polyurethane-based film formers. Examples of preferred glass-fiber reinforcements are those based on Hybon® 2026, 2002, and 2001 (PPG) multi-compatible rovings; Ahlstrom R338 epoxysilane-sized rovings; StarRov® 086 (Johns Manville) soft silane sized multi-compatible rovings; OCV™ 366, SE 1200, and R25H (Owens Corning) multi-compatible rovings; OCV™ SE 1500 and 2350 (Owens Corning) epoxy-compatible rovings; and Jushi Group multi-compatible glass rovings (752 type, 396 type, 312 type, 386 type). Additional suitable polymer fibers and fabrics may include without limitation one or more of polyester, polyamide (for example, NYLON polamide available from E.I. DuPont, aromatic polyamide (such as KEVLAR aromatic polyamide available from E.I. DuPont, or P84 aromatic polyamide available from Lenzing Aktiengesellschaft), polyimide (for example KAPTON polyimide available from E.I. DuPont, polyethylene (for example, DYNEEMA polyethylene from Toyobo Co., Ltd.). Additional suitable carbon fibers may include without limitation AS2C, AS4, AS4C, AS4D, AS7, IM6, IM7, IM9, and PV42/850 from Hexcel Corporation; TORAYCA T300, T300J, T400H, T600S, T700S, T700G, T800H, T800S, T1000G, M35J, M40J, M46J, M50J, M55J, M60J, M305, M30G and M40 from Toray Industries, Inc.; HTS12K/24K, G30-500 3k/6K/12K, G30-500 12K, G30-700 12K, G30-7000 24K F402, G40-800 24K, STS 24K, HTR 40 F22 24K 1550tex from Toho Tenax, Inc.; 34-700, 34-700WD, 34-600, 34-600WD, and 34-600 unsized from Grafil Inc.; T-300, T-650/35, T-300C, and T-650/35C from Cytec Industries. Additionally suitable carbon fibers may include without limitation AKSACA (A42/D011), AKSACA (A42/D012), Blue Star Starafil (10253512-90), Blue Star Starafil (10254061-130), SGL Carbon (C30 T050 1.80), SGL Carbon (C50 T024 1.82), Grafil (347R1200U), Grafil (THR 6014A), Grafil (THR 6014K), Hexcel Carbon (AS4C/EXP 12K), Mitsubishi (Pyrofil TR 50S 12L AF), Mitsubishi (Pyrofil TR 50S 12L AF), Toho Tenax (T700SC 12000-50C), Toray (T700SC 12000-90C), Zoltek (Panex 35 50K, sizing 11), Zoltek (Panex 35 50K, sizing 13). Additional suitable carbon fabrics may include without limitation Carbon fabrics by Vectorply (C-L 1800) and Zoltek (Panex 35 UD Fabic-PX35UD0500-1220). Additionally suitable glass fabrics may include without limitation glass fabrics as supplied by Vectorply (E-LT 3500-10) based on PPG Hybon® 2026; Saertex (U14EU970-01190-T2525-125000) based on PPG Hybon® 2002; Chongqing Polycomp Internation Corp. (CPIC Fiberglass) (EKU 1150(0)/50-600); and Owens Corning (L1020/07A06 Xweft 200tex), and SGL Kumpers (HPT970) based on PPG Hybon® 2002.

Other suitable fillers include, for example, metallic density modulators, microparticulate density modulators, such as, for example, microspheres, and macroparticulate density modulators, such as, for example, glass or ceramic beads. Metallic density modulators include, but are not limited to, powdered, sintered, shaved, flaked, filed, particulated, or granulated metals, metal oxides, metal nitrides, and/or metal carbides, and the like. Preferred metallic density modulators include, among others, tungsten, tungsten carbide, aluminum, titanium, iron, lead, silicon oxide, aluminum oxide, boron carbide, and silicon carbide. Microparticulate density modulators include, but are not limited to, glass, metal, thermoplastic (either expandable or pre-expanded) or thermoset, and/or ceramic/silicate microspheres. Macroparticulate density modulators include, but are not limited to, glass, plastic, or ceramic beads; metal rods, chunks, pieces, or shot; hollow glass, ceramic, plastic, or metallic spheres, balls, or tubes; and the like.

The invention is also directed to articles manufactured from a resin composition comprising a at least one cyclic olefin, at least one olefin metathesis catalyst, at least one storage stable adhesion promoter composition, and at least one substrate material, where the at least one storage stable adhesion promoter composition is a pre-reacted mixture of at least one compound containing at least two isocyanate groups and at least one compound comprising at least one heteroatom-containing functional group and at least one metathesis active olefin. Additionally, the invention is directed to articles manufactured from a resin composition comprising at least one cyclic olefin and at least one storage stable adhesion promoter composition, where the where the at least one storage stable adhesion promoter composition is a pre-reacted mixture of at least one compound containing at least two isocyanate groups and at least one compound comprising at least one heteroatom-containing functional group and at least one metathesis active olefin, where the resin composition is combined with an olefin metathesis catalyst, and the resulting resin composition is applied to a substrate, which may be, for example, a functionalized substrate, such as, for example, a heteroatom-functionalized substrate, such as, for example, an amino-functionalized substrate.

Articles may include, but are not limited to, those formed by standard manufacturing techniques including casting, centrifugal casting, pultrusion, molding, rotational molding, open molding, reaction injection molding (RIM), resin transfer molding (RTM), pouring, vacuum impregnation, surface coating, filament winding and other methods known to be useful for production of polymer articles. Molded parts include but are not limited to reaction injection molding, resin transfer molding, and vacuum assisted resin transfer molding. Furthermore, the compositions and articles of manufacture of the invention are not limited to a single polymer-surface interface but include also multilayers and laminates containing multiple polymer-surface interfaces. The invention is also suitable for manufacture of articles by the infusion of the resin into a porous material. Such porous materials include but are not limited to wood, cement, concrete, open-cell and reticulated foams and sponges, papers, cardboards, felts, ropes or braids of natural or synthetic fibers, and various sintered materials. Additionally, other manufacturing techniques include without limitation cell casting, dip casting, continuous casting, embedding, potting, encapsulation, film casting or solvent casting, gated casting, mold casting, slush casting, extrusion, mechanical foaming, chemical foaming, physical foaming, compression molding or matched die molding, spray up, Vacuum Assisted Resin Transfer Molding (VARTM), Seeman's Composite Resin Infusion Molding Process (SCRIMP), blow molding, in mold coating, in-mold painting or injection, vacuum forming, Reinforced Reaction Injection Molding (RRIM), Structural Reaction Injection Molding (SRIM), thermal expansion transfer molding (TERM), resin injection recirculation molding (RICM), controlled atmospheric pressure resin infusion (CAPRI), hand-layup. For manufacturing techniques requiring the use of a RIM or impingement style mixhead, including without limitation RIM, SRIM, and RRIM, articles of manufacture may be molded using a single mixhead or a plurality of mixheads as well as a plurality of material injection streams (e.g., two resin streams and one catalyst stream).

Furthermore, the present invention also allows for the making of articles of manufacture of any configuration, weight, size, thickness, or geometric shape. Examples of articles of manufacture include without limitation any molded or shaped article for use as an aerospace component, a marine component, an automotive component, a sporting goods component, an electrical component, and industrial component, medical component, dental component, or military component. In one embodiment an article may be a turbine component used on aircraft or general power generation. In one embodiment, turbine components may include without limitation one or more of an inlet, pylon, pylon fairing, an acoustic panel, a thrust reverser panel, a fan blade, a fan containment case, a bypass duct, an aerodynamic cowl, or an airfoil component. In one embodiment, an article may be a turbine blade component or may be a turbine blade. In one embodiment, an article may be a wind rotor blade, tower, spar cap, or nacelle for wind turbines. In one embodiment, an article may be an airframe component. Examples of aerospace components may include without limitation one or more of fuselage skin, wing, fairing, doors, access panel, aerodynamic control surface, or stiffner. In one embodiment an article may be an automotive component. Examples of automotive components may include without limitation one or more of body panel, fender, spoiler, truck bad, protective plate, hood, longitudinal rail, pillar, or door. Examples of industrial components may include without limitation one or more of risers platforms, impact protection structures for oil and gas; bridges, pipes, pressure vessels, power poles, coils, containers, tanks, liners, containment vessels, articles for application in corrosive environments (e.g., chlor-alkali, caustic, acidic, brine, etc.), reinforcement structures for concrete architectures and roads, or radiators. Examples of electrical components may include without limitation one or more wound articles, such as coils or electric motors, or insulating devices. In one embodiment, an article may be an eddy-current shielding component of a magnetic resonance imaging system or shielding component for any electromagnetic radiation. In one embodiment, an article may be a military component including without limitation ballistics resistant armor for personnel or vehicles, or ballistics resistant structures for protecting personnel or equipment. In one embodiment, an article may be a sporting goods component including without limitation an arrow shaft, a tennis racket frame, a hockey stick, compound bow limbs, or a golf club shaft.

Resin compositions according to the invention may further comprise a sizing composition, or be used to provide improved adhesion to substrate materials that are sized with certain commercial silanes commonly used in the industry. As is known in the art, glass fibers are typically treated with a chemical solution (e.g., a sizing composition) soon after their formation to reinforce the glass fibers and protect the strands' mechanical integrity during processing and composite manufacture. Sizing treatments compatible with olefin metathesis catalysts and polydicyclopentadiene composites have been described in U.S. Pat. Nos. 6,890,650 and 6,436,476, the disclosures of both of which are incorporated herein by reference. However, these disclosures are based on the use of specialty silane treatments that are not commonly used in industrial glass manufacture. By comparison, the current invention may provide improved mechanical properties for polymer-glass composites that are sized with silanes commonly used in the industry.

Glass sizing formulations typically comprise at least one film former (typically a film forming polymer), at least one silane, and at least one lubricant. Any components of a sizing formulation that do not interfere with or substantially decrease the effectiveness of the metathesis catalyst or olefin polymerization reaction are considered to be compatible with the current invention and may generally be used herein.

Film formers that are compatible with ROMP catalysts include epoxies, polyesters, polyurethanes, polyolefins, and/or polyvinyl acetates. Other common film formers that do not adversely affect the performance of the olefin metathesis catalyst may also be used. Film formers are typically used as nonionic, aqueous emulsions. More than one film former may be used in a given sizing formulation, to achieve a desired balance of glass processability and composite mechanical properties.

More particularly, the film former may comprise a low molecular weight epoxy emulsion, defined as an epoxy monomer or oligomer with an average molecular weight per epoxide group (EEW) of less than 500, and/or a high molecular weight epoxy emulsion, defined as an epoxy monomer or oligomer with an average molecular weight per epoxide group (EEW) of greater than 500. Examples of suitable low molecular weight products include aqueous epoxy emulsions produced by Franklin International, including Franklin K8-0203 (EEW 190) and Franklin E-102 (EEW 225-275). Other examples of low molecular weight epoxy emulsions are available from Hexion, including EPI-REZ™ 3510-W-60 (EEW 185-215), and EPI-REZ™ 3515-W-60 (EEW 225-275). Further examples of low molecular weight epoxy emulsions are available from COIM, including Filco 309 (EEW 270) and Filco 306 (EEW 330). Further examples of low molecular weight epoxy emulsions are available from DSM, including Neoxil® 965 (EEW 220-280) and Neoxil® 4555 (EEW 220-260). Examples of suitable high molecular weight epoxy emulsion products include epoxy emulsions produced by Hexion, including EPI-REZ™ 3522-W-60 (EEW 615-715).

Aqueous emulsions of modified epoxies, polyesters, and polyurethanes may also be used in the film former. Examples of suitable modified epoxy products include emulsions produced by DSM, including Neoxil® 2626 (a plasticized epoxy with an EEW of 500-620), Neoxil® 962/D (an epoxy-ester with an EEW of 470-550), Neoxil® 3613 (an epoxy-ester with an EEW of 500-800), Neoxil® 5716 (an epoxy-novolac with an EEW of 210-290), Neoxil® 0035 (a plasticized epoxy-ester with an EEW of 2500), and Neoxil® 729 (a lubricated epoxy with an EEW of 200-800). Further examples of modified epoxy emulsions are available from COIM, including Filco 339 (an unsaturated polyester-epoxy with an EEW of 2000) and Filco 362 (an epoxy-ester with an EEW of 530). Examples of suitable polyester products include emulsions produced by DSM, including Neoxil® 954/D, Neoxil® 2635, and Neoxil® 4759 (unsaturated bisphenolic polyesters). Additional suitable products from DSM include Neoxil® 9166 and Neoxil® 968/60 (adipate polyesters). Further examples of suitable products include emulsions produced by COIM, including Filco 354/N (unsaturated bisphenolic polyester), Filco 350 (unsaturated polyester), and Filco 368 (saturated polyester). Examples of suitable polyurethane products include emulsions produced by Bayer Material Science, including Baybond® 330 and Baybond® 401.

The film former may also comprise polyolefins or polyolefin-acrylic copolymers, polyvinylacetates, modified polyvinylacetates, or polyolefin-acetate copolymers. Suitable polyolefins include, but are not limited to, polyethylenes, polypropylenes, polybutylenes, and copolymers thereof, and the polyolefins may be oxidized, maleated, or otherwise treated for effective film former use. Examples of suitable products include emulsions produced by Michelman, including Michem® Emulsion 91735, Michem® Emulsion 35160, Michem® Emulsion 42540, Michem® Emulsion 69230, Michem® Emulsion 34040M1, Michem® Prime 4983R, and Michem® Prime 4982SC. Examples of suitable products include emulsions produced by HB Fuller, including PD 708H, PD 707, and PD 0166. Additional suitable products include emulsions produced by Franklin International, including Duracet® 637. Additional suitable products include emulsions produced by Celanese, including Vinamul® 8823 (plasticized polyvinylacetate), Dur-O-Set® E-200 (ethylene-vinyl acetate copolymer), Dur-O-Set® TX840 (ethylene-vinyl acetate copolymer), and Resyn® 1971 (epoxy-modified polyvinylacetate).

While not limited thereto, preferred film formers include low- and high-molecular weight epoxies, saturated and unsaturated polyesters, and polyolefins, such as Franklin K80-203, Franklin E-102, Hexion 3510-W-60, Hexion 3515-W-60, and Michelman 35160.

Nonionic lubricants may also be added to the sizing composition. Suitable nonionic lubricants that are compatible with ROMP compositions include esters of polyethylene glycols and block copolymers of ethylene oxide and propylene oxide. More than one nonionic lubricant may be used in a given sizing formulation if desired, e.g., to achieve a desired balance of glass processability and composite mechanical properties.

Suitable lubricants may contain polyethylene glycol (PEG) units with an average molecular weight between 200 and 2000, preferably between 200-600. These PEG units can be esterified with one or more fatty acids, including oleate, tallate, laurate, stearate, and others. Particularly preferred lubricants include PEG 400 dilaurate, PEG 600 dilaurate, PEG 400 distearate, PEG 600 distearate, PEG 400 dioleate, and PEG 600 dioleate. Examples of suitable products include compounds produced by BASF, including MAPEG® 400 DO, MAPEG® 400 DOT, MAPEG® 600 DO, MAPEG® 600 DOT, and MAPEG® 600 DS. Additional suitable products include compounds produced by Zschimmer & Schwarz, including Mulsifan 200 DO, Mulsifan 400 DO, Mulsifan 600 DO, Mulsifan 200 DL, Mulsifan 400 DL, Mulsifan 600 DL, Mulsifan 200 DS, Mulsifan 400 DS, and Mulsifan 600 DS. Additional suitable products include compounds produced by Cognis, including Agnique® PEG 300 DO, Agnique® PEG 400 DO, and Agnique® PEG 600 DO.

Suitable nonionic lubricants also include block copolymers of ethylene oxide and propylene oxide. Examples of suitable products include compounds produced by BASF, including Pluronic® L62, Pluronic® L101, Pluronic® P103, and Pluronic® P105.

Cationic lubricants may also be added to the sizing composition. Cationic lubricants that are compatible with ROMP include modified polyethyleneimines, such as Emery 6760L produced by Pulcra Chemicals.

Silane coupling agent may optionally be added to the sizing composition, non-limiting examples including, methacrylate, acrylate, amino, or epoxy functionalized silanes along with alkyl, alkenyl, and norbornenyl silanes.

Optionally, the sizing composition may contain one or more additives for modifying the pH of the sizing resin. One preferred pH modifier is acetic acid.

The sizing composition may optionally contain other additives useful in glass sizing compositions. Such additives may include emulsifiers, defoamers, cosolvents, biocides, antioxidants, and additives designed to improve the effectiveness of the sizing composition. The sizing composition can be prepared by any method and applied to substrate materials for use herein, such as glass fibers or fabric, by any technique or method.

In a preferred embodiment, the metathesis reactions disclosed herein are carried out under a dry, inert atmosphere. Such an atmosphere may be created using any inert gas, including such gases as nitrogen and argon. The use of an inert atmosphere is optimal in terms of promoting catalyst activity, and reactions performed under an inert atmosphere typically are performed with relatively low catalyst loading. The reactions disclosed herein may also be carried out in an oxygen-containing and/or a water-containing atmosphere, and in one embodiment, the reactions are carried out under ambient conditions. The presence of oxygen or water in the reaction may, however, necessitate the use of higher catalyst loadings as compared with reactions performed under an inert atmosphere. Where the vapor pressure of the reactants allows, the reactions disclosed herein may also be carried out under reduced pressure.

The reactions disclosed herein may be carried out in a solvent, and any solvent that is inert towards cross-metathesis may be employed. Generally, solvents that may be used in the metathesis reactions include organic, protic, or aqueous solvents, such as aromatic hydrocarbons, chlorinated hydrocarbons, ethers, aliphatic hydrocarbons, alcohols, water, or mixtures thereof. Example solvents include benzene, toluene, p-xylene, methylene chloride, 1,2-dichloroethane, dichlorobenzene, chlorobenzene, tetrahydrofuran, diethylether, pentane, methanol, ethanol, water, or mixtures thereof. In a preferred embodiment, the reactions disclosed herein are carried out neat, i.e., without the use of a solvent.

It will be appreciated that the temperature at which a metathesis reaction according to methods disclosed herein is conducted can be adjusted as needed, and may be at least about −78° C., −40° C., −10° C., 0° C., 10° C., 20° C., 25° C., 35° C., 50° C., 70° C., 100° C., or 150° C., or the temperature may be in a range that has any of these values as the upper or lower bounds. In a preferred embodiment, the reactions are carried out at a temperature of at least about 35° C., and in another preferred embodiment, the reactions are carried out at a temperature of at least about 50° C.

It is to be understood that while the invention has been described in conjunction with specific embodiments thereof, the description above as well as the examples that follow are intended to illustrate and not limit the scope of the invention. Other aspects, advantages, and modifications within the scope of the invention will be apparent to those skilled in the art to which the invention pertains.

EXPERIMENTAL

In the following examples, efforts have been made to ensure accuracy with respect to numbers used (e.g., amounts, temperature, etc.) but some experimental error and deviation should be accounted for. Unless indicated otherwise, temperature is in degrees Celsius (° C.), pressure is at or near atmospheric, viscosity is in centipoise (cP).

The following examples are to be considered as not being limiting of the invention as described herein, and are instead provided as representative examples of the adhesion promoter compositions of the invention and the methods for their use.

Examples

Materials and Methods

All glassware was oven dried and reactions were performed under ambient conditions unless otherwise noted.

All solvents and reagents were purchased from commercial suppliers and used as received unless otherwise noted.

Dicyclopentadiene (Ultrene® 99) (DCPD) was obtained from Cymetech Corporation. A modified DCPD base resin containing 20-25% tricyclopentadiene (and small amounts of higher cyclopentadiene homologs) was prepared by heat treatment of Ultrene® 99 generally as described in U.S. Pat. No. 4,899,005. A modified DCPD base resin containing 6-8% tricyclopentadiene (and small amounts of higher cyclopentadiene homologs) was prepared by heat treatment of Ultrene® 99 generally as described in U.S. Pat. No. 4,899,005.

Liquid MDI (50/50 mixture of 4,4'-MDI and 2,4'-MDI) was used as received from Bayer Material Science (Mondur® MLQ) and was used where indicated. Solid MDI (4,4'-methylene diphenyl diisocyanate) was used as received from Sigma Aldrich (98% purity). Ethanox® 4702 antioxidant (4,4'-methylenebis(2,6-di-tertiary-butylphenol), Albemarle Corporation) was used where indicated. Crystal Plus 70FG mineral oil, containing 2 phr CAB-O-SIL® TS610 fumed silica (Cabot), was used to prepare the catalyst suspensions. Triphenylphosphine (TPP) was used as received from Arkema. A hydroperoxide gel modifier, cumene hydroperoxide (CHP) was used as received from Sigma Aldrich (88% purity, unless otherwise specified) or Syrgis Performance Initiators (Norox® CHP, 85%). CHP was added to resin formulations as a 1,000 ppm concentration stock solution in DCPD. Additionally, CHP from Akzo Nobel Polymer Chemicals (Trigonox® K-90, 88%) was used as received and added to the resin formulation (Table 10, Example 31(d) and Table 11, Example 32(d). Oleyl alcohol was used as received from Sigma Aldrich (technical grade, 85%). 9-decen-1-ol was used as received from Sigma Aldrich (97% purity).

Olefin metathesis catalysts were prepared by standard methods and include [1,3-bis-(2,4,6-trimethylphenyl)-2-imidazolidinylidene]dichloro(3-methyl-2-butenylidene) (tricyclohexylphosphine) ruthenium(II) (C827); ruthenium (II) dichloro (3-methyl-2-butenylidene) bis(tricyclohexylphosphine) (C801); [1,3-bis-(2,4,6-trimethylphenyl)-2-imidazolidinylidene]dichloro(o-isopropoxyphenylmethylene)ruthenium(II) (C627); [1,3-bis-(2,4,6-trimethylphenyl)-2-imidazolidinylidene]dichloro(benzylidene)(tri-n-butylphosphine)ruthenium(II) (C771); [1,3-bis-(2,4,6-trimethylphenyl)-2-imidazolidinylidene]dichloro(3-methyl-2-butenylidene)(methyldiphenylphosphine)ruthenium(II) (C747); [1,3-bis-(2,4,6-trimethylphenyl)-2-imidazolidinylidene]dichloro(phenylindenylidene)(diethylphenylphosphine)ruthenium(II) (C835).

Glass fabrics were used as supplied by Vectorply (E-LT 3500-10) based on PPG Hybon® 2026 ("Vectorply Glass Fabric"); Saertex (U14EU970-01190-T2525-125000) based on PPG Hybon® 2002 ("Saertex Glass Fabric"); Chongqing Polycomp Internation Corp. (CPIC Fiberglass) (EKU 1150 (0)/50-600) ("CPIC Glass Fabric"); Owens Corning (L1020/07A06 Xweft 200tex) ("Owens Corning Glass Fabric"); SGL Kumpers (HPT970) based on PPG Hybon® 2002 ("SGL Glass Fabric").

Carbon fabrics were used as supplied by Vectorply (C-L 1800) ("Vectorply Carbon Fabric"); Zoltek (Panex 35 UD Fabic-PX35UD0500-1220) ("Zoltek Carbon Fabric").

Additives to the resin are reported as ppm, which is defined as the weight in grams of additive per million grams of resin, or as phr, which is defined as the weight in grams of the additive per hundred grams of resin.

Composite laminates were fabricated for testing by a VARTM process. A sealed and release-treated aluminum plate, possessing inlet and outlet ports affixed to the bottom surface, was utilized as the bottom mold surface. Plies of glass or carbon fabric cut to dimensions of 3"×6" were arranged on top of the aluminum mold to achieve a ⅛" laminate thickness. A peel ply (Bron Aerotech; PTFE-coated) was placed over the fabric plies, and nylon resin distribution media (Airtech Greenflow 75) was positioned on top of the peel ply at opposite ends of the composite laminate corresponding to the position of the inlet port and outlet port, respectively. A sheet of vacuum bagging film (Umeco Process Materials Stretch-Vac 2000) was placed over the completed layup and affixed to the mold surface using sealant tape (Airtech AT200-Y tape). Vacuum was applied to the outlet port to evacuate air from the layup to a vacuum level of between 28 inches-Hg to 29 inches-Hg. Resin prepared as per the examples presented below herein was degassed under vacuum with stirring for at least 20 minutes. Catalyst suspension was injected into the resin under vacuum and the catalyzed resin was stirred under vacuum for at least one minute. The resin and catalyst suspension were at ambient temperature (20-25° C.) immediately prior to mixing. After at least one minute, stirring of the catalyzed resin was stopped, the vacuum source was clamped off, and the catalyzed resin was backfilled with argon. The catalyzed resin was then infused through the fabric plies, driven by the pressure gradient between the ambient pressure and the evacuated fabric layup.

The glass composite laminates of the examples in Tables 1, 5, 6, 7, and 8 presented below herein were prepared using the VARTM process with four plies of glass fabric reinforcement. After the infusion was complete, the glass composite laminate was heated from ambient temperature (20-25° C.) to 35° C. for two hours. After two hours at 35° C. the glass composite laminate was heated to 100° C. at a heating rate of 1° C./min and held at 100° C. for 1 hour and then allowed to cool to ambient temperature (20-25° C.) and subsequently demolded.

The carbon composite laminates of the examples in Tables 1, 5, 6, 7, and 8 presented below herein were prepared using the VARTM process with six plies of carbon fabric reinforcement. After the infusion was complete, the carbon composite laminate was heated from ambient temperature (20-25° C.) to 35° C. for two hours. After two hours at 35° C. the carbon composite laminate was heated to 100° C. at a heating rate of 1° C./min and held at 100° C. for 1 hour and then allowed to cool to ambient temperature (20-25° C.) and subsequently demolded.

The glass composite laminates of the examples in Tables 2, 3, 4, and 9 presented below herein were prepared using the VARTM process with four plies of glass fabric reinforcement, except that each ply was cut dimensions of 6"×10" and a release film (Airtech Wrightlon® 5200B) was used instead of the Bron Aerotech peel ply. After the infusion was complete, the glass composite laminate was heated from ambient temperature (20-25° C.) to 75° C. at 2° C./min, and then heated from 75° C. to 120° C. at 2° C./min and held at 120° C. for 2 hours, and then allowed to cool to ambient temperature (20-25° C.) and subsequently demolded.

The glass composite laminates of the examples in Tables 10 and 12 presented below herein were prepared using the VARTM process with four plies of glass fabric reinforcement. After the infusion was complete, the glass composite laminate was heated from ambient temperature (20-25° C.) to 35° C. for 2 hours. After 2 hours at 35° C. the glass composite laminate was heated to 120° C. at a heating rate of 2° C./min and held at 120° C. for 2 hours and then allowed to cool to ambient temperature (20-25° C.) and subsequently demolded.

The carbon composite laminates of the examples in Table 11 and 12 presented below herein were prepared using the VARTM process with six plies of carbon fabric reinforcement. After the infusion was complete, the carbon composite laminate was heated from ambient temperature (20-25° C.) to 35° C. for 2 hours. After 2 hours at 35° C. the carbon composite laminate was heated to 120° C. at a heating rate of 2° C./min and held at 120° C. for 2 hours and then allowed to cool to ambient temperature (20-25° C.) and subsequently demolded.

The mechanical properties were measured using standard techniques. Interlaminar shear strength (ILSS) at 10% strain was measured by the short-beam shear method according to ASTM D2344 on 1"×¼"×⅛" samples. The ILSS values were reported in units of pounds per square inch (psi). Interlaminar shear strength (ILSS) is a measure of the adhesion and/or compatibility between polymer matrix and fiber reinforcement in a composite. Reported ILSS values are the average of 3 samples. All ILSS samples were stored and tested at ambient room conditions. The following criteria, based on interlaminar shear strength values, was used to characterize the adhesion and/or compatibility between the polymer matrix and the glass or carbon fiber reinforcement materials. Composites having poor adhesion and/or compatibility between the polymer matrix and fiber reinforcement were characterized as having ILSS values less than about 3,000 psi suggesting a lack of covalent adhesion between the polymer matrix and fiber reinforcement. Composites having moderate adhesion and/or compatibility between the polymer matrix and fiber reinforcement were characterized as having ILSS values from about 3,000 psi to about 6,000 psi suggesting minimal to no covalent adhesion between the polymer matrix and fiber reinforcement. Composites having superior adhesion and/or compatibility between the polymer matrix and fiber reinforcement were characterized as having ILSS values greater than about 6,000 psi suggesting a higher degree of covalent adhesion between the polymer matrix and fiber reinforcement.

Synthesis of HENB (2-hydroxyethyl bicyclo[2.2.1]hept-2-ene-5-carboxylate) HEA (2-hydroxyethyl acrylate) (640 g, 1.0 mol eq.) was added to a 3 L round bottom flask containing toluene (1 kg). DCPD (dicyclopentadiene) (1.5 kg) was added to a separate 3 L round bottom flask, and the 3 L flask containing DCPD was affixed with a Vigreaux column and distillation head connected to the condenser. The 3 L flask containing HEA and toluene was connected to the condenser. The DCPD was heated to >160° C. under an inter atmosphere to "crack" the DCPD and form CPD (cyclopentadiene). The CPD (740 g, 2.0 mol eq.) was added dropwise to the HEA/toluene mixture at 10-40° C. under an inert atmosphere. Conversion of HEA to HENB (2-hydroxyethyl bicyclo[2.2.1]hept-2-ene-5-carboxylate) was monitored by GC (gas chromatography). Toluene and reformed DCPD (364 g) were removed from the reaction mixture by vacuum distillation to give the desired HENB product as a colorless liquid (1,004 g, quantitative yield, approx. 98% purity).

Adhesion Promoter Composition (A). Liquid MDI (Modur® MLQ) (465 g) was added to a 2 L round bottom flask containing toluene (800 g, dried over molecular sieves). Synthesized HENB (2-hydroxyethyl bicyclo[2.2.1]hept-2-ene-5-carboxylate) (35 g) was added to the 2 L round bottom flask containing the toluene and liquid MDI. The 2 L round bottom flask was stirred overnight at 40° C. under an inert atmosphere. The toluene was removed in vacuo and the remaining reaction mixture was analyzed by $^{13}$C NMR as described below herein. The remaining reaction mixture was used as prepared.

Adhesion Promoter Composition (B). Synthesized HENB (2-hydroxyethyl bicyclo[2.2.1]hept-2-ene-5-carboxylate) (0.001 mol eq., 0.0728 g) was added to liquid MDI (Mondur® MLQ) (1.0 mol eq., 99.93 g) at ambient temperature (22-25° C.) in a 125 mL round bottom flask and stirred under an inert atmosphere for a minimum of 24 hours. The progress of the reaction was monitored by $^{13}$C NMR as described below herein. The reaction mixture was used as prepared.

Adhesion Promoter Composition (C). Synthesized HENB (2-hydroxyethyl bicyclo[2.2.1]hept-2-ene-5-carboxylate) (0.01 mol eq., 0.7229 g) was added to liquid MDI (Mondur® MLQ) (1.0 mol eq., 99.28 g) at ambient temperature (22-25° C.) in a 125 mL round bottom flask and stirred under an inert atmosphere for a minimum of 24 hours. The progress of the reaction was monitored by $^{13}$C NMR as described below herein. The reaction mixture was used as prepared.

Adhesion Promoter Composition (D). Synthesized HENB (2-hydroxyethyl bicyclo[2.2.1]hept-2-ene-5-carboxylate) (0.10 mol eq., 338 g) was added to liquid MDI (Mondur® MLQ) (1.0 mol eq., 4646 g) at ambient temperature (22-25° C.) and stirred under an inert atmosphere for a minimum of 24 hours. The progress of the reaction was monitored by $^{13}$C NMR as described below herein. The reaction mixture was used as prepared.

Adhesion Promoter Composition (E). Synthesized HENB (2-hydroxyethyl bicyclo[2.2.1]hept-2-ene-5-carboxylate) (0.25 mol eq., 15.4 g) was added to liquid MDI (Mondur® MLQ) (1.0 mol eq., 84.6 g) at ambient temperature (22-25° C.) in a 100 mL round bottom flask and stirred under an inert atmosphere for a minimum of 24 hours. The progress of the reaction was monitored by $^{13}$C NMR as described below herein. The reaction mixture was used as prepared.

Adhesion Promoter Composition (F). Synthesized HENB (2-hydroxyethyl bicyclo[2.2.1]hept-2-ene-5-carboxylate) (0.40 mol eq., 22.6 g) was added to liquid MDI (Mondur® MLQ) (1.0 mol eq., 77.4 g) at ambient temperature (22-25° C.) in a 100 mL round bottom flask and stirred under an inert atmosphere for a minimum of 24 hours. The progress of the reaction was monitored by $^{13}$C NMR as described below herein. The reaction mixture was used as prepared.

Adhesion Promoter Composition (G). Synthesized HENB (2-hydroxyethyl bicyclo[2.2.1]hept-2-ene-5-carboxylate) (0.50 mol eq., 26.7 g) was added to liquid MDI (Mondur® MLQ) (1.0 mol eq., 73.3 g) at ambient temperature (22-25° C.) in a 100 mL round bottom flask and stirred under an inert atmosphere for a minimum of 24 hours. The progress of the reaction was monitored by $^{13}$C NMR as described below herein. The reaction mixture was used as prepared.

Adhesion Promoter Composition (H). Synthesized HENB (2-hydroxyethyl bicyclo[2.2.1]hept-2-ene-5-carboxylate) (0.75 mol eq., 35.3 g) was added to liquid MDI (Mondur® MLQ) (1.0 mol eq., 69.7) at ambient temperature (22-25° C.) in a 100 mL round bottom flask and stirred under an inert atmosphere for a minimum of 24 hours. The progress of the reaction was monitored by $^{13}$C NMR as described below herein. The reaction mixture was used as prepared.

Adhesion Promoter Composition (I). Synthesized HENB (2-hydroxyethyl bicyclo[2.2.1]hept-2-ene-5-carboxylate) (1.0 mol eq., 42.1 g) was added to liquid MDI (Mondur® MLQ) (1.0 mol eq., 57.9 g) at ambient temperature (22-25° C.) in a 100 mL round bottom flask and stirred under an inert atmosphere for a minimum of 24 hours. The progress of the reaction was monitored by $^{13}$C NMR as described below herein. The reaction mixture was used as prepared.

Adhesion Promoter Composition (J). 2-Hydroxyethyl acrylate (HEA) (0.1 mol eq., 4.3 g) was added to liquid MDI (Mondur® MLQ) (1.0 mol eq., 93.0 g) at ambient temperature (22-25° C.) in a 100 mL round bottom flask and stirred under an inert atmosphere for a minimum of 24 hours. The progress of the reaction was monitored by $^{13}$C NMR in a similar manner as described below herein. The reaction mixture was used as prepared.

Adhesion Promoter Composition (K). 9-Decen-1-ol (0.1 mol eq., 6 g) was added to liquid MDI (Mondur® MLQ) (1.0 mol eq., 93 g) at ambient temperature (22-25° C.) in a 100 mL round bottom flask and stirred under an inert atmosphere for a minimum of 24 hours. The progress of the reaction was monitored by $^{13}$C NMR in a similar manner as described below herein. The reaction mixture was used as prepared.

Adhesion Promoter Composition (L). Oleyl alcohol (0.1 mol eq., 10 g) was added to liquid MDI (Mondur® MLQ) (1.0 mol eq., 93 g) at ambient temperature (22-25° C.) in a 125 ml, round bottom flask and stirred under an inert atmosphere for a minimum of 24 hours. The progress of the reaction was monitored by $^{13}$C NMR in a similar manner as described below herein. The reaction mixture was used as prepared.

Synthesis of MDI-HENB Mono Adduct, $C_{25}H_{24}N_2O_5$

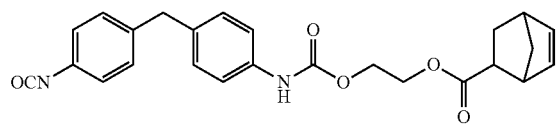

Chemical Formula: $C_{25}H_{24}N_2O_5$
Exact Mass: 432.17
Molecular Weight: 432.47

In a glovebox under argon atmosphere, 20.0 g (79.9 mmol, 1.0 equiv) 4,4'-methylene diphenyl diisocyanate (solid MDI) was charged to a 1-L 3-neck round bottom flask equipped with a large stirbar. 500 mL anhydrous toluene (Sigma Aldrich) was added. The flask was capped with rubber septa and a gas-adapter and removed from the glovebox. The gas adapter was connected to a Schlenk line. Under a strong flow of argon, a reflux condenser and digital thermometer were connected to the two remaining 24/40 ports. 29.87 g (163.8 mmol, 2.05 equiv) synthesized HENB was added dropwise via syringe in ~1 mL portions over 45 minutes. The resulting suspension was heating to an internal temperature of 70° C. for 24 h then cooled to room temperature. After several minutes at 70° C. the mixture becomes completely homogeneous followed by slow precipitation of a transparent solid. Upon cooling to room temperature, more solid precipitates leaving a cloudy suspension. The mixture was filtered through a course glass frit and the resulting solids washed with 100 mL toluene. Volatiles were subsequently removed by rotary evaporation at 50° C., leaving a thick, viscous oil with the strong odor of HENB. This oil was dissolved in dichloromethane and purified by column chromatography (10% EtOAc in DCM). Volatiles were removed from the fraction of interest, first by rotovap then by drying on a Schlenk line overnight, yielding 29.0 g (83.9%) of a hard, hygroscopic solid, which was stored under argon. $^1$H and $^{13}$C NMR reveals a clean mixture (78:22) of the desired products (endo- and exo-configuration of norbornene ring, respectively). $^1$H NMR (CDCl$_3$, 400 MHz): δ=7.30 (m, overlapping, phenyls), 7.10 (broad, distorted d, phenyls), 6.99 (broad s, phenyls), 6.16 (m, endo-C=CH), 6.11 (m, exo-C=CH), 6.09 (m, exo-CH=C), 5.92 (m, endo-CH=C) 4.2-4.4 (overlapping m, O—CH$_2$CH$_2$—O), 3.87 (s, Ph-CH$_2$-Ph), 3.20 (s, norbornene), 3.04 (s, norbornene), 2.97 (m, norbornene), 2.89 (broad s, norbornene), 2.25 (broad m, norbornene); 2.01 (m, norbornene), 1.89 (distorted m, norbornene), 1.24-1.55 (overlapping peaks, norbornene).

$^{13}$C NMR (CDCl$_3$, 100 MHz): δ=176.23 (exo-NB—CO—O), 174.75 (endo-NB—C(O)—O), 155.37 (NHC(O)—O), 138.21, 137.97, 135.94, 135.75, 132.37, 129.49, 119.09 (NCO), 63.07 (O—CH$_2$CH$_2$—O), 62.56 (exo-O—CH$_2$CH$_2$—O), 62.30 (endo-O—CH$_2$CH$_2$—O), 49.71, 46.88, 46.40, 45.83, 43.31, 43.15, 42.61, 41.75, 40.62, 30.45, 29.37.

$^{13}$C NMR (CDCl$_3$, 100 MHz) Analysis of Adhesion Promoter Compositions (HENB and MDI Pre-Reacted Mixtures). The primary diagnostic region of HENB and liquid MDI (Mondur® MLQ) pre-reacted mixtures is the —C(=O)O—CH$_2$—CH$_2$—OH region (ethylene bridge region) of HENB. FIG. 1 is a $^{13}$C NMR spectrum of the ethylene bridge region of an HENB and liquid MDI (Mondur® MLQ) pre-reacted mixture at time zero, immediately after mixing. In CDCl$_3$ HENB gives carbon peaks in two groups, Group A and Group B (FIG. 1) corresponding to the carbons of the ethylene bridge region. The two carbon peaks in Group A have chemical shifts around 66.1011 ppm and 65.9157 ppm corresponding to the —CH$_2$— carbon connected to the to the oxygen of the ester group (—CH$_2$—O—C(=O)—) of HENB, exo and endo isomers, respectively (FIG. 1). The two carbon peaks in Group B have chemical shifts around 61.1841 ppm and 61.2156 ppm corresponding to the —CH$_2$— carbon connected to the to the oxygen of the hydroxyl group (—CH$_2$—OH) of HENB, exo and endo isomers, respectively (FIG. 1). As the reaction between HENB and liquid MDI (Mondur® MLQ) proceeds, these peaks disappear and are replaced by carbon peaks in two groups, Group C and Group D (FIG. 2), thereby demonstrating that HENB is no longer present in the mixture in its native form. FIG. 2 is a $^{13}$C NMR spectrum of the ethylene bridge region of an HENB and liquid MDI (Mondur® MLQ) pre-reacted mixture after mixing for 5 days under inert atmosphere at ambient temperature (20-25° C.). In FIG. 2, the broad carbon peak in Group C having a chemical shift around 63.0490 ppm is consistent with the —CH$_2$— carbon connected to the oxygen of the carbamate group (—NH—C(=O)—O—CH$_2$—) of the MDI-HENB mono adduct as shown above herein, where the broadness of the peak indicates overlapping of the exo and endo isomers. In FIG. 2, the carbon peak in Group D having a chemical shift around 62.5340 ppm is consistent with the —CH$_2$— carbon connected to the oxygen of the ester group (—CH$_2$—O—C(=O)—) of the MDI-HENB mono adduct as shown above herein, exo isomer. In FIG. 2, the carbon peak in Group D having a chemical shift around 62.2901 ppm is consistent with the —CH$_2$— carbon connected to the oxygen of the ester group (—CH$_2$—O—C(=O)—) of the MDI-HENB mono adduct as shown above herein, endo isomer.

Examples 1(a-c)-5(a-c)

ILSS of Glass and Carbon Composites Prepared by VARTM

The modified DCPD (containing 20-25% tricyclopentadiene) was formulated with 0.6 phr TPP, 2 phr Ethanox® 4702 antioxidant, and 0 phr, 2 phr, or 4 phr liquid MDI (Mondur® MLQ). The resin was catalyzed by the addition of C827 (monomer to catalyst ratio 45,000:1) in a suspension of mineral oil. VARTM samples were prepared using commercial glass fabrics and commercial carbon fabrics as described above herein. The composite laminates were cured as described above herein. The ILSS of the resulting composites are shown in (Table 1).

TABLE 1

| | | ILSS | | | | |
|---|---|---|---|---|---|---|
| Example | Adhesion Promoter (Mondur® MLQ) | 1 Vectorply Carbon Fabric | 2 Zoltek Carbon Fabric | 3 Vectorply Glass Fabric | 4 Saertex Glass Fabric | 5 CPIC Glass Fabric |
| a | None | 3120 | 1715 | 1756 | 1253 | 1692 |
| b | 2 phr | 9154 | 3734 | 8628 | 6048 | 8628 |
| c | 4 phr | 9786 | 3607 | 8865 | 6073 | 8637 |

Examples (6a,6b)

ILSS of Glass Composites Prepared by VARTM

On Day 1, modified DCPD (containing 20-25% tricyclopentadiene) was formulated with 20 ppm CHP, 2 phr Ethanox® 4702 antioxidant, and 2 phr liquid MDI (Mondur® MLQ) to give Resin Formulation (A1). Also on Day 1, modified DCPD (containing 20-25% tricyclopentadiene) was formulated with 20 ppm CHP, 2 phr Ethanox® 4702 antioxidant, 2 phr MDI (Mondur® MLQ), and 2 phr HENB to give Resin Formulation (B1). The liquid MDI (Mondur® MLQ) and HENB were independently added to Resin Formulation (B1) as separate additives. Resin Formulation (A1) and Resin Formulation (B1) were sparged with argon and stored in separate air-tight containers at ambient temperature (20-25° C.).

On Day 1, Day 7, Day 28, Day 58, and Day 105 a portion of Formulation (A1) was catalyzed by the addition of C827 (monomer to catalyst ratio 30,000:1) in a suspension of mineral oil and a VARTM sample was prepared as described above herein using commercial glass fabric SGL Kumpers (HPT970E0) based on PPG Hybon® 2002 ("SGL Glass Fabric"). The composite laminates were cured as described above herein. The ILSS of the resulting composites are shown below in Table 2.

On Day 1, Day 7, and Day 28 a portion of Formulation (B1) was catalyzed by the addition of C827 (monomer to catalyst ratio 30,000:1) in a suspension of mineral oil and a VARTM sample was prepared as described above herein using commercial glass fabric SGL Kumpers (HPT970E0) based on PPG Hybon® 2002 ("SGL Glass Fabric"). The composite laminates were cured as described above herein. The ILSS of the resulting composites are shown below in Table 2.

TABLE 2

| Example | Resin Formulation | ILSS | | | | |
|---|---|---|---|---|---|---|
| | | Day 1 | Day 7 | Day 28 | Day 58 | Day 105 |
| 6a | A1 | 7564 | 7561 | 7596 | 7224 | 7417 |
| 6b | B1 | 8070 | 6783 | 4916 | Not measured | Not measured |

Examples 7(a)-7(f)

ILSS of Glass Composites Prepared by VARTM

On Day 1, modified DCPD (containing 20-25% tricyclopentadiene) was formulated with 0.4 phr TPP, 2 phr Ethanox® 4702 antioxidant, and 2 phr adhesion promoter composition (A) to give Resin Formulation (C1). Resin Formulation (C1) was sparged with argon and stored in an air-tight container at ambient temperature (20-25° C.). The adhesion promoter composition (A) was prepared as described above herein.

On Day 1, Day 69, Day 104, Day 151, and Day 201, and Day 326 a portion of Formulation (C1) was catalyzed by the addition of C827 (monomer to catalyst ratio 30,000:1) in a suspension of mineral oil and a VARTM sample was prepared as described above herein using commercial glass fabric SGL Kumpers (HPT970E0) based on PPG Hybon® 2002 ("SGL Glass Fabric"). The composite laminates were cured as described above herein. The ILSS of the resulting composites are shown below in Table 3.

TABLE (3)

| ILSS | | |
|---|---|---|
| Example | Day | ILSS |
| 7a | 1 | 7945 |
| 7b | 69 | 8016 |
| 7c | 104 | 8063 |
| 7d | 151 | 7984 |
| 7e | 201 | 7895 |
| 7f | 326 | 8162 |

Examples 8(a)-8(d)

ILSS of Glass Composites Prepared by VARTM

On Day 1, modified DCPD (containing 20-25% tricyclopentadiene) was formulated with 0.4 phr TPP, 2 phr Ethanox® 4702 antioxidant, and 2 phr adhesion promoter composition (A) to give Resin Formulation (D1). Resin Formulation (D1) was sparged with argon and stored in an air-tight container at ambient temperature (40° C.). The adhesion promoter composition (A) was prepared as described above herein.

On Day 1, Day 72, Day 151, and Day 202, a portion of Formulation (D1) was catalyzed by the addition of C827 (monomer to catalyst ratio 30,000:1) in a suspension of mineral oil and a VARTM sample was prepared as described above herein using commercial glass fabric SGL Kumpers (HPT970E0) based on PPG Hybon® 2002 ("SGL Glass Fabric"). The composite laminates were cured as described above herein. The ILSS of the resulting composites are shown below in Table 4.

TABLE (4)

| ILSS | | |
|---|---|---|
| Example | Day | ILSS |
| 8a | 1 | 7945 |
| 8b | 72 | 7512 |
| 8c | 151 | 7811 |
| 8d | 202 | 7687 |

Examples 9(a-h)-13(a-h)

ILSS of Glass and Carbon Composites Prepared by VARTM

The modified DCPD (containing 20-25% tricyclopentadiene) was formulated with 0.6 phr TPP, 2 phr Ethanox® 4702 antioxidant, and 4 phr of the appropriate adhesion promoter composition. The resin was catalyzed by the addition of C827 (monomer to catalyst ratio 45,000:1) in a suspension of mineral oil. VARTM samples were prepared using commercial glass fabrics and commercial carbon fabrics as described above herein. The composite laminates were cured as described above herein. The adhesion promoter compositions were prepared as described above herein. The ILSS of the resulting composites are shown in below in Table 5.

TABLE 5

| | | ILSS | | | | |
|---|---|---|---|---|---|---|
| Example | Adhesion Promoter Composition | 9 Vectorply Carbon Fabric | 10 Zoltek Carbon Fabric | 11 Vectorply Glass Fabric | 12 Saertex Glass Fabric | 13 CPIC Glass Fabric |
| a | (B) | 9269 | 4462 | 9330 | 6797 | 8639 |
| b | (C) | 9232 | 6865 | 9370 | 8184 | 8877 |
| c | (D) | 9769 | 9390 | 9294 | 8605 | 9027 |
| d | (E) | 10622 | 9252 | 9275 | 8832 | 9425 |
| e | (F) | 9976 | 9423 | 9694 | 8924 | 9248 |
| f | (G) | 8921 | 9276 | 9094 | 8715 | 8957 |
| g | (H) | 7759 | 8838 | 8806 | 8112 | 8487 |
| h | (I) | 6865 | 6787 | 7413 | 7803 | 7742 |

Examples 14(a)-18(a)

ILSS of Glass and Carbon Composites Prepared by VARTM

The modified DCPD (containing 20-25% tricyclopentadiene) was formulated with 0.6 phr TPP, 2 phr Ethanox® 4702 antioxidant, and 4 phr of adhesion promoter composition (J). The resin was catalyzed by the addition of C827 (monomer to catalyst ratio 45,000:1) in a suspension of mineral oil. VARTM samples were prepared using commercial glass fabrics and commercial carbon fabrics as described above herein. The composite laminates were cured as described above herein. The adhesion promoter composition (J) was prepared as described above herein. The ILSS of the resulting composites are shown below in Table 6.

TABLE 6

| | | ILSS | | | | |
|---|---|---|---|---|---|---|
| Example | Adhesion Promoter Composition | 14 Vectorply Carbon Fabric | 15 Zoltek Carbon Fabric | 16 Vectorply Glass Fabric | 17 Saertex Glass Fabric | 18 CPIC Glass Fabric |
| a | (J) | 9845 | 9126 | 9188 | 8769 | 9532 |

Examples 19(a)-23(a)

ILSS of Glass and Carbon Composites Prepared by VARTM

The modified DCPD (containing 20-25% tricyclopentadiene) was formulated with 0.6 phr TPP, 2 phr Ethanox® 4702 antioxidant, and 0.6 phr of the MDI-HENB mono adduct. The resin was catalyzed by the addition of C827 (monomer to catalyst ratio 45,000:1) in a suspension of mineral oil. VARTM samples were prepared using commercial glass fabrics and commercial carbon fabrics as described above herein. The composite laminates were cured as described above herein. The MDI-HENB mono adduct was prepared as described above herein. The ILSS of the resulting composites are shown below in Table 7.

TABLE (7)

| | ILSS | | | |
|---|---|---|---|---|
| Example | 19 Vectorply Carbon Fabric | 20 Zoltek Carbon Fabric | 21 Vectorply Glass Fabric | 22 Saertex Glass Fabric | 23 CPIC Glass Fabric |
| a | 2563 | 2051 | 2580 | 1881 | 1762 |

Examples 24(a)-28(a)

ILSS of Glass and Carbon Composites Prepared by VARTM

The modified DCPD (containing 20-25% tricyclopentadiene) was formulated with 0.6 phr TPP, 2 phr Ethanox® 4702 antioxidant, 3.4 phr liquid MDI (Mondur® MLQ), and 0.6 phr of the MDI-HENB mono adduct. The liquid MDI (Mondur® MLQ and the mono MDI-HENB mono adduct were independently added to the modified DCPD as separate additives. The resin was catalyzed by the addition of C827 (monomer to catalyst ratio 45,000:1) in a suspension of mineral oil. VARTM samples were prepared using commercial glass fabrics and commercial carbon fabrics as described above herein. The composite laminates were cured as described above herein. The MDI-HENB mono adduct was prepared as described above herein. The ILSS of the resulting composites are shown below in Table 8.

TABLE (8)

| | ILSS | | | | |
|---|---|---|---|---|---|
| Example | 24 Vectorply Carbon Fabric | 25 Zoltek Carbon Fabric | 26 Vectorply Glass Fabric | 27 Saertex Glass Fabric | 28 CPIC Glass Fabric |
| a | 9150 | 5173 | 9450 | 7431 | 8402 |

Examples 29(a-d)

ILSS of Glass Composites Prepared by VARTM

The modified DCPD (containing 20-25% tricyclopentadiene) was formulated with 20 ppm CHP, 2 phr Ethanox® 4702 antioxidant, 2 phr liquid MDI (Mondur® MLQ), and 2 phr of 9-decen-1-ol to form Resin Formulation (E1). The liquid MDI (Mondur® MLQ) and 9-decen-1-ol were independently added to Resin Formulation (E1) as separate additives. The modified DCPD (containing 20-25% tricyclopentadiene) was formulated with 20 ppm CHP, 2 phr Ethanox® 4702 antioxidant, 2 phr liquid MDI (Mondur® MLQ), and 2 phr of oleyl alcohol to form Resin Formulation (F1). The liquid MDI (Mondur® MLQ) and oleyl alcohol were independently added to Resin Formulation (F1) as separate additives. The modified DCPD (containing 20-25% tricyclopentadiene) was formulated with 20 ppm CHP, 2 phr Ethanox® 4702 antioxidant, 2 phr of adhesion promoter composition (K) to form Resin Formulation (G1). The modified DCPD (containing 20-25% tricyclopentadiene) was formulated with 20 ppm CHP, 2 phr Ethanox® 4702 antioxidant, 2 phr of adhesion promoter composition (L) to form Resin Formulation (H1). The resin formulations (E1-H1) were catalyzed by the addition of C827 (monomer to catalyst ratio 30,000:1) in a suspension of mineral oil. VARTM samples was prepared as described above herein using commercial glass fabric SGL Kumpers (HPT970E0) based on PPG Hybon®2002 ("SGL Glass Fabric"). The composite laminates were cured as described above herein. The ILSS of the resulting composites are shown below in Table 9.

TABLE (9)

| | ILSS | |
|---|---|---|
| Example | Resin Formulation | ILSS |
| 29a | E1 | 6109 |
| 29b | F1 | 7865 |
| 29c | G1 | 8680 |
| 29d | H1 | 8203 |

Examples 30(a-f)

ILSS of Glass Composites Prepared by VARTM

DCPD (containing 6-8% tricyclopentadiene) was formulated with 2 phr Ethanox® 4702 antioxidant, 4 phr adhesion promoter composition (D), and with the inhibitor described in Table 10. The resin was catalyzed by the addition of the catalyst listed in Table 10 (monomer to catalyst ratio between 5,000:1 and 60,000:1 as listed in Table 10) in a suspension of mineral oil. VARTM samples were prepared using commercial glass fabric Vectorply (E-LT 3500-10) based on PPG Hybon® 2026 ("Vectorply Glass Fabric"). The composite laminates were cured as described above herein. The adhesion promoter composition was prepared as described above herein. The ILSS of the resulting composites are shown below in Table 10.

TABLE 10

| | | | ILSS | |
|---|---|---|---|---|
| Example | Catalyst | Monomer to Catalyst Ratio | Inhibitor | ILSS (psi) |
| 30a | C771 | 45,000:1 | None | 8028 |
| 30b | C801 | 5,000:1 | TPP (0.1 phr) | 8830 |
| 30c | C627 | 60,000:1 | TPP (1.0 phr) | 8533 |
| 30d | C827 | 30,000:1 | CHP (20 ppm) | 8166 |
| 30e | C835 | 29,040:1 | None | 8106 |
| 30f | C747 | 60,000:1 | TPP (0.4 phr) | 8029 |

Examples 31(a-f)

ILSS of Carbon Composites Prepared by VARTM

DCPD (containing 6-8% tricyclopentadiene) was formulated with 2 phr Ethanox® 4702 antioxidant, 4 phr adhesion promoter composition (D), and with the inhibitor described in Table 11. The resin was catalyzed by the addition of the catalyst listed in Table 11 (monomer to catalyst ratio between 5,000:1 and 60,000:1 as listed in Table 11) in a suspension of mineral oil. VARTM samples were prepared using commercial carbon fabric Vectorply (C-L 1800) ("Vectorply Carbon Fabric"). The composite laminates were cured as described above herein. The adhesion promoter composition was prepared as described above herein. The ILSS of the resulting composites are shown in below in Table 11.

TABLE 11

| | | | ILSS | |
|---|---|---|---|---|
| Example | Catalyst | Monomer to Catalyst Ratio | Inhibitor | ILSS (psi) |
| 31a | C771 | 45,000:1 | None | 9119 |
| 31b | C801 | 5,000:1 | TPP (0.1 phr) | 9172 |
| 31c | C627 | 60,000:1 | TPP (1.0 phr) | 8765 |
| 31d | C827 | 30,000:1 | CHP (20 ppm) | 9295 |
| 31e | C835 | 29,040:1 | None | 8943 |
| 31f | C747 | 60,000:1 | TPP (0.4 phr) | 8831 |

Example 32(a)-33(a)

ILSS of Glass Composites Prepared by VARTM

DCPD (containing 6-8% tricyclopentadiene) was formulated with 2 phr Ethanox® 4702 antioxidant, 0.6 phr TPP, and 4 phr adhesion promoter composition (D). The adhesion promoter composition (D) was prepared as described above herein. The adhesion promoter composition (D) had been prepared 156 days before being formulated into (added to) the resin composition as described above. The adhesion promoter composition (D) was stored in a sealed container under a dry, inert atmosphere (e.g., under argon or nitrogen) at normal storage temperatures as defined herein (e.g., 5° C.-50° C.) before being formulated into (added to) the resin composition as described above. The resin was catalyzed by the addition of C827 (monomer to catalyst ratio 45,000:1) in a suspension of mineral oil. VARTM samples were prepared using commercial glass fabric and commercial carbon fabric as described above herein. The composite laminates were cured as described above herein. The ILSS of the resulting composites are shown in below in Table 12.

TABLE 12

| | ILSS | |
|---|---|---|
| Example | 32 Vectorply Carbon Fabric | 33 Vectorply Glass Fabric |
| a | 9752 | 8417 |

It is to be understood that while the invention has been described in conjunction with specific embodiments thereof, that the description above as well as the examples that follow are intended to illustrate and not limit the scope of the invention. Other aspects, advantages, and modifications within the scope of the invention will be apparent to those skilled in the art to which the invention pertains.

The claimed invention is:

1. A method for improving the adhesion of a resin composition to a substrate material, comprising combining at least one cyclic olefin, at least one olefin metathesis catalyst, and at least one adhesion promoter composition to form a resin composition, contacting the resin composition with the substrate material, and subjecting the resin composition to conditions effective to promote an olefin metathesis reaction of the cyclic olefin,
   wherein the at least one adhesion promoter composition comprises a pre-reacted mixture of at least one compound containing at least two isocyanate groups and at least one compound comprising at least one heteroatom-containing functional group and at least one metathesis active olefin,
   wherein the at least one compound containing at least two isocyanate groups is 4,4'-methylene diphenyl diisocyanate (MDI) and the at least one compound comprising at least one heteroatom containing functional group and at least one metathesis active olefin is 2-hydroxyethyl bicyclo[2.2.1]hept-2-ene-5-carboxylate (HENB),
   wherein the concentration of the at least one adhesion promoter is 2 to 4 phr.

2. The method according to claim 1, wherein the at least one adhesion promoter composition is storage stable.

3. The method according to claim 2, wherein the at least one adhesion promoter composition is in-resin storage stable.

4. The method according to claim 1, wherein the substrate material is a glass substrate, or a carbon substrate.

5. The method according to claim 1, wherein the pre-reacted mixture of 2-hydroxyethyl bicyclo[2.2.1]hept-2-ene-5-carboxylate (HENB) and 4,4'-methylene diphenyl diisocyanate (MDI) comprises

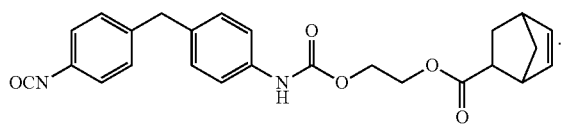

6. The method according to claim 1, wherein the at least one olefin metathesis catalyst, is a Group 8 transition metal complex having the structure of Formula (I):

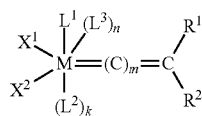

(I)

wherein
M is a Group 8 transition metal selected from ruthenium and osmium;
$L^1$, $L^2$, and $L^3$ are neutral electron donor ligands;
n is 0 or 1, such that $L^3$ may or may not be present;
m is 0, 1, or 2;
k is 0 or 1;
$X^1$ and $X^2$ are anionic ligands; and
$R^1$ and $R^2$ are independently selected from hydrogen, hydrocarbyl, substituted hydrocarbyl, heteroatom-containing hydrocarbyl, substituted heteroatom-containing hydrocarbyl, and functional groups,
wherein any two or more of $X^1$, $X^2$, $L^1$, $L^2$, $L^3$, $R^1$, and $R^2$ can be taken together to form one or more cyclic groups.

7. The method according to claim 6, wherein the at least one of $L^1$, $L^2$, and $L^3$ is an N-heterocyclic carbene ligand.

8. The method according to claim 7, wherein the N-heterocyclic carbene ligand has the structure

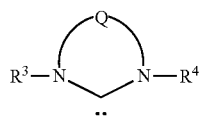

wherein,
Q is $-CR^{11}R^{12}-CR^{13}R^{14}-$ or $-CR^{11}=CR^{13}-$, wherein $R^{11}$, $R^{12}$, $R^{13}$, and $R^{14}$ are independently selected from hydrogen, hydrocarbyl, substituted hydrocarbyl, heteroatom-containing hydrocarbyl, substituted heteroatom-containing hydrocarbyl, and functional groups, or wherein any two of $R^{11}$, $R^{12}$, $R^{13}$, and $R^{14}$ may be linked together to form a substituted or unsubstituted, saturated or unsaturated ring; and
$R^3$ and $R^4$ are unsubstituted phenyl or phenyl substituted with one or more substituents selected from $C_1$-$C_{20}$ alkyl, substituted $C_1$-$C_{20}$ alkyl, $C_1$-$C_{20}$ heteroalkyl, substituted $C_1$-$C_{20}$ heteroalkyl, $C_5$-$C_{24}$ aryl, substituted $C_5$-$C_{24}$ aryl, $C_5$-$C_{24}$ heteroaryl, $C_6$-$C_{24}$ aralkyl, $C_6$-$C_{24}$ alkaryl, or halide.

9. The method according to claim 1, wherein the at least one olefin metathesis catalyst, is a Group 8 transition metal complex having the structure of Formula (VII), wherein:

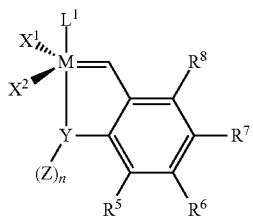

M is ruthenium;
$X^1$ and $X^2$ are anionic ligands;
$L^1$ is a neutral electron donor ligand;
Y is a heteroatom selected from N, O, S, and P;

$R^5$, $R^6$, $R^7$, and $R^8$ are each, independently, selected from the group consisting of hydrogen, halogen, alkyl, alkenyl, alkynyl, aryl, heteroalkyl, heteroatom containing alkenyl, heteroalkenyl, heteroaryl, alkoxy, alkenyloxy, aryloxy, alkoxycarbonyl, carbonyl, alkylamino, alkylthio, aminosulfonyl, monoalkylaminosulfonyl, dialkylaminosulfonyl, alkylsulfonyl, nitrile, nitro, alkylsulfinyl, trihaloalkyl, perfluoroalkyl, carboxylic acid, ketone, aldehyde, nitrate, cyano, isocyanate, hydroxyl, ester, ether, amine, imine, amide, halogen-substituted amide, trifluoroamide, sulfide, disulfide, sulfonate, carbamate, silane, siloxane, phosphine, phosphate, and borate;

n is 0, 1, or 2, such that n is 1 for the divalent heteroatoms O or S, and n is 2 for the trivalent heteroatoms N or P; and Z is a group selected from hydrogen, alkyl, aryl, functionalized alkyl, functionalized aryl where the functional group(s) may independently be one or more or the following: alkoxy, aryloxy, halogen, carboxylic acid, ketone, aldehyde, nitrate, cyano, isocyanate, hydroxyl, ester, ether, amine, imine, amide, trifluoroamide, sulfide, disulfide, carbamate, silane, siloxane, phosphine, phosphate, or borate; methyl, isopropyl, sec-butyl, t-butyl, neopentyl, benzyl, phenyl and trimethylsilyl.

10. The method according to claim 1, wherein the at least one olefin metathesis catalyst has the structure of Formula (I):

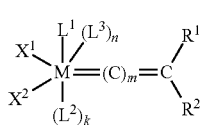

(I)

wherein:
M is ruthenium;
n is 0;
m is 0;
k is 1;
$L^1$ and $L^2$ are trisubstituted phosphines independently selected from the group consisting of tri-n-butylphosphine (Pn-Bu$_3$), tricyclopentylphosphine (PCp$_3$), tricyclohexylphosphine (PCy$_3$), triisopropylphosphine (P-i-Pr$_3$), triphenylphosphine (PPh$_3$), methyldiphenylphosphine (PMePh$_2$), dimethylphenylphosphine (PMe$_2$Ph), and diethylphenylphosphine (PEt$_2$Ph); or $L^1$ is an N-heterocyclic carbene selected from the group consisting of 1,3-bis(2,4,6-trimethylphenyl)-2-imidazolidinylidene, 1,3-bis(2,4,6-trimethylphenyl)imidazol 2 ylidene, 1,3-bis(2,6-di-isopropylphenyl)-2-imidazolidinylidene, and 1,3-bis(2,6-di-isopropylphenyl)imidazol-2-ylidene and $L^2$ is a trisubstituted phosphine selected from the group consisting of tri-n-butylphosphine (Pn-Bu$_3$), tricyclopentylphosphine (PCp$_3$), tricyclohexylphosphine (PCy$_3$), triisopropylphosphine (P-i-Pr$_3$), triphenylphosphine (PPh$_3$), methyldiphenylphosphine (PMePh$_2$), dimethylphenylphosphine (PMe$_2$Ph), and diethylphenylphosphine (PEt$_2$Ph);
$L^3$ is not present;
$X^1$ and $X^2$ are chloride; and
$R^1$ is hydrogen and $R^2$ is phenyl or $-CH=C(CH_3)_2$ or thienyl; or $R^1$ and $R^2$ are taken together to form phenylindenylidene.

11. The method according to claim 1, wherein the at least one olefin metathesis catalyst has the structure of Formula (I):

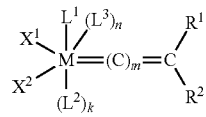

wherein:
M is ruthenium;
n is 0;
m is 0;
k is 1;
$L^1$ is an N-heterocyclic carbene selected from the group consisting of 1,3-bis(2,4,6-trimethylphenyl)-2-imidazolidinylidene and 1,3-bis(2,4,6-trimethylphenyl) imidazol-2-ylidene;
$L^2$ is a trisubstituted phosphine independently selected from the group consisting of tri-n-butylphosphine (Pn-Bu$_3$), tricyclopentylphosphine (PCp$_3$)tricyclohexylphosphine (PCy$_3$), triisopropylphosphine (P-i-Pr$_3$), triphenylphosphine (PPh$_3$), methyldiphenylphosphine (PMePh2), dimethylphenylphosphine (PMe2Ph), and diethylphenylphosphine (PEt$_2$Ph);
$L^3$ is not present;
$X^1$ and $X^2$ are chloride; and
$R^1$ is hydrogen and $R^2$ is phenyl or —CH=C(CH$_3$)$_2$ or thienyl; or $R^1$ and $R^2$ are taken together to form phenylindenylidene.

12. The method according to claim 1, wherein the cyclic olefin is selected from the group consisting of dicyclopentadiene; tricyclopentadiene; cyclopentadiene tetramer; cyclopentadiene pentamer; dicyclohexadiene; norbornene; 5-methyl-2-norbornene; 5-ethyl-2-norbornene; 5-isobutyl-2-norbornene; 5,6-dimethyl-2-norbornene; 5-phenylnorbornene; 5-benzylnorbornene; 5-acetylnorbornene; 5-methoxycarbonylnorbornene; 5-ethoxycarbonyl-1-norbornene; 5-methyl-5-methoxy-carbonylnorbornene; 5-cyanonorbornene; 5,5,6-trim ethyl-2-norbornene; cyclo-hexenylnorbornene; endo, exo-5,6-dimethoxynorbornene; endo, endo-5,6-dimethoxynorbornene; endo, exo-5-6-dimethoxycarbonylnorbornene; endo, endo-5,6-dimethoxycarbonylnorbornene; 2,3-dimethoxynorbornene; norbornadiene; tricycloundecene; tetracyclododecene; 8-methyltetracyclododecene; 8-ethyl-tetracyclododecene; 8-methoxycarbonyltetracyclododecene; 8-methyl-8-tetracyclo-dodecene; 8-cyanotetracyclododecene; pentacyclopentadecene; pentacyclohexadecene; 5-butyl-2-norbornene; 5-hexyl-2-norbornene; 5-octyl-2-norbornene; 5-decyl-2-norbornene; 5-dodecyl-2-norbornene; 5-vinyl-2-norbornene; 5-ethylidene-2-norbornene; 5-isopropenyl-2-norbornene; 5-propenyl-2-norbornene; and 5-butenyl-2-norbornene.

13. The method according to claim 1, wherein the cyclic olefin is selected from the group consisting of dicyclopentadiene; tricyclopentadiene; cyclopentadiene tetramer; cyclopentadiene pentamer; tetracyclododecene; norbornene; 5-butyl-2-norbornene; 5-hexyl-2-norbornene; 5-octyl-2-norbornene; 5-decyl-2-norbornene; 5-dodecyl-2-norbornene; 5-vinyl-2-norbornene; 5-ethylidene-2-norbornene; 5-isopropenyl-2-norbornene; 5-propenyl-2-norbornene; and 5-butenyl-2-norbornene.

14. The method according to claim 1, wherein the resin composition further comprises at least one additive.

15. The method according to claim 1, wherein the resin composition further comprises at least one crosslinker.

16. The method according to claim 15, wherein the at least one crosslinker is selected from the group consisting of dialkyl peroxides, diacyl peroxides, peroxyacids, and mixtures thereof.

* * * * *